(12) United States Patent
Ryu et al.

(10) Patent No.: US 12,213,081 B2
(45) Date of Patent: Jan. 28, 2025

(54) METHOD AND DEVICE FOR ESTIMATING INTER-TERMINAL PATH LOSS IN WIRELESS COMMUNICATION SYSTEM

(71) Applicant: Samsung Electronics Co., Ltd., Suwon-si (KR)

(72) Inventors: Hyunseok Ryu, Suwon-si (KR); Jeongho Yeo, Suwon-si (KR); Jinyoung Oh, Suwon-si (KR); Sungjin Park, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 899 days.

(21) Appl. No.: 17/281,197

(22) PCT Filed: Sep. 20, 2019

(86) PCT No.: PCT/KR2019/012244
§ 371 (c)(1),
(2) Date: Nov. 15, 2021

(87) PCT Pub. No.: WO2020/067682
PCT Pub. Date: Apr. 2, 2020

(65) Prior Publication Data
US 2022/0110067 A1    Apr. 7, 2022

(30) Foreign Application Priority Data

Sep. 27, 2018  (KR) .................. 10-2018-0115354
Jun. 28, 2019  (KR) .................. 10-2019-0078301

(51) Int. Cl.
*H04W 52/54* (2009.01)
*H04L 5/00* (2006.01)
(Continued)

(52) U.S. Cl.
CPC ......... *H04W 52/242* (2013.01); *H04L 5/0051* (2013.01); *H04W 52/245* (2013.01);
(Continued)

(58) Field of Classification Search
CPC ............. H04W 52/242; H04W 52/245; H04W 52/383; H04W 56/001; H04W 92/18;
(Continued)

(56) References Cited

U.S. PATENT DOCUMENTS 8,369,800 B2  2/2013 Li et al.
8,929,281 B2  1/2015 Li et al.
(Continued)

FOREIGN PATENT DOCUMENTS

CN  104105185 A  10/2014
CN  105323839 A  2/2016
(Continued)

OTHER PUBLICATIONS

Intellectual Property India, "Examination report under sections 12 & 13 of the Patents Act," issued Feb. 22, 2022, In connection with Indian Patent Application No. 202137017497, 6 pages.
(Continued)

*Primary Examiner* — Ayaz R Sheikh
*Assistant Examiner* — Louis Samara

(57) ABSTRACT

The present disclosure relates to a method and apparatus for estimating inter-terminal sidelink path loss for control information and data information transmission between terminals. A path loss estimation method of a transmission terminal in a wireless communication system according to an embodiment may include transmitting a signal for path loss estimation to a reception terminal, receiving a path loss estimation result report from the reception terminal in response to the signal for path loss estimation, configuring a transmission power based on the path loss estimation result
(Continued)

report, and performing a sidelink transmission with the reception terminal with the configured transmission power.

18 Claims, 19 Drawing Sheets

(51) Int. Cl.
  *H04W 52/24* (2009.01)
  *H04W 52/38* (2009.01)
  *H04W 56/00* (2009.01)
  *H04W 92/18* (2009.01)
(52) U.S. Cl.
  CPC ....... *H04W 52/383* (2013.01); *H04W 56/001* (2013.01); *H04W 92/18* (2013.01)
(58) Field of Classification Search
  CPC ......... H04W 76/30; H04W 4/40; H04W 4/70; H04L 5/0051; H04L 5/0094
  See application file for complete search history.

(56) References Cited

U.S. PATENT DOCUMENTS

| | | | |
|---|---|---|---|
| 9,055,534 | B2 | 6/2015 | Kim et al. |
| 9,807,711 | B2 | 10/2017 | Zhao et al. |
| 10,356,803 | B2 | 7/2019 | Kim et al. |
| 10,813,059 | B2 | 10/2020 | Wang et al. |
| 10,841,914 | B2* | 11/2020 | Liou ..................... H04L 5/0094 |
| 2013/0142113 | A1* | 6/2013 | Fong ................... H04L 27/2646 370/328 |
| 2013/0295983 | A1 | 11/2013 | Kim et al. |
| 2016/0037530 | A1 | 2/2016 | Peng et al. |
| 2017/0214505 | A1* | 7/2017 | Zhang ................... H04L 5/0048 |
| 2018/0332652 | A1* | 11/2018 | Kim ...................... H04W 76/30 |
| 2019/0045345 | A1* | 2/2019 | Lee ........................ H04L 1/1812 |
| 2019/0174429 | A1 | 6/2019 | Wang et al. |
| 2020/0178199 | A1* | 6/2020 | Chae .................... H04B 7/0621 |
| 2020/0187145 | A1* | 6/2020 | Chae ....................... H04W 4/70 |
| 2020/0296690 | A1* | 9/2020 | Lee ......................... H04W 4/40 |

FOREIGN PATENT DOCUMENTS

| | | | | |
|---|---|---|---|---|
| CN | 110121905 | A | * 8/2019 | ........... H04B 17/309 |
| CN | 110784918 | B | * 1/2021 | ........... H04W 52/146 |
| EP | 2 465 324 | B1 | 3/2016 | |
| KR | 10-2016-0128390 | A | 11/2016 | |
| KR | 10-2017-0043540 | A | 4/2017 | |
| WO | 2012096493 | A2 | 7/2012 | |
| WO | 2017171895 | A1 | 10/2017 | |
| WO | 2018027993 | A1 | 2/2018 | |

OTHER PUBLICATIONS

European Patent Office, "Supplementary European Search Report" issued Feb. 16, 2022, in connection with European Patent Application No. 19867813.8, 17 pages.
Intel Corporation, "Sidelink Power Control for Wearable and IoT Use Cases," 3GPP TSG RSN WG1 Meeting#90, R1-1712520, Prague, Czech Republic, Aug. 21-25, 2017, 5 pages.
Ericsson, "Measurements, Signaling, and Selection Rules for Relay Discovery," 3GPP TSG RAN WG1 Meeting #80bis, R1-151767, Belgrade, Serbia, Apr. 20-24, 2015, 7 pages.
Supplementary Partial European Search Report dated Oct. 22, 2021, in connection with European Application No. 19867813.8, 14 pages.
NTT Docomo, Inc., "Transmission diversity solutions", 3GPP TSG RAN WG1 Meeting #92, Feb. 26-Mar. 2, 2018, R1-1802450, 5 pages.
InterDigital Inc., "Open Issues on Mode 3 and Mode 4 Pool Sharing", 3GPP RAN WG2 Meeting #101bis, Apr. 16-20, 2018, R2-1804821, 4 pages.
OPPO, "Discussion of synchronization for NR-V2X", 3GPP TSG RAN WG1 Meeting #94, Aug. 20-24, 2018, R1-1808877, 3 pages.
Samsung, "Mode-4 support in V2X CA", 3GPP TSG RAN WG1 #92bis, Apr. 16-20, 2018, R1-1804318, 7 pages.
International Search Report dated Dec. 26, 2019 in connection with International Patent Application No. PCT/KR2019/012244, 2 pages.
Office Action dated Oct. 20, 2023, in connection with Chinese Patent Application No. 201980076603.0, 15 pages.
Office Action dated Nov. 28, 2023, in connection with Korean Patent Application No. 10-2019-0078301, 10 pages.
Huawei et al., "Discussion on power control for feD2D," 3GPP TSG RAN1 Meeting #90, R1-1712128, Prague, Czech Republic, Aug. 2017, 3 pages.
MCC Support, "Draft Report of 3GPP TSG RAN WG1 #88bis v0.1.0 (Spokane, USA, Apr. 3-7, 2017)," 3GPP TSG RAN WG1 Meeting #89 R1-17xxxxx, Hangzhou, China, May 2017, 148 pages.
European Patent Office, "Communication Pursuant to Article 94(3) EPC," dated Sep. 26, 2022, in connection with European Patent Application No. 19867813.8, 13 pages.
The Second Office Action dated Apr. 29, 2024, in connection with Chinese Patent Application No. 201980076603.0, 8 pages.
Communication pursuant to Article 94(3) EPC dated Mar. 13, 2024, in connection with European Patent Application No. 19867813.8, 7 pages.
Office Action issued Sep. 2, 2024, in connection with Korean Patent Application No. 10-2019-0078301, 8 pages.
Notice Of Allowance issued Sep. 12, 2024, in connection with Chinese Patent Application No. 201980076603.0, 7 pages.
Ericsson, "Filtering of sidelink measurements," 3GPP TSG-RAN WG2 #91bis, Tdoc R2-154153, Malmo, Sweden, Oct. 2015, 2 pages.
Motorola Mobility, "SRS Power Offset Determination for DL Comp," 3GPP TSG RAN1#69, R1-122665, Prague, Czech Republic, May 2012, 10 pages.
3GPP TS36.133 v14.9.0, Evolved Universal Terrestrial Radio Access (E-UTRA); Requirements for support of radio resource management, 3GPP server release date (Sep. 20, 2018), 1253 pages.

\* cited by examiner (a) UNICAST V2X COMMUNICATION (b) GROUPCAST V2X COMMUNICATION (a) Option 1A: without request from TX UE (b) Option 1B: with request from TX UE (a) Option 2A: without request from TX UE (b) Option 2B: with request from TX UE (a) RSRP only (b) RSRP + an UE ID (c) N-RSRP reporting (d) N-RSRP reporting : example 2

METHOD AND DEVICE FOR ESTIMATING INTER-TERMINAL PATH LOSS IN WIRELESS COMMUNICATION SYSTEM

CROSS-REFERENCE TO RELATED APPLICATIONS

This application is a 371 of International Application No. PCT/KR2019/012244 filed on Sep. 20, 2019, which claims priority to Korean Patent Application No. 10-2018-0115354 filed on Sep. 27, 2018 and Korean Patent Application No. 10-2019-0078301 filed on Jun. 28, 2019, the disclosures of which are herein incorporated by reference in their entirety.

BACKGROUND

1. Field

The present disclosure relates to a method and apparatus for estimating inter-terminal sidelink path loss for transmission of control information and data information between terminals, and more particularly, to a method and apparatus for estimating path loss by using a signal for path loss estimation transmitted via a sidelink and controlling transmission power of the sidelink.

2. Description of Related Art

In order to meet the increasing demand with respect to wireless data traffic after the commercialization of $4^{th}$ generation (4G) communication systems, efforts have been made to develop enhanced $5^{th}$ generation (5G) communication systems or pre-5G communication systems. For this reason, 5G communication systems or pre-5G communication systems are called 'beyond 4G network communication systems' or 'post long term evolution (LTE) systems'. 5G communication systems defined by the $3^{rd}$ generation partnership project (3GPP) are called new radio (NR) systems. In order to achieve a high data rate, consideration is given to implementing 5G communication systems in ultra-high frequency bands (millimeter wave (mmW)) (e.g., 60 GHz). In order to reduce the path loss of radio waves and increase a transmission distance of radio waves in ultra-high frequency bands, for 5G communication systems, technologies such as beamforming, massive multiple-input multiple-output (MIMO), full dimensional MIMO (FD-MIMO), array antenna, analog beamforming, and large scale antenna have been discussed, and have been applied to NR systems. Also, in order to improve system networks, for 5G communication systems, technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation have been developed. Furthermore, for 5G communication systems, advanced coding modulation (ACM) schemes such as hybrid frequency-shift keying (FSK) and quadrature amplitude modulation (QAM) modulation (FQAM) and sliding window superposition coding (SWSC) and enhanced network access schemes such as filter-bank multi-carrier (FBMC), non-orthogonal multiple access (NOMA), and sparse code multiple access (SCMA) have been developed.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, technologies such as sensor network, M2M communication, and MTC are implemented by 5G communication technologies such as beamforming, MIMO, and array antenna. The application of a cloud RAN as big data processing technology may also be considered as an example of convergence between 5G technology and IoT technology.

In vehicle communication, standardization of vehicle-to-everything (V2X) based on LTE systems in 3GPP Rel-14 and Rel-15 has been completed, based on a device-to-device (D2D) communication structure. Currently, attempts have been made to develop V2X based on 5G NR systems. V2X based on 5G or NR systems may support unicast communication, groupcast (or multicast) communication, broadcast communication, etc., between terminals. Also, unlike V2X based on LTE systems, which aims at transmitting and receiving basic safety information required for on-road driving of vehicles, V2X based on 5G or NR systems aims at providing more advanced services such as platooning, advanced driving, extended sensor, and remote driving. Such various services and scenarios require higher reliability and a higher data rate than in LTE system-based D2D or LTE system-based V2X. Accordingly, V2X based on 5G or NR systems needs to support link adaptation based on measurement of the quality of a sidelink between terminals.

Disclosed embodiments provide a method and apparatus for estimating inter-terminal sidelink path loss, to support high reliability and a high data rate.

Also, disclosed embodiments provide a method and apparatus for controlling inter-terminal sidelink transmission power according to path loss estimation.

Furthermore, disclosed embodiments provide a method and apparatus for effectively providing a service in a mobile communication system.

SUMMARY

A path loss estimation method of a transmission terminal in a mobile communication system according to an embodiment may include transmitting a signal for path loss estimation to a reception terminal, receiving a path loss estimation result report from the reception terminal in response to the signal for path loss estimation, configuring a transmission power based on the path loss estimation result report, and performing a sidelink transmission with the reception terminal with the configured transmission power.

A path loss estimation method of a reception terminal in a wireless communication system according to an embodiment may include receiving a signal for path loss estimation from a transmission terminal, measuring reference signal received power (RSRP) based on the signal for path loss estimation, and transmitting a path loss estimation result report including the RSRP to the transmission terminal.

A transmission terminal according to an embodiment may include a transceiver, a memory storing a path loss estimation method program and data of the transmission terminal, and a processor configured to execute the program stored in the memory to transmit a signal for path loss estimation to a reception terminal, receive a path loss estimation result report from the reception terminal in response to the signal for path loss estimation, configure transmission power based on the path loss estimation result report, and perform sidelink transmission with the reception terminal with the configured transmission power.

A reception terminal according to an embodiment may include a transceiver, a memory storing a path loss estimation method program and data of the reception terminal, and a processor configured to execute the program stored in the memory to receive a signal for path loss estimation from a transmission terminal, measure reference signal received power (RSRP) based on the signal for path loss estimation, and transmit a path loss estimation result report including the RSRP to the transmission terminal.

According to an embodiment, transmission parameters of sidelink control information and data information may be adjusted according to channel quality of a sidelink. Accordingly, the reliability and a data rate of the sidelink control information and the data information in a vehicle communication system, a D2D system, etc. may be improved. Also, the amount of interference caused by a nearby cell or vehicle may be reduced. Accordingly, more efficient communication between terminals may be supported. Furthermore, a service may be effectively provided in a mobile communication system.

DETAILED DESCRIPTION

Figure 1:
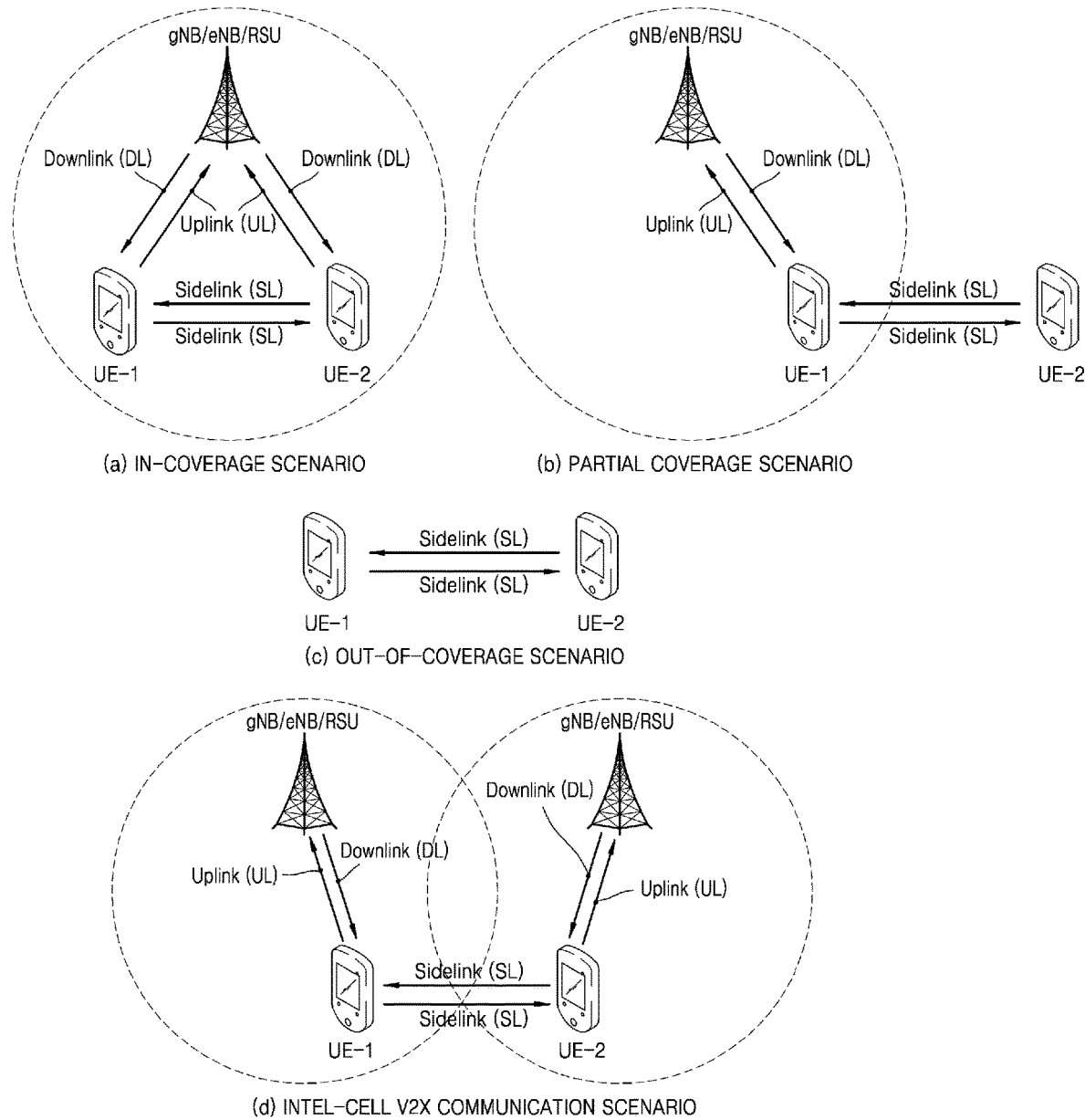
FIG. 1 is a view for describing a vehicle-to-everything (V2X) system to which a disclosed embodiment is applied.

A path loss estimation method of a transmission terminal in a mobile communication system according to an embodiment may include transmitting a signal for path loss estimation to a reception terminal, receiving a path loss estimation result report from the reception terminal in response to the signal for path loss estimation, configuring transmission power based on the path loss estimation result report, and performing sidelink transmission with the reception terminal with the configured transmission power.

In an embodiment, the path loss estimation result report may include at least one layer 1 reference signal received power (L1-RSRP) measured by the reception terminal, wherein the receiving of the path loss estimation result report from the reception terminal in response to the signal for path loss estimation includes receiving the at least one L1-RSRP measured by the reception terminal via a sidelink feedback channel (physical sidelink feedback channel (PSFCH)) or a medium access control control element (MAC CE) transmitted via a sidelink data channel (physical sidelink shared channel (PSSCH)).

In an embodiment, the MAC CE may include the at least one L1-RSRP, wherein, when the MAC CE includes a plurality of L1-RSRPs, the MAC CE includes a user equipment (UE) ID.

In an embodiment, the path loss estimation result report may include layer 3 RSRP (L3-RSRP) measured by the reception terminal, wherein the receiving of the path loss estimation result report from the reception terminal in response to the signal for path loss estimation includes receiving the L3-RSRP measured by the reception terminal through a radio resource control (RRC) message transmitted via a sidelink data channel (PSSCH).

In an embodiment, the receiving of the path loss estimation result report from the reception terminal in response to the signal for path loss estimation may include receiving the path loss estimation result report after the signal for path loss estimation is transmitted to the reception terminal, before a pre-configured timer expires, or during a pre-configured second time before, after, or before and after a point of time when a pre-configured first time has elapsed or a point of time when a pre-configured number of slots are received.

In an embodiment, when the path loss estimation result report is not received before the pre-configured timer expires, the path loss estimation method may further include transmitting, to the reception terminal, information indicating that the path loss estimation result report has not been received.

In an embodiment, the signal for path loss estimation may include at least one signal from among a sidelink synchronization signal including at least one of a primary sidelink synchronization signal (PSSS) and a secondary sidelink synchronization signal (SSSS), a demodulation reference signal (DMRS) transmitted via at least one of a sidelink broadcast channel (physical sidelink broadcast channel (PSBCH)), a sidelink control channel (physical sidelink control channel (PSCCH)), and a sidelink data channel (physical sidelink shared channel (PSSCH)), and a reference signal for supporting a sidelink operation.

In an embodiment, the transmitting of the signal for path loss estimation to the reception terminal may include transmitting the signal for path loss estimation to the reception terminal, in at least one case from among a case where a command for transmission of the signal for path loss estimation is received from a base station, a case where reference signal received power (RSRP) measured by the transmission terminal for a signal for downlink path loss estimation transmitted by the base station is equal to or greater than a configured threshold value or equal to or less than a configured threshold value, a case where the transmission terminal determines that the signal for path loss estimation needs to be transmitted, and a case where a transmission request signal of the signal for path loss estimation is received from the reception terminal.

In an embodiment, the transmitting of the signal for path loss estimation to the reception terminal may include configuring, as transmission power of the signal for path loss estimation, at least one from among pre-configured transmission power, maximum transmission power of the transmission terminal, transmission power according to configuration of the base station, transmission power determined based on RSRP measured by the transmission terminal for a signal for downlink path loss estimation transmitted by the base station, and transmission power determined based on RSRP measured by the transmission terminal for a transmission request signal of the signal for path loss estimation received from the reception terminal.

In an embodiment, the receiving of the path loss estimation result report from the reception terminal in response to the signal for path loss estimation may include receiving the path loss estimation result report periodically or aperiodically according to at least one of configuration of a base station and sidelink control information.

In an embodiment, the path loss estimation method may further include transmitting, to the reception terminal, information on the transmission power of the signal for path loss estimation including at least one of offset information between a configured reference signal and a transmission power value of the signal for path loss estimation and the transmission power value of the signal for path loss estimation.

In an embodiment, the signal for path loss estimation and the information on the transmission power of the signal for path loss estimation may be transmitted via the same channel or different channels.

In an embodiment, the performing of the sidelink transmission with the reception terminal with the configured transmission power may include transmitting at least one of sidelink control information and sidelink data to the reception terminal.

A path loss estimation method of a reception terminal in a wireless communication system according to an embodiment may include receiving a signal for path loss estimation from a transmission terminal, measuring reference signal received power (RSRP) based on the signal for path loss estimation, and transmitting a path loss estimation result report including the RSRP to the transmission terminal.

In an embodiment, the RSRP may include at least one layer 1 RSRP (L1-RSRP), wherein the transmitting of the path loss estimation result report including the RSRP to the transmission terminal includes transmitting the at least one L1-RSRP via a sidelink feedback channel (physical sidelink feedback channel (PSFCH)) or a medium access control control element (MAC CE) transmitted via a sidelink data channel (physical sidelink shared channel (PSSCH)).

In an embodiment, the MAC CE may include the at least one L1-RSRP, wherein, when the MAC CE includes a plurality of L1-RSRPs, the MAC CE includes a user equipment (UE) ID.

In an embodiment, the transmitting of the path loss estimation result report including the RSRP to the transmission terminal may include transmitting the L1-RSRP every pre-configured time or every pre-configured slots, after the signal for path loss estimation is received, until a pre-configured timer expires, or until a reporting stop command is received from the transmission terminal.

In an embodiment, when information indicating that the path loss estimation result report has not been received is received from the transmission terminal, the path loss estimation method may further include re-configuring the timer.

In an embodiment, the path loss estimation result report may include layer 3 RSRP (L3-RSRP), wherein the transmitting of the path loss estimation result report including the RSRP to the transmission terminal includes transmitting the L3-RSRP through a radio resource control (RRC) message transmitted via a sidelink data channel (physical sidelink shared channel (PSSCH)).

In an embodiment, the signal for path loss estimation may include at least one signal from among a sidelink synchronization signal including at least one of a primary sidelink synchronization signal (PSSS) and a secondary sidelink synchronization signal (SSSS), a demodulation reference signal (DMRS) transmitted via at least one of a sidelink broadcast channel (physical sidelink broadcast channel (PSBCH)), a sidelink control channel (physical sidelink control channel (PSCCH)), and a sidelink data channel (physical sidelink shared channel (PSSCH)), and a reference signal for supporting a sidelink operation.

In an embodiment, the transmitting of the path loss estimation result report including the RSRP to the transmission terminal may include transmitting the path loss estimation result report periodically or aperiodically according to at least one of configuration of a base station and sidelink control information.

In an embodiment, the measuring of the RSRP based on the signal for path loss estimation may include measuring pre-configured transmission power, maximum transmission power of the reception terminal, transmission power according to configuration of a base station, and the RSRP for a signal for downlink path loss estimation transmitted by the base station.

In an embodiment, the path loss estimation method may further include receiving information on transmission power of the signal for path loss estimation including at least one of offset information between a configured reference signal and a transmission power value of the signal for path loss estimation and the transmission power value of the signal for path loss estimation.

In an embodiment, the signal for path loss estimation and the information on the transmission power of the signal for path loss estimation may be received via the same channel or different channels.

A transmission terminal according to an embodiment may include a transceiver, a memory storing a path loss estimation method program and data of the transmission terminal, and a process configured to execute the program stored in the memory to transmit a signal for path loss estimation to a reception terminal, receive a path loss estimation result report from the reception terminal in response to the signal for path loss estimation, configure transmission power based on the path loss estimation result report, and perform sidelink transmission with the reception terminal with the configured transmission power.

A reception terminal according to an embodiment may include a transceiver, a memory storing a path loss estimation method program and data of the reception terminal, and a processor configured to execute the program stored in the memory to receive a signal for path loss estimation from a transmission terminal, measure reference signal received power (RSRP) based on the signal for path loss estimation, and transmit a path loss estimation result report including the RSRP to the transmission terminal.

A path loss estimation method of a transmission terminal in a wireless communication system according to another embodiment may include receiving a signal for path loss estimation from a reception terminal, estimating a path loss based on the signal for path loss estimation, configuring transmission power based on the path loss estimation result, and performing sidelink transmission with the reception terminal with the configured transmission power.

In an embodiment, the signal for path loss estimation may include at least one from among a sidelink synchronization signal including at least one of a primary sidelink synchronization signal (PSSS) and a secondary sidelink synchronization signal (SSSS), a demodulation reference signal (DMRS) transmitted via at least one of a sidelink broadcast channel (physical sidelink broadcast channel (PSBCH)), a sidelink control channel (physical sidelink control channel (PSCCH)), and a sidelink data channel (physical sidelink shared channel (PSSCH)), and a reference signal for supporting a sidelink operation.

In an embodiment, the path loss estimation method may further include transmitting a transmission request signal of the signal for path loss estimation to the reception terminal, in at least one case from among a case where a command for a transmission request of the signal for path loss estimation is received from a base station, a case where reference signal received power (RSRP) measured by the transmission terminal for a signal for sidelink path loss estimation transmitted by the base station is equal to or greater than a configured threshold value or equal to or less than a configured threshold value, and a case where the transmission terminal determines that the signal for path loss estimation needs to be transmitted.

In an embodiment, the transmitting of the transmission request signal of the signal for path loss estimation to the reception terminal may include configuring, as transmission power of the transmission request signal of the signal for path loss estimation, at least one of pre-configured transmission power, maximum transmission power of the transmission terminal, transmission power according to configuration of a base station, and transmission power determined based on RSRP measured by the transmission terminal for a signal for downlink path loss estimation transmitted by the base station.

In an embodiment, the path loss estimation method may further include receiving information on transmission power of the signal for path loss estimation including at least one of offset information between a configured reference signal and a transmission power value of the signal for path loss estimation and the transmission power value of the signal for path loss estimation.

In an embodiment, the signal for path loss estimation and the information on the transmission power of the signal for path loss estimation may be received via the same channel or different channels.

A path loss estimation method of a reception terminal in a wireless communication system according to another embodiment may include transmitting a signal for path loss estimation to a transmission terminal and performing sidelink transmission with the transmission terminal.

In an embodiment, the signal for path loss estimation may include at least one signal from among a sidelink synchronization signal including at least one of a primary sidelink synchronization signal (PSSS) and a secondary sidelink synchronization signal (SSSS), a demodulation reference signal (DMRS) transmitted via at least one of a sidelink broadcast channel (physical sidelink broadcast channel (PSBCH)), a sidelink control channel (physical sidelink control channel (PSCCH)), and a sidelink data channel (physical sidelink shared channel (PSSCH)), and a reference signal for supporting a sidelink operation.

In an embodiment, the transmitting of the signal for path loss estimation to the transmission terminal may include transmitting the signal for path loss estimation to the transmission terminal, in at least one case from among a case where a command for transmission of the signal for path loss estimation is received from a base station, a case where reference signal received power (RSRP) measured by the reception terminal for a signal for downlink path loss estimation transmitted by the base station is equal to or greater than a pre-configured threshold value or equal to or less than a configured threshold value, a case where the reception terminal determines that the signal for path loss estimation needs to be transmitted, and a case where a transmission request signal of the signal for path loss estimation is received from the transmission terminal.

In an embodiment, the transmitting of the signal for path loss estimation to the transmission terminal may include configuring, as transmission power of the signal for path loss estimation, at least one of pre-configured transmission power, maximum transmission power of the reception terminal, transmission power according to configuration of a base station, transmission power determined based on RSRP measured by the reception terminal for a signal for downlink path loss estimation transmitted by the base station, and transmission power determined based on RSRP measured by the reception terminal for a transmission request signal of the signal for path loss estimation received from the transmission terminal.

In an embodiment, the path loss estimation method may further include transmitting, to the transmission terminal, information on the transmission power of the signal for path loss estimation including at least one of offset information between a configured reference signal and a transmission power value of the signal for path loss estimation and the transmission power value of the signal for path loss estimation.

In an embodiment, the signal for path loss estimation and the information on the transmission power of the signal for path loss estimation may be transmitted via the same channel or different channels.

In an embodiment, the performing of the sidelink transmission with the transmission terminal may include receiving at least one of sidelink control information and sidelink data from the transmission terminal.

A transmission terminal according to another embodiment may include a transceiver, a memory storing a path loss estimation method program and data of the transmission terminal, and a processor configured to execute the program stored in the memory to receive a signal for path loss estimation from a reception terminal, estimate a path loss based on the signal for path loss estimation, configure transmission power based on a path loss estimation result, and perform sidelink transmission with the reception terminal with the configured transmission power.

A reception terminal according to another embodiment may include a transceiver, a memory storing a path loss estimation method program and data of the reception terminal, and a processor configured to execute the program stored in the memory to transmit a signal for path loss estimation to a transmission terminal and perform sidelink transmission with the transmission terminal.

Hereinafter, embodiments of the present disclosure will be described in detail with reference to the accompanying drawings.

In the following description of embodiments, descriptions of techniques that are well known in the art and not directly related to the present disclosure are omitted. This is to clearly convey the gist of the present disclosure by omitting an unnecessary description.

For the same reason, some elements in the drawings are exaggerated, omitted, or schematically illustrated. Also, the size of each element does not entirely reflect the actual size of the element. In the drawings, the same or corresponding elements are denoted by the same reference numerals.

The advantages and features of the present disclosure and methods of achieving them will become apparent with reference to embodiments of the present disclosure described in detail below along with the attached drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the present disclosure is defined only by the accompanying claims. In the specification, the same reference numerals denote the same elements.

In this case, it will be understood that each block of flowchart illustrations and combinations of blocks in the flowchart illustrations may be implemented by computer program instructions. Because these computer program instructions may be loaded into a processor of a general-purpose computer, a special purpose computer, or a programmable data processing device, the instructions, which are executed via the processor of the computer or another programmable data processing device, generate means for implementing functions described in the flowchart block(s). Because these computer program instructions may also be stored in a computer-usable or computer-readable memory that may direct a computer or another programmable data processing device to function in a particular manner, the instructions stored in the computer-usable or computer-readable memory may produce manufacturing items including instruction means that implement the functions described in the flowchart block(s). Because the computer program instructions may also be loaded into a computer or another programmable data processing device, a series of operational steps may be performed on the computer or other programmable device to produce a computer implemented process, and thus the instructions executed on the computer or other programmable device may provide steps for implementing the functions described in the flowchart block(s).

Also, each block of the flowchart illustrations may represent a module, segment, or portion of code, which includes one or more executable instructions for implementing specified logical function(s). It should also be noted that in some alternative implementations, functions noted in blocks may occur out of order. For example, two blocks shown in succession may actually be executed substantially concurrently or the blocks may sometimes be executed in a reverse order, depending upon the functionality involved.

In this case, the term '~unit' used in the present embodiment refers to a software or hardware component, such as a field-programmable gate array (FPGA) or an application-specific integrated circuit (ASIC), which performs certain tasks. However, the term '~unit' is not limited to software or hardware. The term '~unit' may be configured to be in an addressable storage medium or configured to operate one or more processors. Accordingly, '~unit' may include, by way of example, components such as software components, object-oriented software components, class components, and task components, processes, functions, attributes, procedures, and subroutines, segments of program code, drivers, firmware, microcode, circuitry, data, databases, data structures, tables, arrays, and variables. The functionality provided in components and '~units' may be combined into fewer components and '~units', or may be further separated into additional components and '~units'. Further, components and '~units' may be implemented to operate one or more central processing units (CPUs) in a device or a secure multimedia card. Also, a '~unit' in an embodiment may include one or more processors.

Also, terms for identifying access nodes, terms denoting network entities, terms denoting messages, terms denoting interfaces between network entities, terms denoting various types of identification information, etc. used herein are exemplified for convenience of description. Accordingly, the terms used in the present disclosure are not limited and other terms denoting targets having the same technical meanings may be used.

In the present disclosure, for convenience of description, the present disclosure uses terms and names defined in standards regarding $5^{th}$ generation (5G), new radio (NR), or long term evolution (LTE) systems. However, the present disclosure is not limited by such terms and names, and may be equally applied to systems complying with other standards.

While a description will be focused on a communication standard specified by the 3$^{rd}$ generation partnership project (3GPP), when embodiments of the present disclosure are described in detail, a main subject matter to be claimed in the specification is also applicable to other communication systems and services having a similar technical background without significantly departing from a range disclosed herein, as will be obvious to one of ordinary skill in the art.

In the present disclosure, a transmission terminal does not refer a terminal that transmits a signal for path loss estimation, but refers to a terminal that transmits sidelink data and control information. In the present disclosure, a reception terminal does not refer to a terminal that receives a signal for path loss estimation, but refers to a terminal that receives sidelink data and control information.

FIG. 1 is a view for describing a vehicle-to-everything (V2X) system to which a disclosed embodiment is applied.

(a) of FIG. 1 shows an example in which all V2X user equipments (UEs) UE-1 and UE-2 are located in coverage of a base station gNB/eNB/RSU (in-coverage scenario). All of the V2X UEs UE-1 and UE-2 may receive data and control information from the base station gNB/eNB/RSU through a downlink (DL) or may transmit data and control information to the base station through an uplink (UL). In this case, the data and control information may be data and control information for V2X communication, or data and control information for general cellular communication other than V2X communication. Also, in (a) of FIG. 1, the V2X UEs UE-1 and UE-2 may transmit and receive data and control information for V2X communication through a sidelink (SL).

(b) of FIG. 1 shows an example in which the V2X UE UE-1 is located in the coverage of the base station gNB/eNB/RSU and the V2X UE UE-2 is located out of the coverage of the base station gNB/eNB/RSU (partial coverage scenario). The V2X UE UE-1 located in the coverage of the base station gNB/eNB/RSU may receive data and control information from the base station gNB/eNB/RSU through a downlink (DL) or transmit data and control information to the base station gNB/eNB/RSU through an uplink (UL). The V2X UE UE-2 located out of the coverage of the base station gNB/eNB/RSU may not receive data and control information from the base station gNB/eNB/RSU through the downlink and may not transmit data and control information to the base station gNB/eNB/RSU through the uplink. The V2X UE UE-2 may transmit and receive data and control information for V2X communication through the sidelink (SL).

(c) of FIG. 1 shows an example in which all of the V2X UEs UE-1 and UE2 are located out of the coverage of the base station gNB/eNB/RSU (out-of-coverage scenario). Accordingly, the V2X UEs UE-1 and UE-2 may not receive data and control information from the base station gNB/eNB/RSU through the downlink (DL) and may not transmit data and control information to the base station gNB/eNB/RSU through the uplink (UL). The V2X UEs UE-1 and UE-2 may transmit and receive data and control information for V2X communication through the sidelink (SL).

(d) of FIG. 1 shows an example in which a V2X transmission UE and a V2X reception UE are connected to different base stations gNBs/eNBs/RSUs (a radio resource control (RRC) connected state) or are camped (an RRC-disconnected state, i.e., an RRC idle state) (inter-cell V2X communication scenario). In this case, the V2X UE UE-1 may be a V2X transmission UE and the V2X UE UE-2 may be a V2X reception UE. Alternatively, the V2X UE UE-1 may be a V2X reception UE and the V2X UE UE-2 may be a V2X transmission UE. The V2X UE UE-1 may receive a V2X dedicated system information block (SIB) from a base station to which the V2X UE UE-1 is connected (or in which the V2X UE UE-1 is camped), and the V2X UE UE-2 may receive a V2X dedicated SIB from another base station to which the V2X UE UE-2 is connected (or in which the V2X UE UE-2 is camped). In this case, information of the V2X dedicated SIB received by the V2X UE UE-1 and information of the V2X dedicated SIB received by the V2X UE UE-2 may be different from each other. Accordingly, to perform V2X communication between UEs located in different cells, the information needs to be united.

While a description has been made with reference to FIG. 1 by using a V2X system including two UEs UE-1 and UE-2 as an example for convenience, various numbers of UEs may join the V2X system without being limited to the description. The uplink (UL) and the downlink (DL) with the base station gNB/eNB/RSU and the V2X UEs UE-1 and UE-2 may be referred to as Uu interfaces, and the sidelink (SL) between the V2X UEs UE-1 and UE-2 may be referred to as a PC5 interface. Accordingly, in the present disclosure, these terms may be used interchangeably.

Meanwhile, in the present disclosure, a UE may refer to a vehicle supporting vehicle-to-vehicle (V2V) communication, a vehicle or a handset of a pedestrian (e.g., a smartphone) supporting vehicle-to-pedestrian (V2P) communication, a vehicle supporting vehicle-to-network (V2N) communication, or a vehicle supporting vehicle-to-infrastructure (V2I) communication. Also, in the present disclosure, the UE may refer to a road side unit (RSU) having a UE function, an RSU having a base station function, or an RSU having a part of the UE function and a part of the base station function.

Figure 2:
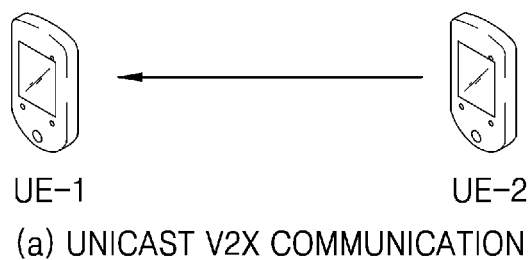
FIG. 2 is a view for describing a V2X communication method performed through a sidelink.
Figure 2:
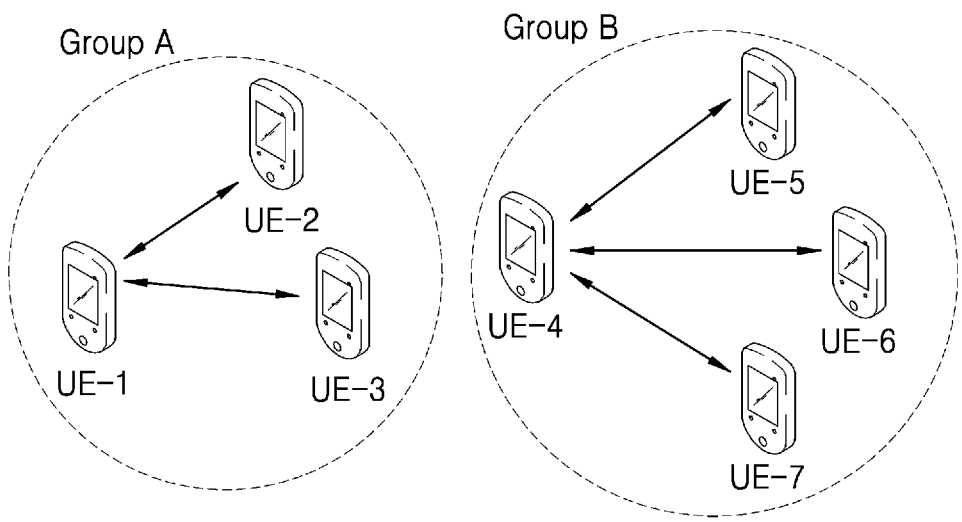

FIG. 2 is a view for describing a V2X communication method performed through a sidelink.

As shown in (a) of FIG. 2, a transmission UE and a reception UE may perform one-to-one communication, which may be referred to as unicast communication.

As shown in (b) of FIG. 2, a transmission UE and a reception UE may perform one-to-many communication, which may be referred to as groupcast or multicast communication. In (b) of FIG. 2, UE-1, UE-2, and UE-3 perform groupcast communication by forming one group (group A), and UE-4, UE-5, UE-6, and UE-7 perform groupcast communication by forming another group (group B). Each UE performs groupcast communication only in a group to which the UE belongs, and communication is not performed between different groups. Although two groups are formed in (b) of FIG. 2, a greater number of groups may be formed without being limited to the illustration.

Meanwhile, although not shown in FIG. 2, V2X UEs may perform broadcast communication. In broadcast communication, all V2X UEs receive data and control information transmitted by a V2X transmission UE through a sidelink. For example, in (b) of FIG. 2, when it is assumed that the V2X UE UE-1 is a transmission UE for broadcast communication, all UEs UE-2, UE-3, UE-4, UE-5, UE-6, and UE-7 may receive data and control information transmitted by the V2X UE UE-1.

Figure 3:
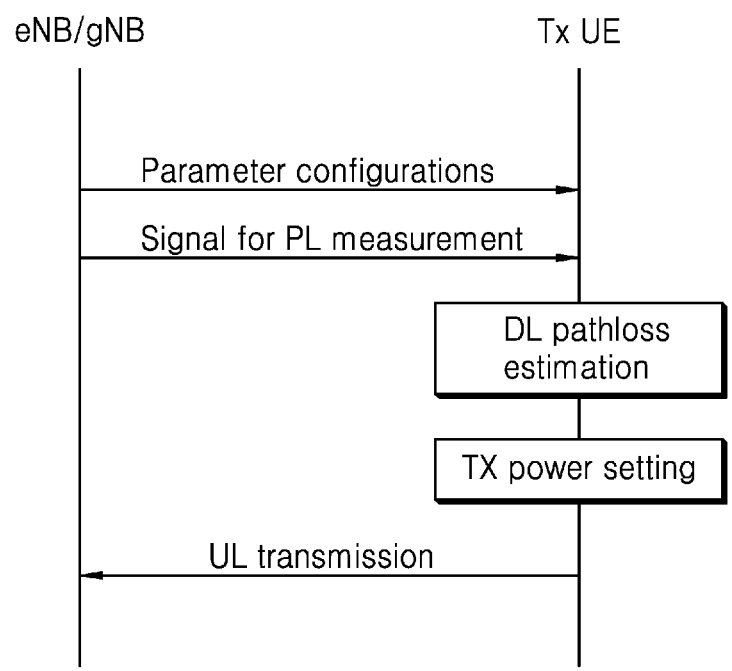
FIG. 3 is a diagram for describing a method by which a user equipment (UE) estimates downlink path loss (PL) in an existing cellular system.

FIG. 3 is a diagram for describing a method by which a UE estimates a downlink path loss (PL) in an existing cellular system.

A UE TX UE may receive a parameter configuration for estimating a downlink path loss and a signal for estimating a path loss from a base station eNB/gNB. The UE TX UE may receive a path loss signal transmitted by the base station eNB/gNB for downlink path loss estimation, may measure reference signal received power (RSRP), and may measure a downlink path loss by using [Equation 1].

downlink path loss=transmission power of base station signal−RSRP measured by UE    [Equation 1]

In this case, transmission power of a base station signal may be transmission power of a signal for downlink path loss estimation transmitted by the base station, and a signaling method may vary according to a type of the signal. For example, when an estimation signal is a cell-specific reference signal (CRS), the transmission power of the base station signal may refer to transmission power of the CRS, and may be transmitted to the UE through a parameter referenceSignalPower of system information. When the estimation signal is a synchronization signal block (SSB), the transmission power of the base station signal may refer to transmission power of a demodulation reference signal (DMRS) transmitted via a physical broadcast channel (PBCH) and a secondary synchronization signal (SSS), and may be transmitted to the UE through a parameter ss-PBCH-BlockPower of the system information. When the estimation signal is a channel state information-reference signal (CSI-RS), the base station may transmit information on transmission power of the CSI-RS to the UE through a parameter powerControlOffsetSS of UE dedicated RRC information. In this case, powerControlOffsetSS may refer to a transmission power difference (offset) between the CSI-RS and the SSB.

The UE TX UE may configure a transmission power value of uplink data and control information based on an estimated downlink path loss value and may perform uplink transmission.

Figure 4:
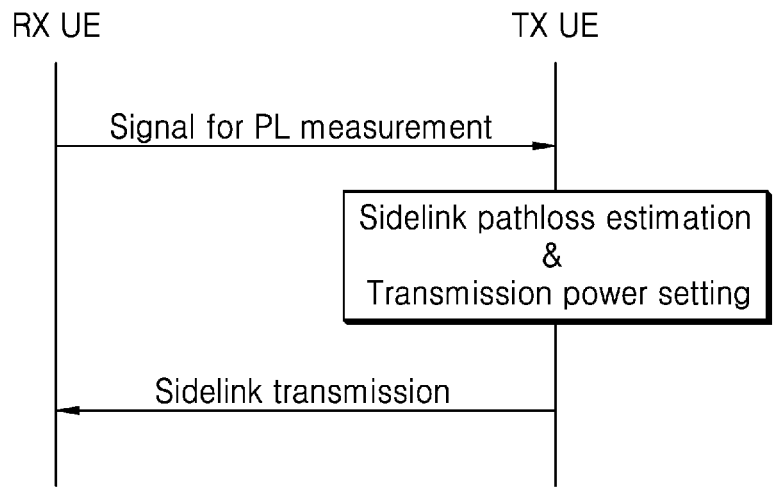
FIG. 4 is a diagram for describing a method of estimating inter-UE sidelink path loss, according to a disclosed embodiment.
Figure 4:
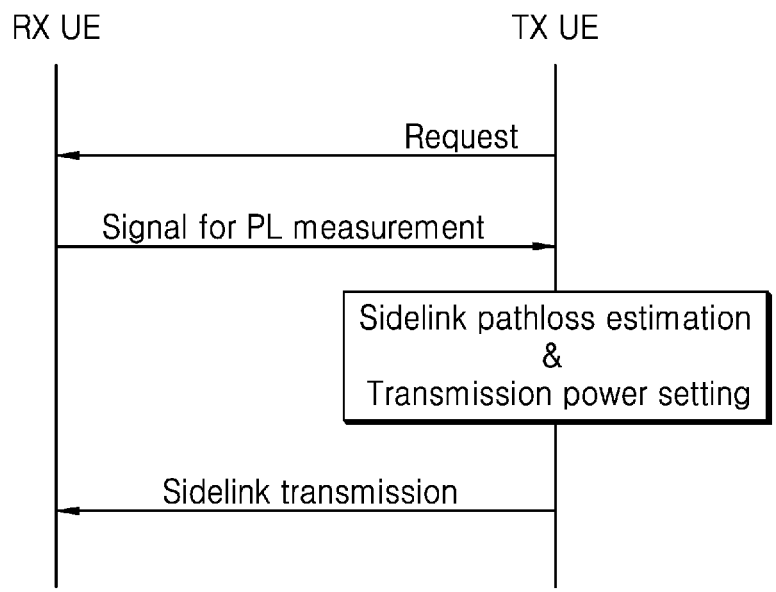

FIG. 4 is a diagram for describing a method of estimating an inter-UE sidelink path loss, according to a disclosed embodiment.

In FIG. 3, a base station eNB/gNB may be considered as a receiver that receives uplink data and control information from a UE. That is, the receiver (base station) may transmit a signal for path loss estimation and transmission power of the signal for path loss estimation to a transmitter (UE), and the transmitter (UE) may configure a transmission power value for uplink data and control information transmission based on a path loss value estimated by the transmitter (UE) and may perform uplink transmission to the receiver (base station).

A similar operation may be used for inter-UE sidelink path loss estimation. For example, as shown in (a) of FIG. 4, a reception (RX) UE may transmit a signal for sidelink path loss estimation and information on transmission power to a transmission (TX) UE, and the TX UE may estimate a sidelink path loss value by using the signal and the information. The RX UE may configure transmission power of sidelink data and control information based on the estimated path loss value, and may perform sidelink transmission to the TX UE. In more detail, in (a) of FIG. 4, the RX UE may transmit a signal for path loss estimation and information on transmission power of the signal to the TX UE. The TX UE may receive the signal for path loss estimation, may measure RSRP, and may estimate a path loss by using [Equation 1]. The TX UE may configure sidelink transmission power based on the estimated path loss value, and may transmit sidelink control information and data information to the RX UE.

As shown in (b) of FIG. 4, the RX UE may transmit a signal for path loss estimation in response to a request of the TX UE. In (b) of FIG. 4, the TX UE may transmit a request for transmission of a signal for path loss estimation to the RX UE, and the RX UE receiving the request may transmit the signal for path loss estimation to the TX UE. In this case, the RX UE may transmit information on transmission power of the signal for path loss estimation to the TX UE. The TX UE may measure RSRP through the signal for path loss estimation and may estimate a path loss by using [Equation 1]. The TX UE may configure sidelink transmission power based on the estimated path loss value, and may transmit sidelink control information and data information to the RX UE.

In the present disclosure, a TX UE does not refer to a UE that transmits a signal for path loss estimation, but refers to a UE that transmits sidelink data and control information. Also, an RX UE does not refer to a UE that receives a signal for path loss estimation, but refers to a UE that receives sidelink data and control information.

Figure 5:
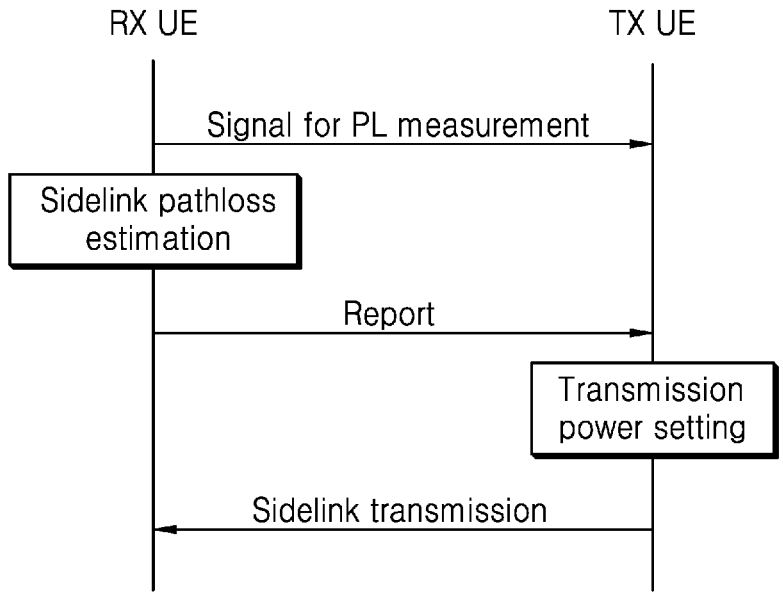
FIG. 5 is a diagram for describing a method of estimating inter-UE sidelink path loss, according to another disclosed embodiment.
Figure 5:
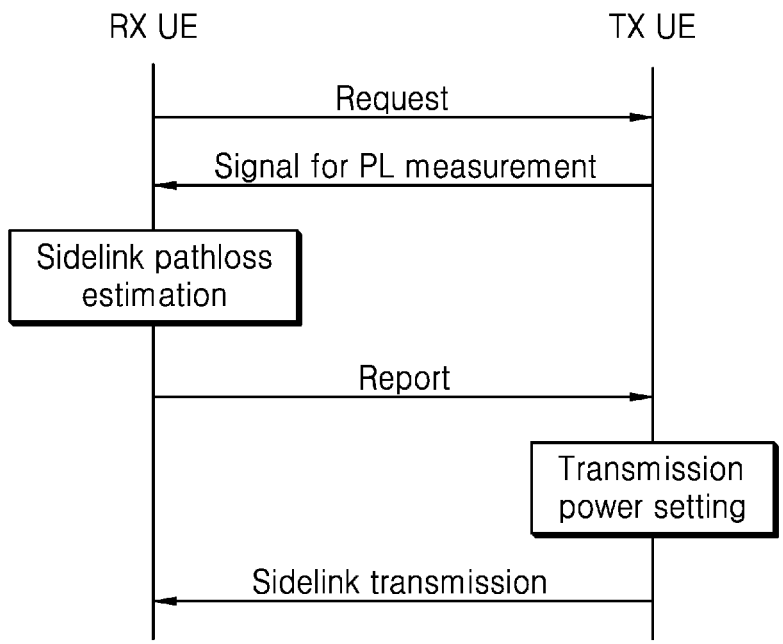

FIG. 5 is a diagram illustrating a method of estimating an inter-UE sidelink path loss, according to another disclosed embodiment.

Unlike in FIG. 4, in FIG. 5, a TX UE transmits a signal for path loss estimation, and an RX UE estimates a path loss. Like in FIG. 4, in FIG. 5, a signal for path loss estimation transmitted by the TX UE may be transmitted without a request of the RX UE ((a) of FIG. 5), or may be transmitted in response to a request of the TX UE ((b) of FIG. 5). In more detail, in (a) of FIG. 5, the TX UE may transmit a signal for path loss estimation to the RX UE and may transmit information on transmission power of the signal. The RX UE may measure RSRP by using the signal for path loss estimation and may estimate a path loss by using [Equation 1]. The RX UE may report information on the path loss value estimated by the RX UE to the TX UE. The TX UE may configure sidelink transmission power based on the information on the path loss value reported from the RX UE, and may transmit sidelink control information and data information to the RX UE.

In (b) of FIG. 5, the RX UE may transmit a request for transmission of a signal for path loss estimation to the TX UE, and the TX UE receiving the request may transmit the signal for path loss estimation to the RX UE. In this case, the TX UE may transmit information on transmission power of the signal for path loss estimation to the RX UE. The RX UE may measure RSRP through the signal for path loss estimation and may estimate a path loss by using [Equation 1]. The RX UE may report information on the path loss value estimated by the RX UE to the TX UE. The TX UE may configure sidelink transmission power based on the information on the path loss value reported from the RX UE and may transmit sidelink control information and data information to the RX UE.

A signal for path loss estimation described with reference to FIGS. 4 and 5 may include at least one of the following signals.

Sidelink synchronization signal, which refers to a signal for obtaining time/frequency synchronization of a sidelink between UEs and may include a primary sidelink synchronization signal (PSSS) and a secondary sidelink synchronization signal (SSSS). In path loss estimation, only one of the PSSS and the SSSS may be used, or both the PSSS and the SSSS may be used. When only of the two signals is used, UEs may be pre-configured with information on which signal from among the PSSS and the SSSS is to be used to estimate a path loss. When both the PSSS and the SSSS are used, a UE receiving a path loss signal may measure RSRP by using a time/frequency average value of the PSSS and the SSSS.

Demodulation reference signal (DMRS) transmitted via a sidelink broadcast channel, similar to a broadcast channel (a physical broadcast channel (PBCH)) transmitted by a base station to a UE in a general cellular communication, a sidelink broadcast channel (a physical sidelink broadcast channel (PSBCH)) for transmitting master information for sidelink communication may exist in inter-UE communication. In this case, a DMRS may exist in the PSBCH for channel estimation to demodulate and decode the PSBCH. UEs may measure RSRP by using the DMRS and may estimate a path loss value. In this case, a transmission power value of the PSBCH may be a fixed value, and all sidelink UEs may be configured with the transmission power value of the PSBCH from a base station through RRC signaling, or may be pre-recognized (pre-configured) in the absence of the base station. The same transmission power as that of a PSSS/SSSS may be used as the transmission power value of the PSBCH, or the transmission power value of the PSBCH may have a fixed offset value and a transmission power value of the PSSS/SSSS. When the base station configures the transmission power value of the PSBCH, the base station may configure the transmission power value of the PSSS/SSSS in a UE, and the UE may calculate the transmission power value of the PSBCH by using the fixed offset value. Alternatively, the base station may configure the transmission power value of the PSSS/SSSS and the offset value through system information or a UE dedicated RRC message.

DMRS transmitted via a sidelink control channel or data channel, a sidelink TX UE may transmit a sidelink control channel (a physical sidelink control channel (PSCCH)) or a sidelink data channel (a physical sidelink shared channel (PSSCH)) to a sidelink RX UE. In this case, a DMRS may exist in each of the PSCCH and the PSSCH, and the sidelink RX UE may measure RSRP by using the DMRS. In this case, the RSRP may be measured by using only one of the DMRS of the PSCCH and the DMRS of the PSSCH, or may be measured by using both the DMRS of the PSCCH and the DMRS of the PSSCH. When the RSRP is measured by using only one, information on which channel's DMRS from among the two is to be used may be pre-defined. When both the DMRS transmitted via the PSCCH and the DMRS transmitted via the PSSCH are used, different RSRP measurement operations may be considered according to a multiplexing method of the PSCCH and the PSSCH. That is, the PSCCH and the PSSCH may be time-divided or frequency-divided and transmitted. When the PSCCH and the PSSCH are time-divided and transmitted, the sidelink RX UE may measure the RSRP by obtaining an average of the DMRS of the PSCCH and the DMRS of the PSSCH in a time domain. When the PSCCH and the PSSCH are frequency-divided and transmitted, the sidelink RX UE may measure the RSRP by obtaining an average of the DMRS of the PSCCH and the DMRS of the PSSCH in a frequency domain. Alternatively, the RSRP may be measured by obtaining an average in both the time domain and the frequency domain. Information on how the sidelink RX UE is to measure the RSRP (e.g., an average in the time domain, an average in the frequency domain, or an average in both the time/frequency domains) may be pre-determined, or may be notified by the sidelink TX UE to the sidelink RX UE via a PSBCH.

New reference signal for supporting a sidelink operation, a sidelink sounding reference signal (SRS), a sidelink channel state information-reference signal (CSI-RS), or a sidelink phase tracking reference signal (PTRS) may be defined for a purpose similar to that of existing cellular communication.

Figure 6:
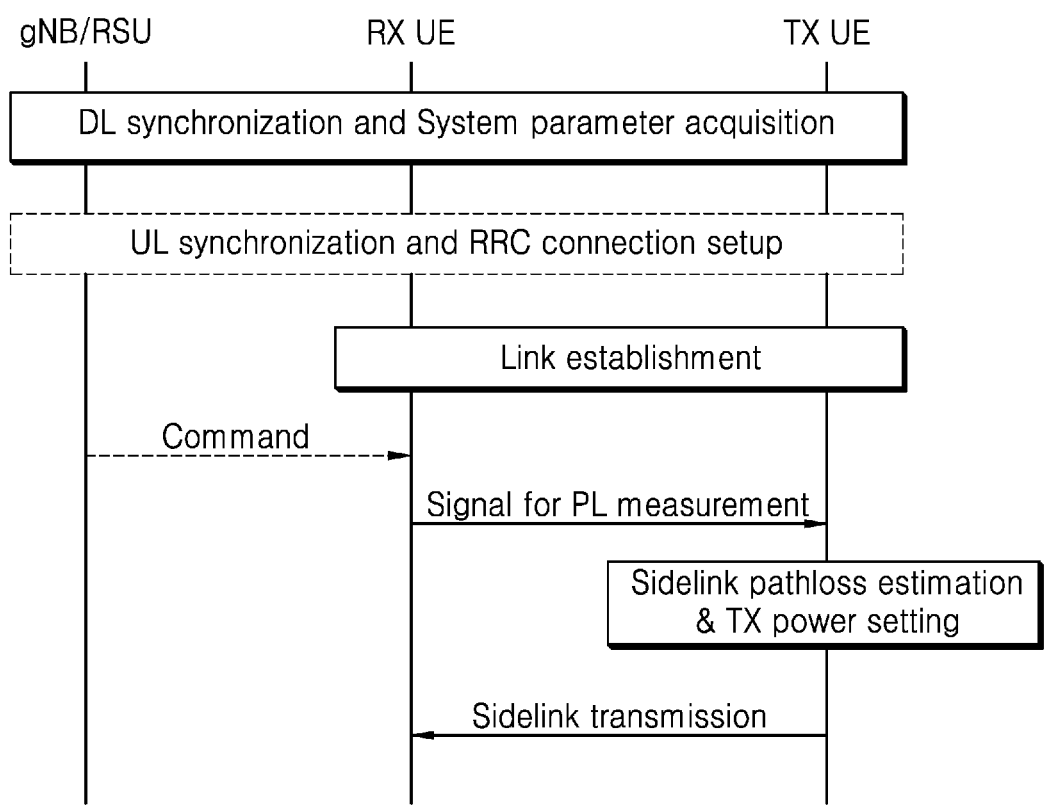
FIG. 6 is a diagram for describing a method of transmitting and receiving a path loss measurement signal to estimate sidelink path loss, according to a disclosed embodiment.

FIG. 6 is a diagram for describing a method of transmitting and receiving a path loss measurement signal to estimate a sidelink path loss, according to a disclosed embodiment.

FIG. 6 is a detailed diagram illustrating a process of (a) of FIG. 4. In the present disclosure, a base station may be a base station that supports both V2X communication and general cellular communication, or a road side unit (RSU) that supports only V2X communication. Accordingly, unless otherwise specified in the present disclosure, the base station and the RSU may be used for the same concept and may be interchangeably used.

Also, in FIG. 6, UL synchronization and RRC connection setup and command are each marked by a dashed line. In the present disclosure, a procedure or an operation marked by a dashed line may be an optional procedure or an optional operation. That is, a procedure or an operation marked by a dashed line may be performed or may not be performed. This is the same not only in FIG. 6 but also in other drawings below.

V2X UEs in coverage of the base station may perform downlink synchronization and may obtain system information. In this case, the downlink synchronization may be performed through a primary synchronization signal/secondary synchronization signal (PSS/SSS) received from the base station, or may be performed through a synchronization signal received from a global navigation satellite system (GNSS). The V2X UEs performing the downlink synchronization may obtain system information related to V2X through a V2X dedicated system information block (SIB) transmitted by the base station gNB/RSU. Also, the V2X UEs in the coverage may perform uplink synchronization through a random access procedure with the base station and may perform an RRC connection procedure. In this case, the uplink synchronization and the RRC connection procedure may be performed by only one of a transmission UE or a reception UE, or may be performed by both the transmission UE and the reception UE.

Information on which UE from among the transmission UE and the reception UE is to perform the uplink synchronization and the RRC connection procedure may vary according to a transmission mode of sidelink control information/data information, a sidelink path loss estimation procedure, a signaling method, etc. For example, as shown in FIG. 6, in a mode in which the base station transmits a command for transmission of a path loss signal to a V2X reception UE, the reception UE may have to perform the uplink synchronization and the RRC connection procedure with the base station. Also, as shown in FIG. 7, in a mode in which the base station transmits a command for transmission of a path loss signal to a V2X transmission UE, the transmission UE may have to perform the uplink synchronization and the RRC connection procedure with the base station.

Figure 7:
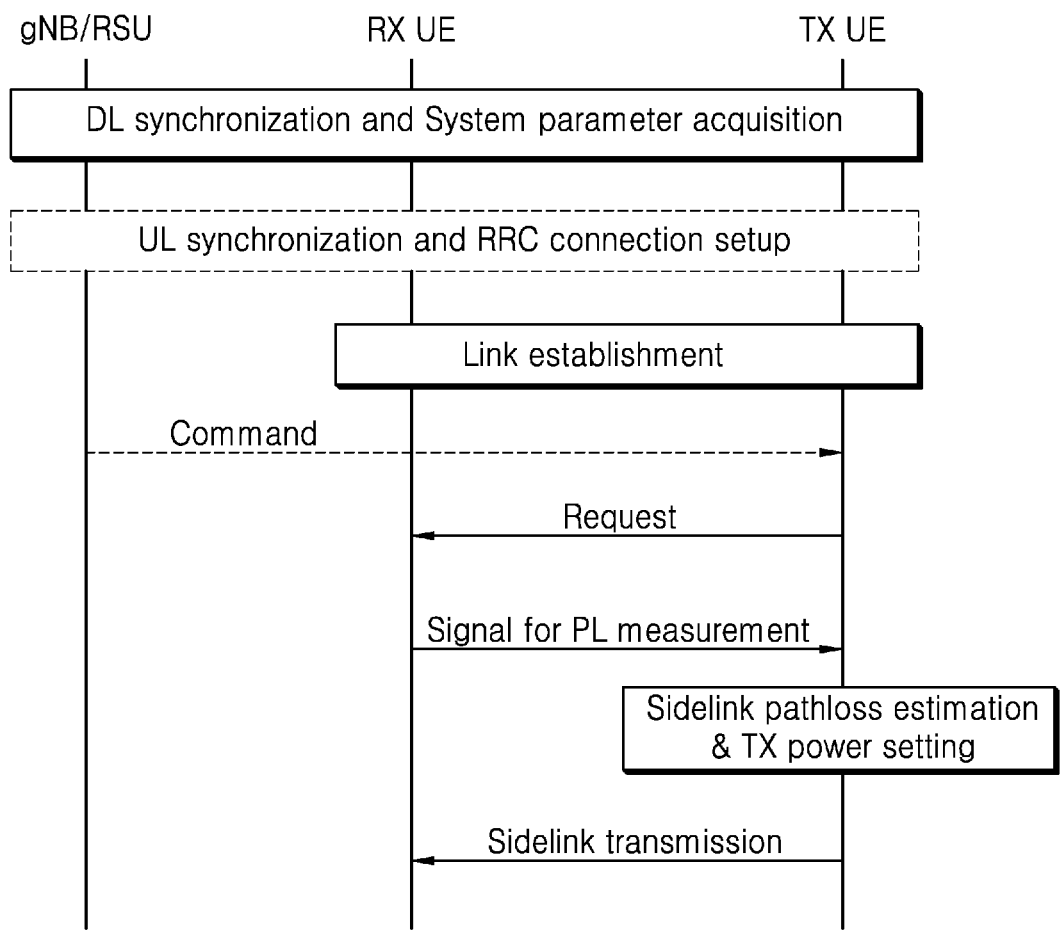
FIG. 7 is a diagram for describing a method of transmitting and receiving a path loss measurement signal to estimate sidelink path loss, according to another disclosed embodiment.

Although not shown in FIGS. 6 and 7, when the base station transmits a command for transmission of a path loss signal to the V2X reception UE and transmits a command for reception of a path loss signal to the V2X transmission UE, both the reception UE and the transmission UE may have to perform the uplink synchronization and the RRC connection procedure with the base station according to a signaling method. For example, when a command of the base station is transmitted to the V2X transmission UE and the V2X reception UE through downlink control information (DCI), a medium access control control element (MAC CE), or a UE dedicated RRC message, the V2X transmission UE and the V2X reception UE may perform the uplink synchronization and the RRC connection procedure with the base station. When a command of the base station is transmitted to the V2X transmission UE and the V2X reception UE through V2X system information, the V2X transmission UE and the V2X reception UE may not perform the uplink synchronization and the RRC connection procedure with the base station.

In FIG. 6, a reception UE may refer to a UE that receives sidelink control information and data information, and a transmission UE may refer to a UE that transmits sidelink control information and data information. Accordingly, the reception UE and the transmission UE in FIG. 6 may not be related to transmission and reception of a path loss signal.

A V2X transmission UE or a V2X reception UE performing downlink synchronization or uplink synchronization and RRC connection configuration with the base station may perform sidelink configuration for unicast communication. The unicast link configuration may be performed in a higher layer (e.g., an application layer), and as shown in FIG. 6, the unicast link configuration may be performed between the V2X transmission UE that is to transmit V2X control information/data information in a unicast method and the V2X reception UE that is to receive the V2X control information/data information in the unicast method. Also, although not shown in FIG. 6, the base station may engage in the unicast link configuration. For example, the V2X transmission UE may transmit a request for the unicast link configuration to the base station, and the base station may transmit a response to the request to the V2X reception UE. Also, the base station may transmit a confirmation for the unicast link configuration to the V2X transmission UE and the V2X reception UE. However, as described above, because this procedure may be performed in the higher layer, the procedure may not be recognized by a physical layer and a MAC layer.

As shown in FIG. 6, the base station may transmit a command for transmission of a signal for path loss estimation to the V2X reception UE. In this case, the command of the base station may be transmitted to the V2X reception UE through UE-specific DCI (or group common DCI) for a sidelink or through a MAC CE or a UE-specific RRC message. When the command for transmission of the signal for path loss estimation is transmitted through the UE-specific DCI or the group common DCI from the base station, the DCI may use a radio network temporary identifier (RNTI) different from UE-specific DCI or group common DCI used in existing cellular communication for distinguishment from existing cellular communication.

Also, unlike in FIG. 6, the V2X reception UE may transmit the signal for path loss estimation to the V2X transmission UE after unicast link configuration without the command of the base station. For example, the V2X reception UE may start a timer at a point of time when a request for unicast link configuration is received from the base station or the V2X transmission UE or at a point of time when the unicast link configuration succeeds, and may transmit the signal for path loss estimation to the V2X transmission UE at a point of time when the timer expires. Likewise, the V2X transmission UE may start a timer from a point of time when a request for unicast link configuration is transmitted or from a point of time when the unicast link configuration succeeds, and may expect to receive the signal for path loss estimation from the V2X reception UE at a point of time when the timer expires. In another example, the V2X reception UE may transmit the signal for path loss estimation after a certain period of time (e.g., after [x] subframes, [x] slots, or [x] ms) from a point of time when unicast link configuration succeeds. Likewise, the V2X transmission UE may receive the signal for path loss estimation after a certain period of time (e.g., [x] subframes, [x] slots, or [x] ms) from a point of time when unicast link configuration succeeds.

In another example where the V2X reception UE transmits the signal for path loss estimation without the command of the base station, when an RSRP value measured by the V2X reception UE with the base station is equal to or greater than (or greater than) a specific threshold value configured by the base station or is equal to or less than (or less than) a specific threshold value, the V2X reception UE may transmit the signal for path loss estimation to the V2X transmission UE. In this case, the base station may configure the RSRP threshold value in the V2X reception UE through a system transmission block for V2X (V2X SIB) or a UE-specific RRC/common RRC message for V2X. In another example, when a variation of the RSRP value with the base station is equal to or greater than (or greater than) a specific threshold value configured by the base station, the V2X reception UE may transmit the signal for path loss estimation to the V2X transmission UE. Although the V2X reception UE satisfies a condition for the RSRP threshold value configured by the base station, when the base station sends a command for stopping transmitting the signal for path loss estimation, the V2X reception UE may stop transmitting the signal for path loss estimation.

In another example where the V2X reception UE transmits the signal for path loss estimation without the command of the base station, when a modulation order of V2X data information received by the V2X reception UE is equal to or less than, or less than a certain level, the V2X reception UE may transmit the signal for path loss estimation. For example, when the modulation order of the V2X data information received by the V2X reception UE is equal to or less than 16-quadrature amplitude modulation (QAM) (or is quadrature phase-shift keying (QPSK) less than 16-QAM), the V2X reception UE may transmit the signal for path loss estimation to the V2X transmission UE. In another example, when a transport block (TBS) size of the V2X data information received by the V2X reception UE is equal to or greater than, or greater than specific bits, the V2X reception UE may transmit the signal for path loss estimation to the V2X transmission UE. For example, when the TBS size of the received V2X data information is equal to or greater than (or greater than) y bits, the V2X reception UE may transmit the signal for path loss estimation to the V2X transmission UE. In another example, when an aggregation level of a V2X control channel received by the V2X reception UE is equal to or greater than, or greater than a certain level, the V2X reception UE may transmit the signal for path loss estimation (e.g., when the aggregation level is equal to or greater than 8, or is equal to 16 that is greater than 8).

In another example where the V2X reception UE transmits the signal for path loss estimation without the command of the base station to the V2X transmission UE, when an RSRP value of a sidelink channel previously measured by the V2X reception UE is equal to or greater than (or greater than) a specific threshold value configured by the base station, or is equal to or less than (or less than) a specific threshold value, the V2X reception UE may transmit the signal for path loss estimation to the V2X transmission UE. In this case, the base station may configure the RSRP threshold value of the sidelink channel in the V2X reception UE through a system transmission block for V2X (V2X SIB) or a UE-specific RRC/common RRC message for V2X. In this case, when the RSRP value of the sidelink channel satisfies a specific threshold value condition configured by the base station at least once, the V2X reception UE may transmit the signal for path loss estimation to the V2X transmission UE. Alternatively, when the RSRP value of the sidelink channel satisfies the specific threshold value condition configured by the base station X times (or more), the V2X reception UE may transmit the signal for path loss estimation to the V2X transmission UE. In this case, X may be pre-defined, or may be configured by the base station. In another example, when a variation of the RSRP value of the sidelink channel is equal to or greater than (or greater than) a specific threshold value configured by the base station, the V2X reception UE may transmit the signal for path loss estimation to the V2X transmission UE. Even when the V2X reception UE satisfies a condition for the RSRP threshold value of the sidelink channel, which is configured by the base station, when the base station transmits a command for stopping transmitting the signal for path loss estimation, the V2X reception UE may stop transmitting the signal for path loss estimation. In another example, a threshold value for the RSRP value of the sidelink channel or the variation of the RSRP value of the sidelink channel may be pre-configured without signaling from the base station.

In the above examples where the V2X reception UE transmits the signal for path loss estimation, V2X reception UEs may refer to UEs having a capability to transmit a signal for V2X path loss estimation. Accordingly, from among UEs having the capability, V2X reception UEs satisfying the above conditions may transmit the signal for path loss estimation.

As shown in FIG. 6, the base station may transmit a command for transmission of the signal for path loss estimation to the V2X reception UE, and in this case, whether the V2X reception UE is capable of transmitting the signal for path loss estimation may be a V2X UE capability. That is, the base station may identify V2X UEs having a capability to transmit the signal for path loss estimation through a capability negotiation procedure with the V2X UEs, and may transmit the command for transmission of a signal for V2X path loss estimation only to UEs having a capability to transmit the signal for V2X path loss estimation. In this case, the command of the base station may be transmitted to the V2X reception UE through UE-specific DCI (or group common DCI) for a sidelink or through a UE-specific RRC message. The V2X reception UE receiving the command for transmission of the signal for path loss estimation may transmit the signal for path loss estimation to the V2X transmission UE. Alternatively, when the above condition is satisfied without the command of the base station (e.g., expiration of a timer, RSRP with the base station, or a modulation order), V2X reception UEs having a capability to transmit the signal for path loss estimation may transmit the signal for path loss estimation to the V2X transmission UE. In this case, the V2X transmission UE may obtain information on transmission power of the signal for path loss estimation by using at least one of the following various methods.

A method of transmitting information on transmission power of a signal for path loss estimation according to an embodiment will be described below.

Base station transmits information on transmission power of a signal for path loss estimation to a V2X transmission UE through RRC signaling A base station may transmit information on transmission power of a signal for path loss estimation to a V2X transmission UE through RRC signaling. In detail, the base station may transmit transmission power information of the signal for path loss estimation to all V2X UEs in cell coverage through a V2X dedicated system information block V2X SIB. In this case, the V2X transmission UE may receive the information even when there is no RRC connection configuration with the base station. In another example, the base station may transmit the information on the transmission power of the signal for path loss estimation transmitted by a V2X reception UE to the V2X transmission UE through UE dedicated RRC or UE common RRC signaling. In this case, the V2X transmission UE may have to perform RRC connection configuration with the base station. As described above, when the V2X transmission UE directly receives the information on the transmission power of the signal for path loss estimation from the base station, the V2X reception UE may not transmit the information on the transmission power of the signal for path loss estimation to the V2X transmission UE.

A V2X system may support at least two modes according to whether the V2X transmission UE performs RRC connection configuration: mode (Mode A) in which the V2X transmission UE may operate without RRC connection configuration, and mode (Mode B) in which the V2X transmission UE may operate only with RRC connection configuration. In Mode A and Mode B, the V2X reception UE may operate even with no RRC connection. A new mode may be defined in the V2X system (Mode C), and in Mode C, both the V2X transmission UE and the reception UE may operate only with the RRC connection configuration. Information on which mode from among the above modes is to be used may be notified by the base station to all V2X UEs existing in coverage of the base station through system information. In another example, each mode may be mapped to a resource pool or a resource of the V2X system. That is, a resource or a resource pool for Mode A, a resource or a resource pool for Mode B, and a resource or a resource pool for Mode C may exist, and each UE may derive which mode is to be used to operate from a time/frequency resource or resource pool received from the base station.

V2X reception UE transmits information on transmission power of a signal for path loss estimation to a V2X transmission UE via a sidelink broadcast channel A V2X reception UE may transmit information on transmission power of a signal for path loss estimation to a V2X transmission UE via a sidelink broadcast channel. In this case, the information on the transmission power transmitted by the V2X reception UE may be information received from a base station. For example, as shown in (b) of FIG. 1, a scenario in which the V2X reception UE exists in coverage of the base station and the V2X transmission UE exists out of the coverage of the base station may be considered. In this situation, the V2X transmission UE may not receive system information and RRC information from the base station. Accordingly, the V2X reception UE existing in the coverage of the base station may transmit the information on the transmission power of the signal for path loss estimation through a sidelink broadcast channel so that the V2X transmission UE existing out of the coverage of the base station estimates a sidelink path loss.

In another example, as shown in (d) of FIG. 1, the V2X reception UE and the V2X transmission UE may exist in different cells. That is, a V2X reception UE UE-1 may exist in coverage of a base station 1, and a V2X transmission UE UE-2 may exist in coverage of a base station 2. In this case, the V2X reception UE UE-1 existing in the coverage of the base station 1 may transmit the information on the transmission power of the signal for path loss estimation to the V2X transmission UE UE-2 existing in the coverage of the base station 2 via a sidelink broadcast channel.

The V2X reception UE may transmit transmission power information determined by the V2X reception UE itself via a sidelink broadcast channel, without the information on the transmission power received from the base station, to a V2X transmission UE out of cell coverage ((b) of FIG. 1) or to a V2X transmission UE located in a different cell ((d) of FIG. 1).

V2X reception UE transmits information on transmission power of a signal for path loss estimation to a V2X transmission UE via a sidelink control channel A V2X reception UE may transmit information on transmission power of a signal for path loss estimation to a V2X transmission UE via a sidelink control channel. In this case, the V2X reception UE may re-transmit the information on the transmission power received from a base station to the V2X transmission UE, or may transmit transmission power information determined (or pre-configured) by the V2X reception UE itself to the V2X transmission UE via the sidelink control channel without the information on the transmission power received from the base station. In this case, the V2X transmission UE may be located in the same base station (or RSU) as the V2X reception UE, may be located in a different base station from the V2X reception UE, or may exist out of coverage of the base station.

V2X reception UE transmits information on transmission power of a signal for path loss estimation to a V2X transmission UE via a sidelink data channel A V2X reception UE may transmit information on transmission power of a signal for path loss estimation to a V2X transmission UE through a MAC CE transmitted via a sidelink data channel. The V2X reception UE may re-transmit the information on the transmission power received from a base station, or may transmit transmission power information determined (or pre-configured) by the V2X reception UE itself to the V2X transmission UE via the sidelink data channel without the information on the transmission power received from the base station. In this case, the V2X transmission UE may be located in the same base station as the V2X reception UE, may be located in a different base station from the V2X reception UE, or may exist out of coverage of the base station.

The V2X reception UE may transmit the information on the transmission power of the signal for path loss estimation to the V2X transmission UE through at least one of the above embodiments. In this case, there may be various methods of configuring transmission power information of the signal for path loss estimation. When the V2X reception UE transmits the information on the transmission power of the signal for path loss estimation to the V2X transmission UE, the V2X reception UE may configure transmission power information of the signal for path loss estimation through at least one of the following embodiments.

A method of configuring the information on the transmission power of the signal for path loss estimation according to an embodiment will be described below.

Information on transmission power is directly transmitted

Transmission power of a signal for path loss estimation may be transmitted through [x] bits. For example, the transmission power of the signal for path loss estimation may be displayed in a range from −60 dBm to 50 dBm by a 1 dBm. Accordingly, in the above example, information on the transmission power of the signal for path loss estimation may be transmitted through 7 bits.

A method of configuring the information on the transmission power of the signal for path loss estimation may vary according to locations or environments of the V2X transmission UE and the V2X reception UE as follows.

When the V2X transmission UE and the V2X reception UE exist in coverage of the same base station, the V2X transmission UE and the V2X reception UE may receive [x] bits that is a transmission power value of a reference signal through system information or RRC signaling from the same base station. When transmission power information is transmitted to the V2X transmission UE through system information or common RRC signaling, the V2X reception UE may not transmit the information on the transmission power of the signal for path loss estimation to the V2X transmission UE.

When the V2X reception UE and the V2X transmission UE exist in coverages of different base stations or when the V2X reception UE exists in coverage of the base station and the V2X transmission UE exists out of the coverage of the base station, the V2X reception UE may transmit transmission power information of the signal for path loss estimation including [x] bits to the V2X transmission UE via at least one of a sidelink broadcast channel, a sidelink control channel, or a sidelink data channel.

The base station may transmit an explicit or implicit command for transmission of the transmission power information of the signal for path loss estimation including [x] bits by the V2X reception UE via at least one of a sidelink broadcast channel, a sidelink control channel, or a sidelink data channel. In the case of the explicit command, the base station may command through a 1-bit indication to transmit the transmission power information of the signal for path loss estimation through DCI or UE-specific RRC signaling transmitted to the V2X reception UE. In the case of the implicit command, the base station may command by differently configuring parameters for transmission of a path loss signal in the V2X reception UE. For example, the base station may differently configure a signal for path loss estimation transmitted for path loss estimation with a V2X transmission UE out of cell coverage and a signal for path loss estimation transmitted for path loss estimation with a V2X transmission UE in the same cell coverage (e.g., different sequence indexes, different transmission resources, etc.). Also, the base station may differently configure a signal for path loss estimation transmitted for path loss estimation with a V2X transmission UE located in a difference cell from a V2X reception UE and a signal for path loss estimation transmitted for path loss estimation with a V2X transmission UE located in the same cell (e.g., different sequence indexes or index groups, different transmission resources, etc.).

Offset information for transmission power is transmitted

As in the above embodiment, when information on transmission power is directly transmitted, full information on transmission power of a signal for path loss estimation is notified, thereby resulting in signaling overhead. In particular, when [x]-bit information is transmitted via a sidelink broadcast channel or a sidelink control channel, signaling overhead may increase. In order to solve these problems, a method of determining a reference signal and transmitting only offset information with respect to a transmission power value of the reference signal may be considered. In this case, the reference signal may be a synchronization signal of a 5G or NR base station (gNB), a DMRS transmitted via a broadcast channel (PBCH) of the gNB, or a CSI-RS of the 5G or NR base station (gNB). In another example, the reference signal may be a synchronization signal of a 4G or LTE base station (eNB), a DMRS transmitted via a broadcast channel of the 4G or LTE base station (eNB), or a CRS of the 4G or LTE base station (eNB). In another example, the reference signal may be a sidelink synchronization signal transmitted via a sidelink or a DMRS transmitted via a sidelink broadcast channel. In another example, the reference signal may be a DMRS transmitted via a sidelink control channel.

When a reference signal is a synchronization signal of a 5G or NR base station (gNB), a DMRS transmitted via a broadcast channel (PBCH) of the 5G or NR base station (gNB), or a CSI-RS of the gNB, an operation may vary according to locations and environments of the V2X transmission UE and the V2X reception UE as follows.

When the V2X transmission UE and the V2X reception UE exist in coverage of the same base station, the V2X transmission UE and the V2X reception UE may receive a transmission power value of a reference signal through system information or RRC signaling from the same base station. In this case, the system information and the common RRC signaling may be signaling for supporting general 4G cellular communication, instead of for V2X. Offset information may be transmitted through V2X dedicated system information or common RRC signaling for supporting V2X. When the offset information is transmitted to the V2X transmission UE through the V2X dedicated system information or the RRC signaling for supporting V2X, the V2X reception UE may not separately transmit information on transmission power of a signal for path loss estimation to the V2X transmission UE.

When the V2X reception UE and the V2X transmission UE exist in coverages of different base stations or when the V2X reception UE exists in coverage of the base station and the V2X transmission UE exists out of the coverage of the base station, the V2X reception UE may transmit an offset value to the V2X transmission UE via at least one of a sidelink broadcast channel, a sidelink control channel, or a sidelink data channel.

The base station may transmit an explicit or implicit command for transmission of offset information for transmission power of a signal for path loss estimation by the V2X reception UE, via at least one of a sidelink broadcast channel, a sidelink control channel, or a sidelink data channel. In the case of the explicit command, the base station may command through a 1-bit indication to transmit the offset information for the transmission power of the signal for path loss estimation, through DCI or UE-specific signaling transmitted to the V2X reception UE. In the case of the implicit command, the base station may command by differently configuring parameters for transmission of a path loss signal in the V2X reception UE. For example, the base station may differently configure a signal for path loss estimation transmitted to a V2X transmission UE existing out of cell coverage and a signal for path loss estimation transmitted to a V2X transmission UE in the same cell coverage (e.g., different sequence indexes, different transmission resources, etc.). Also, the base station may differently configure a signal for path loss estimation transmitted to a V2X transmission UE located in a different cell from a V2X reception UE and a signal for path loss estimation transmitted to a V2X transmission UE located in the same cell (e.g., different sequence indexes, different transmission resources, etc.). Through the configuration, the V2X reception UE may determine whether to transmit transmission power information of the signal for path loss estimation to the V2X transmission UE.

Likewise, when a reference signal is a synchronization signal of an eNB, a DMRS transmitted via a broadcast channel (PBCH) of the eNB, or a CRS of the eNB, an operation may vary according to locations and environments of the V2X transmission UE and the V2X reception UE as follows.

When the V2X transmission UE and the V2X reception UE exist in coverage of the same base station, the V2X transmission UE and the V2X reception UE may receive a transmission power value of a reference signal through system information or RRC signaling from the eNB. In this case, the system information and the common RRC signaling may be signaling for supporting general 4G cellular communication (including LTE-NR dual connectivity), instead of for V2X. Offset information may be transmitted through V2X dedicated system information or common RRC signaling for supporting V2X. When the offset information is directly transmitted to the V2X transmission UE through the V2X dedicated system information or the RRC signaling, the V2X reception UE may not transmit information on transmission power of a signal for path loss estimation to the V2X transmission UE.

When the V2X reception UE and the V2X transmission UE exist in coverages of different base stations or when the V2X reception UE exists in coverage of the base station and the V2X transmission UE exists out of the coverage of the base station, the V2X reception UE may transmit an offset value for transmission power of a path loss estimation signal to the V2X transmission UE via at least one of a sidelink broadcast channel, a sidelink control channel, or a sidelink data channel.

The base station may transmit an explicit or implicit command for transmission of an offset value for the transmission power of the signal for path loss estimation by the V2X reception UE, via at least one of a sidelink broadcast channel, a sidelink control channel, or a sidelink data channel. In the case of the explicit command, the base station may command through a 1-bit indication to transmit offset information for the transmission power of the signal for path loss estimation, through DCI or UE-specific RRC signaling transmitted to the V2X reception UE. In the case of the implicit command, the base station may command by differently configuring parameters for transmission of a path loss signal in the V2X reception UE. For example, the base station may differently configure a signal for path loss estimation transmitted to a V2X transmission UE out of cell coverage and a signal for path loss estimation transmitted to a V2X transmission UE in the same cell coverage (e.g., different sequence indexes, different transmission resources, etc.). Also, the base station may differently configure a signal for path loss estimation transmitted to a V2X transmission UE located in a different cell from a V2X reception UE and a signal for path loss estimation transmitted to a V2X transmission UE located in the same cell (e.g., different sequence indexes, different transmission resources, etc.).

Because there may be various references signals, information on which reference signal is to be used (e.g., a type of a reference signal to be used) may be required. This information may be transmitted along with a transmission power value of the reference signal or may be transmitted along with offset information.

As described above, the base station or the V2X reception UE may transmit a signal for path loss estimation and transmission power information of the signal for path loss estimation to the V2X transmission UE. The V2X transmission UE receiving the same may estimate a path loss value of a sidelink by using [Equation 1]. The V2X transmission UE may configure a transmission power value of a physical channel (e.g., a sidelink control channel and a sidelink data channel) via which sidelink control information and data information are transmitted based on the estimated path loss value. The V2X transmission UE may transmit the sidelink control information and data information to the V2X reception UE based on the configured transmission power value.

The above embodiments may be similarly or identically applied to a groupcast communication method. For example, in a groupcast communication method, there may exist a group header functioning as a base station managing communication in a group. Because group headers function as base stations, V2X UEs may obtain a path loss value and may configure a transmission power value based on the path loss value.

FIG. 7 is a diagram for describing a method of transmitting and receiving a path loss measurement signal to estimate a sidelink path loss, according to another disclosed embodiment.

FIG. 7 may correspond to a detailed embodiment of (b) of FIG. 4. V2X UEs in coverage of a base station may perform downlink synchronization and may obtain system information. In this case, the downlink synchronization may be performed through a primary synchronization signal/secondary synchronization signal (PSS/SSS) received from the base station, or may be performed through a synchronization signal received from a global navigation satellite system (GNSS). The V2X UEs performing the downlink synchronization may obtain system information related to V2X through a V2X dedicated system information block (SIB) transmitted by the base station gNB/RSU. Also, the V2X UEs in the coverage may perform uplink synchronization through a random access procedure with the base station and may perform an RRC connection procedure. In this case, the uplink synchronization and the RRC connection procedure may be performed by only one of a transmission UE or a reception UE, or may be performed by both the transmission UE and the reception UE.

Information on which UE from among the transmission UE and the reception UE is to perform the uplink synchronization and the RRC connection procedure may vary according to a transmission mode of sidelink control information/data information, a sidelink path loss estimation procedure, a signaling method, etc. For example, as shown in FIG. 6, in a mode in which the base station transmits a command for transmission of a path loss signal to a V2X reception UE, the reception UE may have to perform the uplink synchronization and the RRC connection procedure with the base station. Also, as shown in FIG. 7, in a mode in which the base station transmits a command for transmission of a path loss signal to a V2X transmission UE, the transmission UE may have to perform the uplink synchronization and the RRC connection procedure with the base station.

Although not shown in FIGS. 6 and 7, when the base station transmits a command for transmission of a path loss signal to the V2X reception UE and transmits a command for reception of a path loss signal to the V2X transmission UE, both the reception UE and the transmission UE may have to perform the uplink synchronization and the RRC connection procedure with the base station according to a signaling method. For example, when a command of the base station is transmitted to the V2X transmission UE and the V2X reception UE through downlink control information (DCI), a MAC CE, or a UE dedicated RRC message, the V2X transmission UE and the V2X reception UE may perform the uplink synchronization and the RRC connection procedure with the base station. When a command of the base station is transmitted to the V2X transmission UE and the V2X reception UE through V2X system information, the V2X transmission UE and the V2X reception UE may not perform the uplink synchronization and the RRC connection procedure with the base station.

In FIG. 7, a reception UE may refer to a UE that receives sidelink control information and data information, and a transmission UE may refer to a UE that transmits sidelink control information and data information. Accordingly, the reception UE and the transmission UE in FIG. 7 may not be related to transmission and reception of a path loss signal.

A V2X transmission UE or a V2X reception UE performing downlink synchronization or uplink synchronization and RRC connection configuration with the base station may perform sidelink configuration for unicast communication. Such unicast link configuration may be performed in a higher layer (e.g., an application layer), and as shown in FIG. 7, the unicast link configuration may be performed between the V2X transmission UE that is to transmit V2X control information/data information in a unicast method and the V2X reception UE that is to receive the V2X control information/data information in the unicast method. Also, although not shown in FIG. 7, the base station may engage in the unicast link configuration. For example, the V2X transmission UE may transmit a request for the unicast link configuration to the base station, and the base station may transmit a response to the unicast link configuration to the V2X reception UE. Also, the base station may transmit a confirmation for the unicast link configuration to the V2X transmission UE and the V2X reception UE. However, as described above, because this procedure may be performed in the higher layer, the procedure may not be identified in a physical layer and a MAC layer.

As shown in FIG. 7, the base station may transmit a command for a transmission request of a signal for path loss estimation to the V2X transmission UE. In this case, the command of the base station may be transmitted to the V2X transmission UE through UE-specific DCI (or group common DCI) for a sidelink or through a MAC CE or a UE-specific RRC message. When the command is transmitted to the V2X transmission UE through the UE-specific DCI or the group common DCI, the DCI may use a radio network temporary identifier (RNTI) different from UE-specific DCI or group common DCI used in existing cellular communication for distinguishment from existing cellular communication.

Also, a command transmitted by the base station to the V2X reception UE in FIG. 6 and a command transmitted by the base station to the V2X transmission UE in FIG. 7 may be transmitted through different UE-specific DCI (or group common DCI), MAC CEs, or UE-specific RRC. In this case, the different UE-specific DCI (or group common DCI) may be different DCI formats. Also, the different MAC CEs may refer to different MAC CE formats. The V2X transmission UE receiving the command from the base station may transmit a request for transmission of a signal for path loss estimation to the V2X reception UE. The V2X reception UE receiving the request may transmit the signal for path loss estimation to the V2X transmission UE. In this case, the request for transmission of the signal for path loss estimation may be explicitly or implicitly performed. In the case of the explicit request, the V2X transmission UE may use a bit field for requesting to transmit the signal for path loss estimation in sidelink control information (SCI) transmitted via a sidelink control channel. The implicit request may be performed when the V2X reception UE receives a specific signal from the V2X transmission UE. For example, the V2X transmission UE may transmit a sidelink synchronization signal, and the V2X reception UE receiving the sidelink synchronization signal may transmit the signal for path loss estimation to the V2X transmission UE.

Also, unlike in FIG. 7, the V2X transmission UE may transmit a request for transmission of the signal for path loss estimation to the V2X reception UE after unicast link configuration without the command of the base station. For example, the V2X transmission UE may start a timer from a point of time when a request for unicast link configuration is received or from a point of time when the unicast link configuration succeeds, and may transmit the request of the signal for path loss estimation to the V2X reception UE at a point of time when the timer expires. Likewise, the V2X reception UE may start a timer from a point of time when a request for unicast link configuration is transmitted or from a point of time when the unicast link configuration succeeds, and may expect to receive the request for transmission of the signal for path loss estimation from the V2X transmission UE at a point of time when the timer expires. In another example, the V2X transmission UE may transmit the request for transmission of the signal for path loss estimation to the V2X reception UE after a certain period of time (e.g., [x] subframes, [x] slots, or [x] ms) from a point of time when unicast link configuration succeeds. Likewise, the V2X reception UE may expect to receive the request for transmission of the signal for path loss estimation after a certain period of time (e.g., [x] subframes, [x] slots, or [x] ms) from a point of time when unicast link configuration succeeds.

In another example where the V2X transmission UE transmits the request for transmission of the signal for path loss estimation to the V2X reception UE without the command of the base station, when an RSRP value measured by the V2X transmission UE with the base station is equal to or greater than (or greater than) a specific threshold value configured by the base station or is equal to or less than (or less than) a specific threshold value, the V2X transmission UE may transmit the request for transmission of the signal for path loss estimation to the V2X reception UE. In this case, the base station may configure the RSRP threshold value in the V2X transmission UE through a system transmission block for V2X (V2X SIB) or a UE-specific RRC/common RRC message for V2X. In another example, when a variation of the RSRP value with the base station is equal to or greater than (or greater than) a specific threshold value configured by the base station, the V2X transmission UE may transmit the request for transmission of the signal for path loss estimation to the V2X reception UE. Although the V2X transmission UE satisfies a condition for the RSRP threshold value configured by the base station, when the base station sends a command for stopping transmitting the request for transmission of the signal for path loss estimation, the V2X transmission UE may stop transmitting the request for transmission of the signal for path loss estimation.

In another example where the V2X transmission UE transmits the request for transmission of the signal for path loss estimation to the V2X reception UE without the command of the base station, when a modulation order of V2X data information to be transmitted by the V2X transmission UE is equal to or greater than, or greater than a certain level, the V2X transmission UE may transmit the request for transmission of the signal for path loss estimation to the V2X reception UE. For example, when the modulation order of the V2X data information to be transmitted by the V2X transmission UE is equal to or greater than 64-QAM (or is 256-QAM greater than 64-QAM), the V2X transmission UE may transmit the request for transmission of the signal for path loss estimation to the V2X reception UE. In another example, when a transport block (TBS) size of the V2X data information to be transmitted by the V2X transmission UE is equal to or greater than, or greater than specific bits, the V2X transmission UE may transmit the request for transmission of the signal for path loss estimation to the V2X reception UE. For example, when the TBS size of the V2X data information to be transmitted is equal to or greater than (or greater than) y bits, the V2X transmission UE may transmit the request for transmission of the signal for path loss estimation to the V2X reception UE. In another example, when an aggregation level of V2X control information to be transmitted by the V2X transmission UE is equal to or less than, or less than a certain level, the V2X transmission UE may transmit the request for transmission of the signal for path loss estimation to the V2X reception UE (e.g., when the aggregation level is equal to or less than 8, or is equal to 4 that is less than 8).

In another example where the V2X transmission UE transmits the signal for path loss estimation to the V2X reception UE without the command of the base station, when an RSRP value of a sidelink channel previously measured by the V2X transmission UE is equal to or greater than (or greater than) a specific threshold value configured by the base station, or is equal to or less than (or less than) a specific threshold value, the V2X transmission UE may transmit the signal for path loss estimation to the V2X reception UE. In this case, the base station may configure the RSRP threshold value of the sidelink channel in the V2X transmission UE through a system transmission block for V2X (V2X SIB) or UE-specific RRC/common RRC message for V2X. In this case, when the RSRP value of the sidelink channel satisfies a specific threshold value condition configured by the base station at least once, the V2X transmission UE may transmit the signal for path loss estimation to the V2X reception UE. Alternatively, when the RSRP value of the sidelink channel satisfies the specific threshold value condition configured by the base station X times (or more), the V2X transmission UE may transmit the signal for path loss estimation to the V2X reception UE. In this case, X may be pre-defined, or may be configured by the base station. In another example, when a variation of the RSRP value of the sidelink channel is equal to or greater than (or greater than) a specific threshold value configured by the base station, the V2X transmission UE may transmit the signal for path loss estimation to the V2X reception UE. Even when the V2X transmission UE satisfies a condition for the RSRP threshold value of the sidelink channel, which is configured by the base station, when the base station transmits a command for stopping transmitting the signal for path loss estimation, the V2X transmission UE may stop transmitting the signal for path loss estimation. In another example, a threshold value for the RSRP value of the sidelink channel or the variation of the RSRP value of the sidelink channel may be pre-configured without signaling from the base station.

As shown in FIG. 7, the V2X reception UE receiving the request for transmission of the signal for path loss estimation from the V2X transmission UE may transmit the signal for path loss estimation to the V2X transmission UE. In this case, the V2X transmission UE may receive information on transmission power of the signal for path loss estimation from the base station or the V2X reception UE. A method of transmitting the information on the transmission power of the signal for path loss estimation may be performed in various ways as described with reference to FIG. 6. Also, a method of configuring transmission power information of the signal for path loss estimation may be performed by using one of various examples described with reference to FIG. 6. The V2X transmission UE receiving the signal for path loss estimation and the transmission power information of the signal for path loss estimation from the base station or the V2X reception UE may estimate a path loss value of a sidelink by using [Equation 1]. The V2X transmission UE may configure a transmission power value of a physical channel (e.g., a sidelink control channel and a sidelink data channel) via which sidelink control information and data information are transmitted based on the estimated path loss value. The V2X transmission UE may transmit the sidelink control information and data information to the V2X reception UE based on the configured transmission power value.

The above examples may be similarly or identically applied to a groupcast communication method. For example, in a groupcast communication method, there may exist a group header functioning as a base station managing communication in a group. Because group headers function as base stations, V2X UEs may obtain a path loss value and may configure a transmission power value based on the path loss value.

In FIG. 7, there may be a time relationship between a point of time when the V2X reception UE receives the request for transmission of the signal for path loss estimation transmitted by the V2X transmission UE and a point of time when the V2X reception UE transmits the signal for path loss estimation to the V2X transmission UE in response to the request. For example, the V2X transmission UE may include timing information on timing when the signal for path loss estimation is to be transmitted by the V2X reception UE, in request information transmitted by the V2X transmission UE. That is, the V2X transmission UE may transmit timing-related information in a bit field of sidelink control information requesting the signal for path loss estimation, by using [z] bits. In this case, a unit representing the timing information may be the number of symbols (z symbols), the number of slots (z slots), or the number of subframes (z subframes). Accordingly, the V2X reception UE receiving the timing information may transmit the signal for path loss estimation after z symbols (or z slots or z subframes) from a point of time when the bit field is received. In another example, the timing information may be fixed, and the V2X transmission UE and the V2X reception UE may use a pre-agreed value. In another example, when the V2X transmission UE and the V2X reception UE are located in the same base station, the base station may configure the timing information. In another example, the V2X transmission UE may transmit the timing information configured by the base station via a sidelink control channel, to a V2X reception UE existing out of coverage of the base station or to a V2X reception UE existing in a different base station.

Until an estimated sidelink path loss value in FIGS. 6 and 7 is reflected in transmission of actual sidelink control information and data information, there are pieces of information to be transmitted and received between the V2X reception UE and the V2X transmission UE. To transmit the pieces of information, it may be necessary to consider how to configure a transmission power value. For example, in FIG. 6, the V2X transmission UE may estimate a sidelink path loss value by using a signal for path loss estimation received from the V2X reception UE, and may configure a transmission power value of sidelink control information and data information based on the estimated sidelink path loss value. In this case, it may be necessary to consider how to configure a transmission power value of the signal for path loss estimation transmitted by the V2X reception UE to the V2X transmission UE. Also, in FIG. 7, the V2X transmission UE may transmit a request for transmission of the signal for path loss estimation to the V2X reception UE, and the V2X reception UE may transmit a signal for sidelink path loss estimation to the V2X transmission UE based on the request. In this case, it may be necessary to consider how to configure transmission power values of the request for transmission of the signal for path loss estimation transmitted by the V2X transmission UE to the V2X reception UE and the signal for sidelink path loss estimation transmitted by the V2X reception UE to the V2X transmission UE. At least one of the following embodiments may be used.

Pre-Defined Transmission Power Value is Used

A base station may configure a transmission power value through a V2X dedicated SIB or RRC signaling. In this case, the configured transmission power value may be a maximum transmission power value of a UE (e.g., Pcmax), or an arbitrary value less than the maximum transmission power value of the UE. In this case, the base station may perform configuration by considering coverage of a sidelink and interference of sidelink communication with an uplink of the base station. The transmission power value may be used for all transmissions until a sidelink path loss value is reflected in transmission power value configuration of actual sidelink control information and data information.

In another example, a transmission power value may be pre-configured without signaling from the base station. The transmission power value may be used for all transmissions until a sidelink path loss value is reflected in transmission power value configuration of actual sidelink control information and data information.

Transmission Power Value Reflecting a Sidelink Path Loss Value Estimated by Itself is Used > In FIG. 7, a V2X reception UE may receive a request for transmission of a signal for path loss estimation from a V2X transmission UE. When this procedure is used, the V2X reception UE may measure sidelink RSRP and may estimate a path loss value by using the request signal transmitted from the V2X transmission UE. In this case, a transmission power value of the request of the signal for path loss estimation, transmitted by the V2X transmission UE, may be obtained by the V2X reception UE by methods of Alt1. The V2X reception UE may configure a transmission power value of the signal for path loss estimation transmitted to the V2X transmission UE based on the path loss value estimated by the V2X reception UE itself.

Transmission Power Value Reflecting a Downlink Path Loss Value with a Base Station Estimated by Itself is Used > When a V2X reception UE exists in coverage of a base station, the V2X reception UE may measure downlink RSRP and may estimate a downlink path loss value by using an SSB or a CSI-RS of the base station. The V2X reception UE may configure a transmission power value of a signal for sidelink path loss estimation transmitted to a V2X transmission UE based on the downlink path loss value.
>
> When the V2X transmission UE exists in coverage of the base station, the V2X transmission UE may estimate a downlink path loss value with the base station (or RSU) by using an SSB or a CSI-RS of the base station. The V2X transmission UE may configure a transmission power value of transmission request information of a signal for sidelink path loss estimation transmitted to the V2X reception UE, based on the downlink path loss value with the base station.
>
> When both the V2X reception UE and the V2X transmission UE exist in coverage of the base station, the V2X reception UE may measure downlink RSRP and may estimate a path loss value by using an SSB or a CSI-RS of the base station. Also, the V2X transmission UE may estimate a downlink path loss value with the base station (or RSU) by using the SSB or the CSI-RS of the base station. In this case, in FIG. 7, the V2X transmission UE may configure a transmission power value of transmission request information of a signal for sidelink path loss estimation transmitted to the V2X reception UE based on the downlink path loss value estimated by the V2X transmission UE itself. The V2X reception UE may configure a transmission power value of the signal for sidelink path loss estimation transmitted to the V2X transmission UE based on the downlink path loss value with the base station.

Figure 8A:
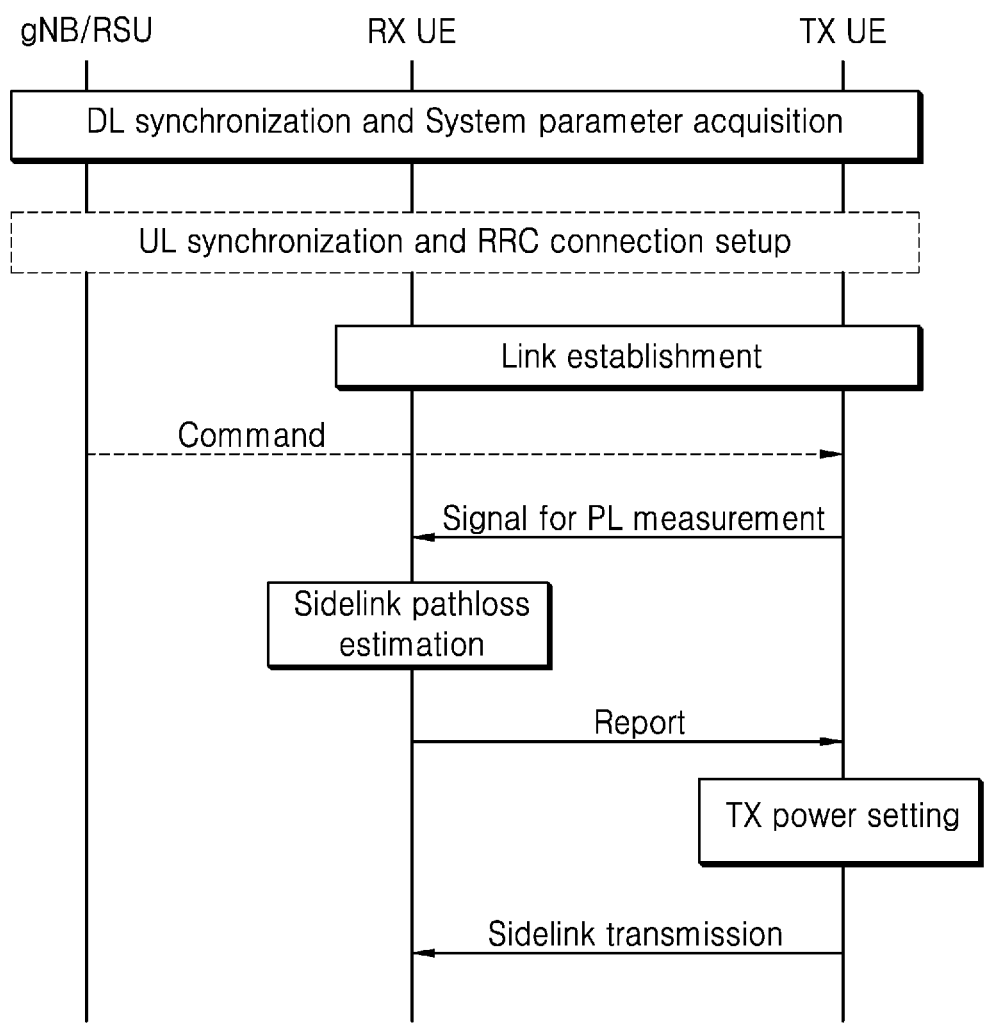
FIG. 8A is a diagram for describing a method of transmitting and receiving a path loss measurement signal to estimate inter-UE sidelink path loss, according to another disclosed embodiment.

FIG. 8A is a diagram for describing a method of transmitting and receiving a path loss measurement signal to estimate an inter-UE sidelink path loss, according to another disclosed embodiment.

Figure 9:
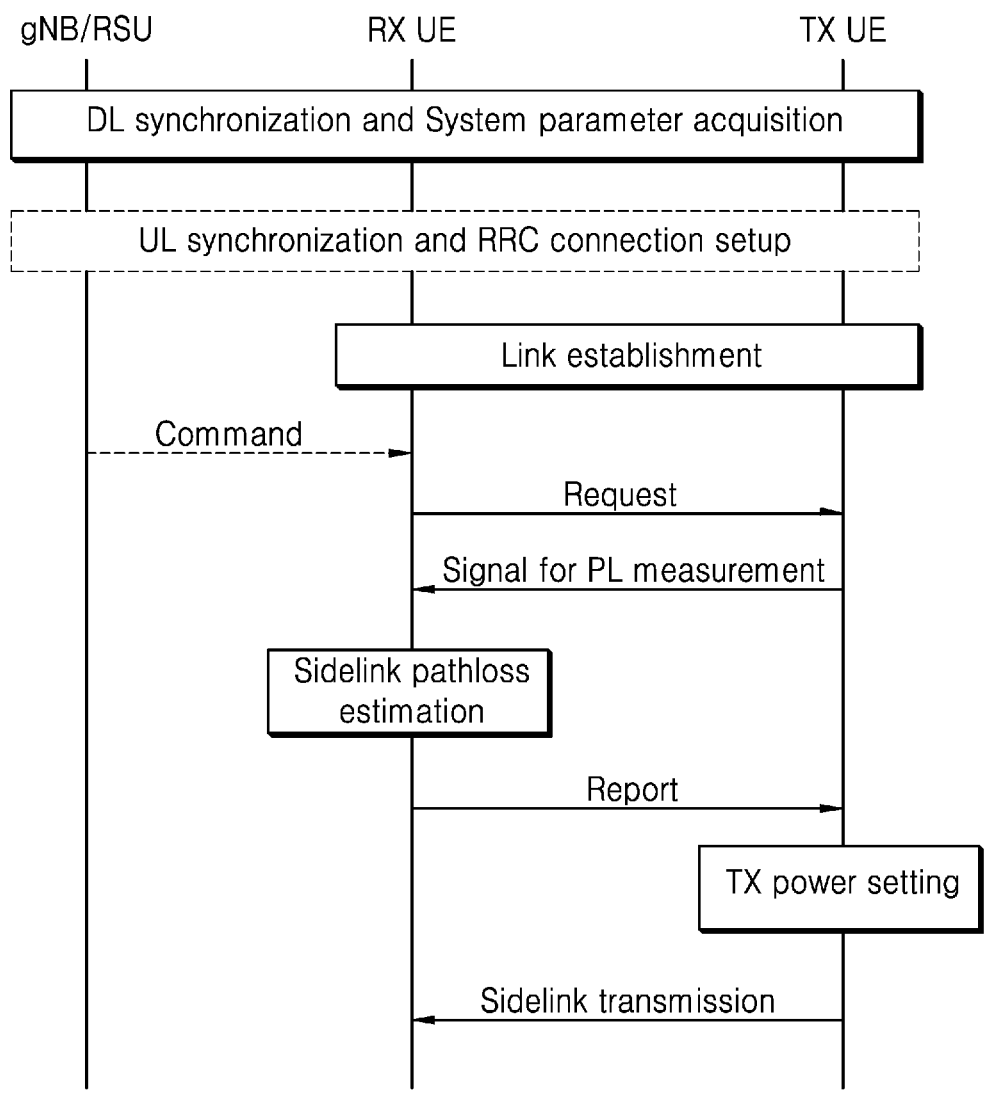
FIG. 9 is a diagram for describing a method of transmitting and receiving a path loss measurement signal to estimate inter-UE sidelink path loss, according to another disclosed embodiment.

FIG. 8A may correspond to a detailed embodiment of (a) of FIG. 5. V2X UEs in coverage of a base station may perform downlink synchronization and may obtain system information. In this case, the downlink synchronization may be performed through a primary synchronization signal/secondary synchronization signal (PSS/SSS) received from the base station, or may be performed through a synchronization signal received from a global navigation satellite system (GNSS). The V2X UEs performing the downlink synchronization may obtain system information related to V2X through a V2X dedicated system information block (SIB) transmitted by the base station. Also, the V2X UEs in the coverage may perform uplink synchronization through a random access procedure with the base station and may perform an RRC connection procedure. In this case, the uplink synchronization and the RRC connection procedure may be performed by only one of a transmission UE or a reception UE, or may be performed by both the transmission UE and the reception UE. Information on which UE from among the transmission UE and the reception UE is to perform the uplink synchronization and the RRC connection procedure may vary according to a transmission mode of sidelink control information/data information, a sidelink path loss estimation procedure, and a signaling method. For example, as shown in FIG. 8A, a mode in which the base station transmits a command for transmission of a path loss signal to a V2X transmission UE, the transmission UE may have to perform the uplink synchronization and the RRC connection procedure with the base station. Also, as shown in FIG. 9, in a mode in which the base station transmits a command for transmission of a path loss signal to a V2X reception UE, the reception UE may have to perform the uplink synchronization and the RRC connection procedure with the base station. Although not shown in FIGS. 8A and 9, when the base station transmits a command for transmission of a path loss signal to the V2X transmission UE and transmits a command for reception of a path loss signal to the V2X reception UE, both the reception UE and the transmission UE may have to perform the uplink synchronization and the RRC connection procedure with the base station according to a signaling method. For example, when a command of the base station is transmitted to the V2X transmission UE and the V2X reception UE through DCI, a MAC CE, or UE dedicated RRC, the V2X transmission UE and the V2X reception UE may perform the uplink synchronization and the RRC connection procedure with the base station. When a command of the base station is transmitted to the V2X transmission UE and the V2X reception UE through V2X system information, the V2X transmission UE and the V2X reception UE may not perform the uplink synchronization and the RRC connection procedure with the base station.

The V2X transmission UE or reception UE performing the uplink synchronization and the RRC connection configuration with the base station may perform unicast link configuration. The unicast link configuration may be performed in a higher layer (e.g., an application layer), and as shown in FIG. 8A, the unicast link configuration may be performed between the V2X transmission UE that is to transmit V2X control information/data information in a unicast method and the V2X reception UE that is to receive the V2X control information/data information in the unicast method. Also, although not shown in FIG. 8A, the base station may engage in the unicast link configuration. For example, the V2X transmission UE may transmit a request for the unicast link configuration to the base station, and the base station may transmit a response to the request to the V2X reception UE. Also, the base station may transmit a confirmation for the unicast link configuration to the V2X transmission UE and the V2X reception UE. However, as described above, because this procedure may be performed in the higher layer, the procedure may not be identified in a physical layer and a MAC layer.

As shown in FIG. 8A, the base station may transmit a command for transmission of a signal for path loss estimation to the V2X transmission UE. In this case, the command of the base station may be transmitted to the V2X transmission UE through UE-specific DCI (or group common DCI)

for a sidelink or through a MAC CE or UE-specific RRC. When the command for transmission of the signal for path loss estimation is transmitted to the V2X transmission UE through UE-specific DCI or group common DCI, the DCI may use a radio network temporary identifier (RNTI) different from UE-specific DCI or group common DCI used in existing cellular communication for distinguishment from existing cellular communication.

Also, unlike in FIG. 8A, the V2X transmission UE may transmit the signal for path loss estimation after unicast link configuration without the command of the base station. For example, the V2X transmission UE may start a timer from a point of time when a request for unicast link configuration is received or from a point of time when the unicast link configuration succeeds, and may transmit the signal for path loss estimation at a point of time when the timer expires. Likewise, the V2X reception UE may start a timer from a point of time when a request for unicast link configuration is transmitted or from a point of time when the unicast link configuration succeeds, and may expect to receive the signal for path loss estimation from the V2X transmission UE at a point of time when the timer expires. In another example, the V2X transmission UE may transmit the signal for path loss estimation after a certain period of time (e.g., after [x] subframes, [x] slots, or [x] ms) from a point of time when unicast link configuration succeeds. Likewise, the V2X reception UE may receive the signal for path loss estimation from the V2X transmission UE after a certain period of time (e.g., [x] subframes, [x] slots, or [x] ms) from a point of time when unicast link configuration succeeds.

In another example where the V2X transmission UE transmits the signal for path loss estimation without the command of the base station, when an RSRP value measured by the V2X transmission UE with the base station is equal to or greater than (or greater than) a specific threshold value configured by the base station or is equal to or less than (or less than) a specific threshold value, the V2X transmission UE may transmit the signal for path loss estimation to the V2X reception UE. In this case, the base station may configure the RSRP value in the V2X transmission UE through a system transmission block for V2X SIB (V2X SIB), or a UE-specific RRC/common RRC message for V2X. In another example, when a variation of the RSRP value with the base station is equal to or greater than (or greater than) a specific threshold value configured by the base station, the V2X transmission UE may transmit the signal for path loss estimation to the V2X reception UE. Although the V2X transmission UE satisfies a condition for the RSRP value configured by the base station, when the base station sends a command for stopping transmitting the signal for path loss estimation, the V2X transmission UE may stop transmitting the signal for path loss estimation.

In another example where the V2X transmission UE transmits the signal for path loss estimation without the command of the base station, when a modulation order of V2X data information to be transmitted by the V2X transmission UE is equal to or greater than, or greater than a certain level, the V2X transmission UE may transmit the signal for path loss estimation. For example, when the modulation order of the V2X data information to be transmitted by the V2X transmission UE is equal to or greater than 64-QAM (or is 256-QAM greater than 64-QAM), the V2X transmission UE may transmit the signal for path loss estimation to the V2X reception UE. In another example, when an aggregation level of V2X control information to be transmitted by the V2X transmission UE is equal to or less than, or less than a certain level, the V2X transmission UE may transmit the signal for path loss estimation (e.g., when the aggregation level is equal to or less than 8, or is equal to 4 that is less than 8). In another example, when a TBS size of the V2X data information to be transmitted by the V2X transmission UE is equal to or greater than (or greater than) a certain number of bits, the V2X transmission UE may transmit the signal for path loss estimation to the V2X reception UE. In another example, when there are sidelink control information and data information to be transmitted by the V2X transmission UE to the V2X reception UE, the V2X transmission UE may always transmit the signal for path loss estimation to the V2X reception UE along with the sidelink control information and data information.

In another example where the V2X transmission UE transmits the signal for path loss estimation to the V2X reception UE without the command of the base station, when an RSRP value of a sidelink channel previously measured by the V2X transmission UE is equal to or greater than (or greater than) a specific threshold value configured by the base station, or is equal to or less than (or less than) a specific threshold value, the V2X transmission UE may transmit the signal for path loss estimation to the V2X reception UE. In this case, the base station may configure the RSRP threshold value of the sidelink channel in the V2X transmission UE through a system transmission block for V2X (V2X SIB), or a UE-specific RRC/common RRC message for V2X. In this case, when the RSRP value of the sidelink channel satisfies a specific threshold value condition configured by the base station at least once, the V2X transmission UE may transmit the signal for path loss estimation to the V2X reception UE. Alternatively, when the RSRP value of the sidelink channel satisfies the specific threshold value condition configured by the base station X times (or more), the V2X transmission UE may transmit the signal for path loss estimation to the V2X reception UE. In this case, X may be pre-defined or may be configured by the base station. In another example, when a variation of the RSRP value of the sidelink channel is equal to or greater than (or greater than) a specific threshold value configured by the base station, the V2X transmission UE may transmit the signal for path loss estimation to the V2X reception UE. Even when the V2X transmission UE satisfies a condition for the sidelink RSRP threshold value of the sidelink channel, which is configured by the base station, when the base station transmits a command for stopping transmitting the signal for path loss estimation, the V2X transmission UE may stop transmitting the signal for path loss estimation. In another example, a threshold value of the RSRP value of the sidelink channel or the variation of the RSRP value of the sidelink channel may be pre-configured without signaling from the base station.

In the above examples where the V2X transmission UE transmits the signal for path loss estimation, V2X transmission UEs may refer to UEs having a capability to transmit a signal for V2X path loss estimation. Accordingly, from among UEs having the capability, V2X transmission UEs satisfying the above conditions may transmit the signal for path loss estimation.

As shown in FIG. 8A, the base station may transmit a command for transmission of the signal for path loss estimation to the V2X transmission UE, and whether the V2X transmission UE is capable of transmitting the signal for path loss estimation may be a V2X UE capability (i.e., only UEs having a capability to transmit a signal for V2X path loss estimation may transmit the signal for V2X path loss estimation). In this case, the command of the base station may be transmitted to the V2X transmission UE having the capability through UE-specific DCI (or group common DCI)

for a sidelink or through a UE-specific RRC message. The V2X transmission UE receiving the command for transmission of the signal for path loss estimation may transmit the signal for path loss estimation to the V2X reception UE. Alternatively, when the above condition is satisfied (e.g., expiration of a timer, RSRP with the base station, or a modulation order), the V2X transmission UE that is to transmit the signal for path loss estimation may transmit the signal for path loss estimation to the V2X reception UE. In this case, the V2X reception UE may obtain information on transmission power of the signal for path loss estimation by using one of the following various methods.

A method of transmitting the information on the transmission power of the signal for path loss estimation according to an embodiment will be described below.

Base Station Transmits Information on Transmission Power of a Signal for Path Loss Estimation to a V2X Reception UE Through RRC Signaling A base station may transmit information on transmission power of a signal for path loss estimation to a V2X reception UE through RRC signaling. In detail, the base station may transmit transmission power information of the signal for path loss estimation to all V2X UEs in cell coverage through a V2X dedicated system information block V2X SIB. In this case, the V2X reception UE may receive the information even when there is no RRC connection configuration with the base station. In another example, the base station may transmit the information on the transmission power of the signal for path loss estimation transmitted by a V2X transmission UE to the V2X reception UE through UE dedicated RRC or UE common RRC signaling. In this case, the V2X reception UE may have to perform RRC connection configuration with the base station. As described above, when the V2X reception UE directly receives the information on the transmission power of the signal for path loss estimation from the base station, the V2X transmission UE may not transmit the information on the transmission power of the signal for path loss estimation to the V2X reception UE.

V2X Transmission UE Transmits Information on Transmission Power of a Signal for Path Loss Estimation to a V2X Reception UE Via a Sidelink Broadcast Channel A V2X transmission UE may transmit information on transmission power of a signal for path loss estimation to a V2X reception UE via a sidelink broadcast channel. In this case, the information on the transmission power transmitted by the V2X transmission UE may be information received from a base station. For example, as shown in (b) of FIG. 1, a scenario in which the V2X transmission UE exists in coverage of the base station and the V2X reception UE exists out of the coverage of the base station may be considered. In this situation, the V2X reception UE may not receive system information and RRC information from the base station. Accordingly, the V2X transmission UE existing in the coverage of the base station may transmit the information on the transmission power of the signal for path loss estimation via a sidelink broadcast channel so that the V2X reception UE existing out of the coverage of the base station estimates a sidelink path loss.

In another example, as shown in (d) of FIG. 1, the V2X reception UE and the V2X transmission UE may exist in different cells. That is, a V2X reception UE UE-1 may exist in coverage of a base station 1, and the V2X transmission UE UE-2 may exist in coverage of a base station 2. In this case, the V2X transmission UE UE-2 existing in the coverage of the base station 2 may transmit the information on the transmission power of the signal for path loss estimation to the V2X reception UE UE-1 existing in the coverage of the base station 1 via a sidelink broadcast channel.

The V2X transmission UE may transmit transmission power information determined by the V2X transmission UE itself via a sidelink broadcast channel, without the information on the transmission power received from the base station, to a V2X reception UE out of cell coverage ((b) of FIG. 1) or to a V2X reception UE located in a different cell ((d) of FIG. 1).

V2X Transmission UE Transmits Information on Transmission Power of a Signal for Path Loss Estimation to a V2X Reception UE Via a Sidelink Control Channel A V2X transmission UE may transmit information on transmission power of a signal for path loss estimation to a V2X reception UE via a sidelink control channel. In this case, the V2X transmission UE may re-transmit the information on the transmission power received from a base station to the V2X reception UE, or may transmit transmission power information determined (or pre-configured) by the V2X transmission UE itself to the V2X reception UE via the sidelink control channel without the information on the transmission power received from the base station. In this case, the V2X reception UE may be located in the same base station (or RSU) as the V2X transmission UE, may be located in a different base station from the V2X transmission UE, or may exist out of coverage of the base station.

V2X Transmission UE Transmits Information on Transmission Power of a Signal for Path Loss Estimation to a V2X Reception UE Via a Sidelink Data Channel A V2X transmission UE may transmit information on transmission power of a signal for path loss estimation to a V2X reception UE through a MAC CE transmitted via a sidelink data channel. The V2X transmission UE may re-transmit the information on the transmission power received from a base station, or may transmit transmission power information determined (or pre-configured) by the V2X transmission UE itself to the V2X transmission UE via the sidelink data channel without the information on the transmission power received from the base station. In this case, the V2X reception UE may be located in the same base station (or RSU) as the V2X transmission UE, may be located in a different base station from the V2X transmission UE, or may exist out of coverage of the base station.

The V2X transmission UE may transmit the information on the transmission power of the signal for path loss estimation to the V2X reception UE through at least one of the above embodiments. In this case, there may be various methods of configuring transmission power information of the signal for path loss estimation. When the V2X transmission UE transmits the information on the transmission power of the signal for path loss estimation to the V2X reception UE, the V2X transmission UE may configure transmission power information of the signal for path loss estimation by using at least one of the following embodiments.

A method of configuring the information on the transmission power of the signal for path loss estimation according to an embodiment will be described below.

Information on Transmission Power is Directly Transmitted

Transmission power of a signal for path loss estimation may be transmitted through [x] bits. For example, transmission power of the signal for path loss estimation may be displayed in a range from −60 dBm to 50 dBm by 1 dBm. Accordingly, in the above example, information on the transmission power of the signal for path loss estimation may be transmitted through 7 bits. A method of configuring the information on the transmission power of the signal for path loss estimation may vary according to locations or environments of the V2X transmission UE and the V2X reception UE as follows.

When the V2X transmission UE and the V2X reception UE exist in coverage of the same base station, the V2X transmission UE and the V2X reception UE may receive [x] bits that is a transmission power value of a reference signal through system information or RRC signaling from the same base station. When transmission power information is transmitted to the V2X reception UE through system information or common RRC signaling, the V2X transmission UE may not transmit the information on the transmission power of the signal for path loss estimation to the V2X reception UE.

When the V2X transmission UE and the V2X reception UE exist in coverages of different base stations, or when the V2X transmission UE may exist in coverage of the base station and the V2X reception UE exists out of the coverage of the base station, the V2X transmission UE may transmit transmission power information of the signal for path loss estimation including [x] bits to the V2X reception UE via at least one of a sidelink broadcast channel, a sidelink control channel, or a sidelink data channel.

The base station may transmit an explicit or implicit command for transmission of the transmission power information of the signal for path loss estimation including [x] bits by the V2X transmission UE via at least one of a sidelink broadcast channel, a sidelink control channel, or a sidelink data channel. In the case of the explicit command, the base station may command through a 1-bit indication to transmit the transmission power information of the signal for path loss estimation through DCI or UE-specific RRC signaling transmitted to the V2X transmission UE. In the case of the implicit command, the base station may command by differently configuring parameters for transmission of a path loss signal in the V2X transmission UE. For example, the base station may differently configure a signal for path loss estimation transmitted for path loss estimation with a V2X reception UE out of cell coverage and a signal for path loss estimation transmitted for path loss estimation with a V2X reception UE in the same cell coverage (e.g., different sequence indexes, different transmission resources, etc.). Also, the base station may differently configure a signal for path loss estimation transmitted for path loss estimation with a V2X reception UE located in a different cell from a V2X transmission UE and a signal for path loss estimation transmitted for path loss estimation with a V2X reception UE located in the same cell (e.g., different sequence indexes or index groups, different transmission resources, etc.).

Offset Information for Transmission Power is Transmitted

As in the above embodiment, when information on transmission power is directly transmitted, full information on transmission power of a signal for path loss estimation is notified, thereby resulting in signaling overhead. In particular, when [x]-bit information is transmitted via a sidelink broadcast channel or a sidelink control channel, signaling overhead may increase. In order to solve these problems, a method of determining a reference signal and transmitting only offset information with respect to a transmission power value of the reference signal may be considered. In this case, the reference signal may be a synchronization signal of a 5G or NR base station (gNB), a DMRS transmitted via a broadcast channel (PBCH) of the gNB, or a CSI-RS of the 5G or NR base station (gNB). In another example, the reference signal may be a synchronization signal of a 4G or LTE base station (eNB), a DMRS transmitted via a broadcast channel of the 4G or LTE base station (eNB), or a CRS of the 4G or LTE base station (eNB). In another example, the reference signal may be a sidelink synchronization signal transmitted via a sidelink or a DMRS transmitted via a sidelink broadcast channel. In another example, the reference signal may be a DMRS transmitted via a sidelink control channel.

When the reference signal is a synchronization signal of a 5G or NR base station (gNB), a DMRS transmitted via a broadcast channel (PBCH) of the 5G or NR base station (gNB), or a CSI-RS of the gNB, an operation may vary according to locations and environments of the V2X transmission UE and the V2X reception UE as follows.

When the V2X transmission UE and the V2X reception UE exist in coverage of the same base station, the V2X transmission UE and the V2X reception UE may receive a transmission power value of a reference signal through system information or RRC signaling from the same base station. In this case, the system information and the common RRC signaling may be signaling for supporting general cellular communication, instead of for V2X. Offset information may be transmitted through V2X dedicated system information or common RRC signaling for supporting V2X. When the offset information is transmitted to the V2X reception UE through the V2X dedicated system information or the RRC signaling for supporting V2X, the V2X transmission UE may not transmit information on transmission power of a signal for path loss estimation to the V2X reception UE.

When the V2X reception UE and the V2X transmission UE exist in coverages of different base stations, or when the V2X reception UE exists in coverage of the base station and the V2X transmission UE exists out of the coverage of the base station, the V2X reception UE may transmit an offset value to the V2X reception UE via at least one of a sidelink broadcast channel, a sidelink control channel, and a sidelink data channel.

The base station may transmit an explicit or implicit command for transmission of offset information for transmission power of a signal for path loss estimation by the V2X transmission UE, via at least one of a sidelink broadcast channel, a sidelink control channel, or a sidelink data channel. In the case of the explicit command, the base station may command through a 1-bit indication to transmit the offset information for the transmission power of the signal for path loss estimation, through DCI or UE-specific signaling transmitted to the V2X transmission UE. In the case of the implicit command, the base station may command by differently configuring parameters for transmission of a path loss signal to the V2X transmission UE. For example, the base station may differently configure a signal for path loss estimation transmitted to a V2X reception UE existing out of cell coverage and a signal for path loss estimation transmitted to a V2X reception UE in the same cell coverage (e.g., different sequence indexes, different transmission resources, etc.). Also, the base station may differently configure a signal for path loss estimation transmitted to a V2X reception UE located in a different cell from a V2X transmission UE and a signal for path loss estimation transmitted to a V2X reception UE located in the same cell (e.g., different sequence indexes, different transmission resources, etc.). Through the configuration, the V2X transmission UE may determine whether to transmit transmission power information of the signal for path loss estimation to the V2X reception UE.

Likewise, when a reference signal is a synchronization signal of an eNB, a DMRS transmitted via a broadcast channel (PBCH) of the eNB, or a CRS of the eNB, an operation may vary according to locations and environments of the V2X transmission UE and the V2X reception UE as follows.

When the V2X transmission UE and the V2X reception UE exist in coverage of the same base station, the V2X transmission UE and the V2X reception UE may receive a transmission power value of a reference signal through system information or RRC signaling from the eNB. In this case, the system information and the common RRC signaling may be signaling for supporting general 4G cellular communication (including LTE-NR dual connectivity), instead of for V2X. Offset information may be transmitted through V2X dedicated system information or common RRC signaling for supporting V2X. When the offset information is directly transmitted to the V2X transmission UE through the V2X dedicated system information or the RRC signaling, the V2X transmission UE may not transmit information on transmission power of a signal for path loss estimation to the V2X reception UE.

When the V2X reception UE and the V2X transmission UE exist in coverages of different base stations, or when the V2X transmission UE exists in coverage of the base station and the V2X reception UE exists out of the coverage of the base station, the V2X transmission UE may transmit an offset value for transmission power of a path loss estimation signal to the V2X reception UE via at least one of a sidelink broadcast channel, a sidelink control channel, or a sidelink data channel.

The base station may transmit an explicit or implicit command for transmission of an offset value for the transmission power of the signal for path loss estimation by the V2X transmission UE, via at least one of a sidelink broadcast channel, a sidelink control channel, or a sidelink data channel. In the case of the explicit command, the base station may command through a 1-bit indication to transmit offset information for the transmission power of the signal for path loss estimation, through DCI or UE-specific RRC signaling transmitted to the V2X transmission UE. In the case of the implicit command, the base station may command by differently configuring parameters for transmission of a path loss signal in the V2X transmission UE. For example, the base station may differently configure a signal for path loss estimation transmitted to a V2X reception UE existing out of cell coverage and a signal for path loss estimation transmitted to a V2X reception UE in the same cell coverage (e.g., different sequence indexes, different transmission resources, etc.). Also, the base station may differently configure a signal for path loss estimation transmitted to a V2X reception UE located in a different cell from a V2X transmission UE and a signal for path loss estimation transmitted to a V2X reception UE located in the same cell (e.g., different sequence indexes, different transmission resources, etc.). Through this configuration, the V2X transmission UE may determine whether to transmit transmission power information of the signal for path loss estimation to the V2X reception UE.

Because there may be various references signals, information on which reference signal is to be used (e.g., a type of a reference signal to be used) may be required. This information may be transmitted along with a transmission power value of the reference signal or may be transmitted along with offset information.

As described above, the base station or the V2X transmission UE may transmit a signal for path loss estimation and transmission power information of the signal for path loss estimation to the V2X reception UE. The V2X reception UE receiving the same may estimate a path loss value of a sidelink by using [Equation 1]. The V2X reception UE may report an estimation result to the V2X transmission UE. In this case, a reporting method may be performed through one of the following various methods.

Referring to FIG. 8A, the V2X reception UE may report a path loss estimation result to the V2X transmission UE, and in this case, the V2X reception UE may report RSRP measured by the V2X reception UE itself or may directly report a path loss value estimated by the V2X reception UE itself.

A method of configuring reported information according to an embodiment will be described below.

Measured RSRP Value is Reported

A V2X reception UE may report L1-RSRP or L3-RSRP measured by the V2X reception UE itself to a V2X transmission UE. In this case, the L1-RSRP may refer to layer 1 (PHY layer) RSRP, and the L3-RSRP may refer to layer 3 RSRP. The L1-RSRP may refer to an instantaneous RSRP value measured in a physical layer. In contrast, the L3-RSRP may refer to an RSRP value obtained by layer 3 by averaging the L1-RSRP during a certain period of time (e.g., 100 ms). In this case, a filter coefficient for obtaining an average may be required. When the L1-RSRP is averaged, the filter coefficient may be used to determine a weight value between an RSRP value measured in the past and an RSRP value measured in the present. Information on the filter coefficient may use a filter coefficient value that is configured from a base station or is pre-determined.

Estimated Path Loss Value is Reported

A V2X reception UE may directly report a path loss value estimated by the V2X reception UE itself. To this end, the V2X reception UE may need to obtain information on transmission power of a signal for path loss estimation transmitted by a V2X transmission UE. This information may be transmitted through various embodiments described with reference to a method of transmitting the information on the transmission power of the signal for path loss estimation or a method of configuring the information on the transmission power of the signal for path loss estimation.

Referring to FIG. 8A, the V2X reception UE may report RSRP measured by the V2X reception UE itself or may report a path loss value measured by the V2X reception UE itself to the V2X transmission UE. In this case, a reported RSRP value or a path loss value may be transmitted via the following channels.

A channel via which reported information is transmitted according to an embodiment will be described below.

Transmission Via a Sidelink Feedback Channel (Physical Sidelink Feedback Channel (PSFCH))

A V2X reception UE may transmit an RSRP value measured by the V2X reception UE itself or a path loss value estimated by the V2X reception UE itself to a V2X transmission UE via a sidelink feedback channel. In this case, via the feedback channel, only the RSRP or path loss value may be transmitted, or the RSRP or path loss value may be multiplexed with at least one of other pieces of sidelink feedback information and may be transmitted. In this case, the sidelink feedback information (SFI) may include hybrid automatic repeat request (ARQ)-acknowledgement (HARQ-ACK), channel state information (CSI), a rank indicator (RI), a precoder matrix indicator (PMI), a layer indicator (LI), or a scheduling request (SR) of a sidelink channel.

Transmission Via a Sidelink Data Channel (Physical Sidelink Shared Channel (PSSCH))

An RSRP value measured by a V2X reception UE or a path loss value estimated by the V2X reception UE may be transmitted via a sidelink data channel. In this case, the RSRP value or the estimated path loss value may be multiplexed with sidelink data information and at least one of other pieces of sidelink feedback information as described above transmitted via a sidelink feedback channel and may be transmitted. Also, when the V2X reception UE does not have data information to be transmitted to a V2X transmission UE but is allocated the sidelink data channel from a base station/RSU or another V2X UE, via the sidelink data channel, only the RSRP value or the estimated path loss value may be transmitted, or may be multiplexed with at least one of other pieces of sidelink feedback information and may be transmitted.

In another example where the RSRP value or the estimated path loss value is transmitted via the sidelink data channel, the V2X reception UE may use a MAC control element (CE) transmitted via the sidelink data channel.

When a specific V2X reception UE reports an RSRP value or a path loss value by using the above channels, other V2X reception UEs may also be performing reporting. Accordingly, in order to prevent collision and interference between resources used by different V2X reception UEs, it may be necessary to allocate and control a resource in which reported information is transmitted. To this end, there may be the following methods.

A resource in which reported information is transmitted according to an embodiment will be described below.

Base Station Allocates a Resource for a Report

When a V2X reception UE and a V2X transmission UE exist in coverage of a base station, the base station may allocate a time/frequency resource in which the V2X reception UE is to transmit a report. Also, the base station may allocate a time/frequency resource in which the V2X transmission UE Is to receive a report.

This allocation information may be transmitted to the V2X reception UE and the V2X transmission UE through a UE-dedicated RRC message or a common RRC message.

In another example, the base station may allocate a resource to the V2X reception UE by using UE-specific DCI for sidelink control information transmission, and may transmit resource information to be received by the V2X transmission UE to the V2X transmission UE by using UE-specific DCI for sidelink control information reception. In this case, a format of the DCI transmitted to the V2X transmission UE and a format of the DCI transmitted to the V2X reception UE may be different from each other. However, in this case, because DCI has to be transmitted to each of a transmission UE and a reception UE, signaling overhead may increase. In order to solve this problem, resource allocation information may be simultaneously transmitted to the transmission UE and the reception UE by using group common DCI.

In another example, there may be a relationship between a resource of a signal for path loss estimation received by the V2X reception UE and a resource in which the V2X reception UE is to report RSRP or a path loss value. In this case, the V2X reception UE may be pre-configured with a resource in which a signal for path loss estimation is to be received from the base station. Accordingly, the V2X reception UE may derive time/frequency/code resources that may be used for the V2X reception UE to make a report to the V2X transmission UE, by using time/frequency/code resources of the signal for path loss estimation received by the V2X reception UE.

The V2X reception UE may exist in coverage of the base station and the V2X transmission UE may exist out of the coverage of the base station. In this case, although the base station may allocate a time/frequency resource in which the V2X reception UE is to transmit a report, the base station may not allocate a time/frequency resource in which the V2X transmission UE is to receive a report. In this case, there may be a separate resource for V2X UEs existing out of the coverage of the base station. The resource may be orthogonal to a resource that may be used by V2X UEs existing in the coverage of the base station in time/frequency/code domains. Accordingly, considering this, the base station may allocate a resource in which the V2X reception UE is able to transmit a report from among time/frequency resources in which the V2X transmission UE is able to receive a report.

Allocation information of a resource in which the V2X reception UE may make a report may be transmitted to the V2X reception UE and the V2X transmission UE through a UE-dedicated RRC message or a common RRC message. In another example, the base station may allocate a resource by using UE-specific DCI for sidelink control information transmission to the V2X reception UE.

In another example, there may be a relationship between a resource of a signal for path loss estimation received by the V2X reception UE and a resource in which the V2X reception UE is to report RSRP or a path loss value. In this case, because the V2X transmission UE exists out of the coverage of the base station, the V2X transmission UE may be pre-configured with a resource in which the signal for path loss estimation is to be transmitted. The V2X reception UE may be configured from the base station with a resource in which the signal for path loss estimation is to be received. Accordingly, the V2X reception UE may derive time/frequency/code resources that may be used for the V2X reception UE to make a report to the V2X transmission UE, by using time/frequency/code resources of the signal for path loss estimation received by the V2X reception UE itself.

The V2X reception UE may exist out of coverage of the base station, and the V2X transmission UE may exist in the coverage of the base station. In this case, although the base station may allocate a time/frequency resource in which the V2X transmission UE is to transmit a signal for path loss estimation, the base station may not allocate a time/frequency resource in which the V2X reception UE is to transmit a report. In this case, there may be a separate resource for V2X UEs existing out of the coverage of the base station. The resource may be orthogonal to a resource that may be used by V2X UEs existing in the coverage of the base station in time/frequency/code domains. Accordingly, considering this, the base station may allocate time/frequency/code resources in which the V2X transmission UE may transmit the signal for path loss estimation. In this case, there may be a relationship between a resource of the signal for path loss estimation transmitted by the V2X transmission UE and a resource in which the V2X reception UE is to report RSRP or a path loss value. Allocation information of a resource in which the V2X transmission UE may transmit the signal for path loss estimation may be transmitted to the V2X transmission UE through a UE-dedicated RRC message or a common RRC message. In another example, the base station may allocate a resource for transmission of a signal for sidelink path loss estimation by using UE-specific DCI to the V2X transmission UE. The V2X reception UE may derive time/frequency/code resources that may be used for the V2X reception UE to make a report to the V2X transmission UE, by using time/frequency/code resources of the signal for path loss estimation received by the V2X reception UE itself.

Both the V2X reception UE and the V2X transmission UE may exist out of coverage of the base station. In this case, the base station may not allocate a time/frequency resource in which the V2X reception UE is to transmit a report and a time/frequency resource in which the V2X transmission UE is to receive a report. In this case, there may be a separate resource for V2X UEs existing out of the coverage of the base station. The resource may be orthogonal to a resource that may be used by V2X UEs existing in the coverage of the base station in time/frequency/code domains.

There may be a relationship between a resource of a signal for path loss estimation received by the V2X reception UE and a resource in which the V2X reception UE is to report RSRP or a path loss value. Accordingly, the V2X reception UE may derive time/frequency code resources that may be used for the V2X reception UE to make a report to the V2X transmission UE, by using time/frequency/code resources of the signal for path loss estimation received by the V2X reception UE itself.

Another V2X UE Allocates a Resource for a Report

A V2X transmission UE may allocate a resource for a report of a V2X reception UE. In this case, resource allocation information for a report may be explicitly transmitted via a sidelink control channel. Also, the resource allocation information may be transmitted along with resource allocation information in which the V2X reception UE receives a signal for path loss estimation. Also, the V2X transmission UE may be configured with the resource allocation information for the report of the V2X reception UE from a base station, and may transmit the information received from the base station to the V2X reception UE via the sidelink control channel. In this case, the base station may transmit resource candidates for the report to the V2X transmission UE, and the V2X transmission UE may select one of the resource candidates configured from the base station and may notify the selected one to the V2X reception UE via the sidelink control channel.

The resource allocation information for the report may be implicitly transmitted. In this case, there may be a relationship between a resource of a signal for path loss estimation received by the V2X reception UE and a resource in which the V2X reception UE is to report RSRP or a path loss value. The V2X reception UE may be configured with a resource in which the V2X reception UE is to receive the signal for path loss estimation from the base station, or may receive the information from the V2X transmission UE. Accordingly, the V2X reception UE may derive time/frequency/code resources that may be used for the V2X reception UE to make a report to the V2X transmission UE, by using time/frequency/code resources of the signal for path loss estimation received by the V2X reception UE itself from the base station or the V2X transmission UE.

When the V2X reception UE receives the signal for path loss estimation from the V2X transmission UE and then reports a result to the V2X transmission UE, the V2X reception UE may periodically or aperiodically report the result. In an embodiment, periodic or aperiodic reporting may have a relationship with an interval in which the V2X reception UE is to perform reporting. For example, in the case of the periodic reporting, a reception UE may continuously perform reporting during a reporting interval, that is, between a start time and an end time of reporting. Also, in the case of the aperiodic reporting, the reception UE may perform reporting once at a reporting time rather than configuring an interval during which reporting is performed. Also, after the V2X reception UE receives the signal for path loss estimation from the V2X transmission UE, the V2X reception UE needs to determine a reporting timing regarding when to perform reporting.

A reporting time according to an embodiment will be described below.

Signaling is Received from a Base Station

A base station may notify a time interval in which reporting is to be performed to a V2X reception UE and a V2X transmission UE through RRC or MAC CE signaling. The V2X reception UE having received the RRC or MAC CE signal may start reporting after a certain period of time (e.g., after [x1] symbols, [x2] slots, or [x3] subframes from a point of time when RRC signaling is received through a downlink from the base station and HARQ-ACK is transmitted through an uplink to the base station). Once the reporting starts, the V2X reception UE may perform the reporting to the V2X transmission UE during an interval configured by the base station. This operation may be referred to as periodic reporting or semi-persistent reporting.

In another example, the base station may notify a point of time in which reporting is to be performed to the V2X reception UE and the V2X transmission UE through UE-specific DCI or group common DCI. The V2X reception UE may transmit a report based on timing information included in the received UE-specific DCI or group common DCI. The V2X transmission UE may receive a report based on timing information included in the received UE-specific DCI or group common DCI. In another example, the V2X reception UE having received the UE-specific DCI or group common DCI may transmit a report to the V2X transmission UE after a fixed period of time (e.g., after [x] ms or [x] slots). In this case, the fixed period of time may be configured from the base station, or may be a pre-agreed value between the V2X transmission UE and the V2X reception UE. This operation may be referred to as aperiodic reporting.

Signaling is Received from Another V2X UE

A base station may notify a time interval in which reporting is to be performed to a V2X reception UE and a V2X transmission UE through RRC or MAC CE signaling. The V2X transmission UE may indicate a point of time at which the V2X reception UE is to perform reporting to the V2X reception UE through sidelink control information. The V2X reception UE may transmit a report based on timing information included in the sidelink control information received by the V2X reception UE. The V2X transmission UE may receive a report from the V2X reception UE based on timing information included in the sidelink control information transmitted by the V2X transmission UE. This reporting may be performed during the time interval received through the RRC or MAC CE signaling from the base station. This operation may be referred to as periodic or semi-persistent reporting.

In another example, an operation may be performed without information on a time interval in which reporting is to be performed from the base station. In this case, the V2X reception UE receiving sidelink control information from the V2X transmission UE may perform reporting to the V2X transmission UE, based on timing information and start information of a report (i.e., triggering information of the report) included in the sidelink control information. In another example, the V2X reception UE having received the sidelink control information may transmit a report to the V2X transmission UE after a fixed period of time (e.g., after [x] ms or [x] slots). In this case, the fixed period of time may be configured from the base station, or may be a pre-agreed value between the V2X transmission UE and the V2X reception UE. This operation may be referred to as aperiodic reporting. This operation may be referred to as aperiodic reporting.

When the V2X reception UE receives a signal for path loss estimation from the V2X transmission UE and then reports a result to the V2X transmission UE, the V2X reception UE needs to determine how to configure a transmission power value of a channel for reporting.

Configuration of an initial transmission power value of a channel in which reported information is transmitted according to an embodiment will be described below.

Pre-Defined Transmission Power Value is Used

A base station may configure a transmission power value of a channel for reporting in a V2X reception UE through a V2X dedicated SIB or RRC signaling. In this case, the configured transmission power value may be a maximum transmission power value of a UE (e.g., Pcmax), or an arbitrary value less than the maximum transmission power value of the UE. In this case, the base station may perform configuration by considering coverage of a sidelink and interference of sidelink communication with an uplink of the base station.

In the absence of the base station (i.e., when communication between V2X UEs is performed out of coverage of the base station), a transmission power value of a channel reported by the V2X reception UE to the V2X transmission UE may be pre-configured.

Transmission power value reflecting a sidelink path loss value estimated by itself is used As shown in FIG. 8A, a V2X reception UE may measure RSRP through a signal for path loss estimation received from a V2X transmission UE, and may estimate a sidelink path loss value. In this case, the V2X reception UE may configure a transmission power value of a channel reported to the V2X transmission UE based on a sidelink path loss value estimated by the V2X reception UE itself.

Transmission Power Value Reflecting a Downlink Path Loss Value with a Base Station Estimated by Itself is Used When a V2X reception UE exists in coverage of a base station, the V2X reception UE may configure a transmission power value of a channel reported to a V2X transmission UE based on RSRP measured by using an SSB or a CSI-RS of the base station and a downlink path loss value estimated by using the RSRP.

The V2X transmission UE may transmit sidelink control information and data information to the V2X reception UE based on an RSRP value or a path loss estimation value reported from the V2X reception UE.

The above embodiments may be similarly or identically applied to a groupcast communication method. For example, in a groupcast communication method, there may exist a group header functioning as a base station managing communication in a group. Such group headers may function as base stations.

Figure 8B:
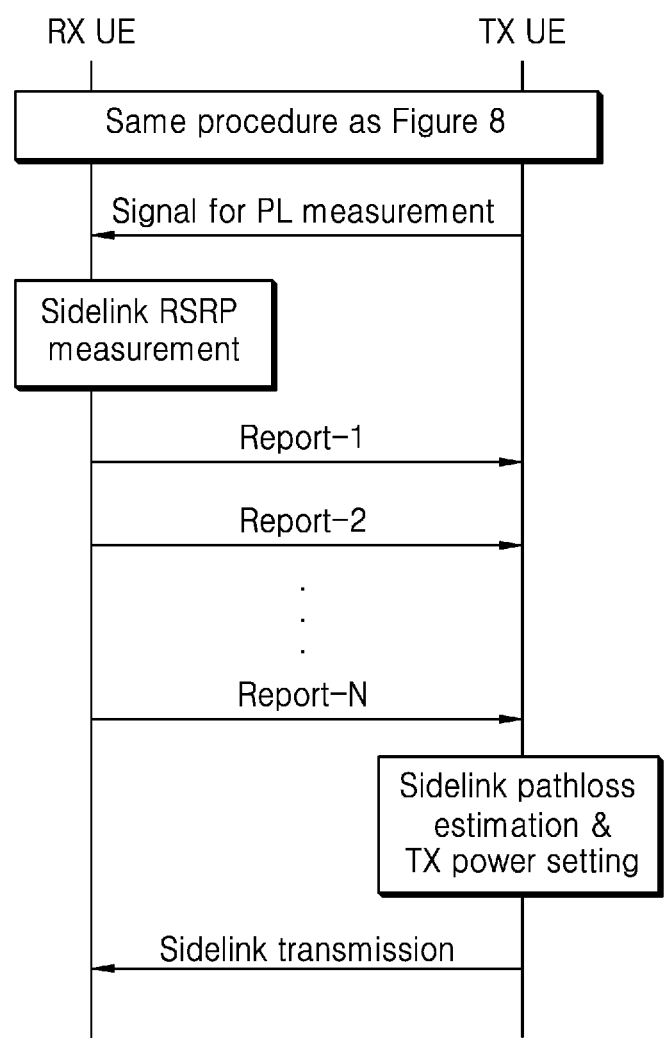
FIG. 8B is a diagram for describing in more detail a method of estimating inter-UE sidelink path loss according to an embodiment of FIG. 8A.

FIG. 8B is a diagram for describing in more detail a method of estimating an inter-UE sidelink path loss according to an embodiment of FIG. 8A.

In FIG. 8A, a transmission UE may transmit a signal for path loss estimation to a reception UE, the reception UE receiving the signal may measure RSRP by using a path loss estimation signal and may report the RSRP to the transmission UE, and the transmission UE may estimate a path loss value of a sidelink by using the received RSRP. Also, the RSRP reported by the reception UE to the transmission UE may be L1-RSRP or L3-RSRP. FIG. 8B illustrates a specific example where the reception UE reports L1-RSRP to the transmission UE.

In FIG. 8B, the same procedure as that in FIG. 8A will not be described. For example, although not shown in FIG. 8B, downlink synchronization with a base station and system parameter acquisition, uplink synchronization and RRC connection configuration, and unicast link configuration (PC-5 RRC connection configuration) between the transmission UE and the reception UE may be performed in the same manner as that in FIG. 8A. Also, the transmission UE may receive a command for transmission of a sidelink path loss estimation signal from the base station.

In order to estimate a path loss, an L3-RSRP value filtered in layer 3 is required. In more detail, a physical layer (layer 1) may calculate an L1-RSRP value and may transmit the L1-RSRP value to layer 3, and the layer 3 may obtain the L3-RSRP value by obtaining an average in a time domain, or a time domain and a spatial domain by using the L1-RSRP value received from the physical layer. For more accurate path loss estimation, an average needs to be obtained during a sufficiently long time.

When the reception UE reports L1-RSRP to the transmission UE, the above L3 filtering operation has to be performed during a sufficiently long time for accurate path loss estimation. To this end, the reception UE may have to report the L1-RSRP to the transmission UE several times. Because the L1-RSRP is a value calculated in the layer 1, the L1-RSRP may be transmitted via a sidelink feedback channel (physical sidelink feedback channel (PSFCH)) or a sidelink data channel (physical sidelink shared channel (PSSCH)). Accordingly, when the reception UE has to report the L1-RSRP to the transmission UE several times, it means that the reception UE has to transmit the PSFCH or the PSSCH to the transmission UE several times. Because a V2X UE may not be able to simultaneously perform transmission and reception, the reception UE may not be able to receive sidelink control information and data information that may be transmitted from another transmission UE while the reception UE transmits the PSFCH or the PSSCH several times. Also, the V2X UE may not be able to simultaneously transmit two or more different channels in one carrier (i.e., two or more different channels may not be frequency-divided and transmitted in one carrier). Accordingly, while the reception UE transmits the PSFCH or the PSSCH to the transmission UE several times to report the L1-RSRP, the reception UE may not be able to transmit sidelink control information and data information to another UE. In order to solve these problems, N L1-RSRP reports may be transmitted in the time domain once through a MAC CE shown in (c) or (d) of FIG. 8D.

As another problem of a case where the reception UE reports the L1-RSRP to the transmission UE, agreement related to transmission and reception of the L1-RSRP may be required between the transmission UE and the reception UE so that the transmission UE receives the L1-RSRP transmitted by the reception UE and performs L3 filtering. In more detail, as shown in FIG. 8B, after the reception UE receives a sidelink path loss estimation signal transmitted from the transmission UE and measures the L1-RSRP, agreement as to when to report the L1-RSRP to the transmission UE may be required. In other words, the transmission UE needs to know a point of time when an L1-RSRP report is transmitted from the reception UE after the sidelink path loss estimation signal is transmitted.

For example, the transmission UE may expect that the L1-RSRP is to be reported from the reception UE after [x1] ms or [x2] slots, from a slot on which the sidelink path loss estimation signal is transmitted. However, when there is no PSFCH or PSSCH resource for reporting the L1-RSRP at a point of time when the reception UE reports the L1-RSRP, or when serious congestion occurs in spite of the existence of the PSFCH or PSSCH resource, the reception UE may not be able to report the L1-RSRP to the transmission UE. Accordingly, in order for the transmission UE to perform L3 filtering by using the L1-RSRP reported from the reception UE, a sufficiently long reception window time needs to be secured. That is, when the transmission UE expects that the L1-RSRP is to be reported from the reception UE every [X1] ms or [x2] slots after transmission of the sidelink path loss estimation signal, the transmission UE may attempt to receive the L1-RSRP during +Δ1 ms or −Δ1 ms from [x1] ms, or may attempt to receive the L1-RSRP during +Δ2 ms or −Δ2 ms from [x2] slots.

In another example, in order for the transmission UE to perform L3 filtering, the transmission UE may have to perform filtering during a total of [x4] ms or a total of [x3] L1-RSRP values reported from the reception UE every [x1] ms or every [x2] slots. Accordingly, the reception UE may have to continuously perform transmission to the transmission UE, until the number of L1-RSRP values reported every [x1] ms or [x2] slots is a total of [x3] (the total number of L1-RSRP values reported by the reception UE to the transmission UE is N in FIG. 8B). Alternatively, the reception UE may have to continuously transmit, to the transmission UE, the L1-RSRP reported every [x1] ms or [x2] slots up to a total of [x4] ms.

In another example, although not shown in FIG. 8B, the transmission UE may transmit a command for stopping reporting the L1-RSRP to the reception UE. The reception UE may report the L1-RSRP every [x1] ms or [x2] slots, until the reception UE receives the command for stopping reporting the L1-RSRP from the transmission UE. The command for stopping reporting the L1-RSRP may be included in PC-5 RRC signaling, a MAC CE, or SCI information.

In another example, an operation may be performed based on a timer. In more detail, the transmission UE may transmit a sidelink path loss estimation signal and may start a T1 timer. The transmission UE may maintain a reception window for receiving an L1-RSRP value reported from the reception UE until the T1 timer expires. When the T1 timer expires, the transmission UE may derive a layer-3 RSRP value by using an L1-RSRP report received until the T1 timer expires. The reception UE may receive the sidelink path loss estimation signal and may start a T2 timer. The reception UE may transmit an L1-RSRP value to the transmission UE at least once on an available resource until the T2 timer expires. When the T2 timer expires, the reception UE may stop transmitting the L1-RSRP report. In the above example, T1 and T2 may be the same or different from each other.

In the above example, when the transmission UE does not receive any L1-RSRP report from the reception UE until the T1 timer of the transmission UE expires, the transmission UE may transmit information for notifying this (e.g., HARQ-NACK) to the reception UE. The reception UE receiving the information may re-configure the T2 timer that is previously running (i.e., reset the T2 timer that is previously running) and may report the L1-RSRP to the transmission UE. In another example, when the transmission UE secures sufficient L1-RSRP samples for performing layer-3 filtering before the T1 timer expires (i.e., when N RSRP values are secured), the transmission UE may transmit information for notifying this (e.g., transmission of HARQ-ACK) to the reception UE and may terminate the T1 timer. When the reception UE receives the information indicating that sufficient L1-RSRP samples are secured from the transmission UE and the T2 timer of the reception UE does not expire, the reception UE may terminate the T2 timer.

[x1], [x2], [x3], [x4], 41, 42, T1, T2 and filtering coefficients for performing L3 filtering may be configured by the base station through system information or RRC signaling. In another example, the transmission UE and the reception UE may perform PC-5 RRC connection configuration during unicast link connection configuration, and in this case, through PC-5 RRC signaling. In another example, the parameters may be fixed values, which may refer to values embedded in the transmission UE and the reception UE.

Figure 8C:
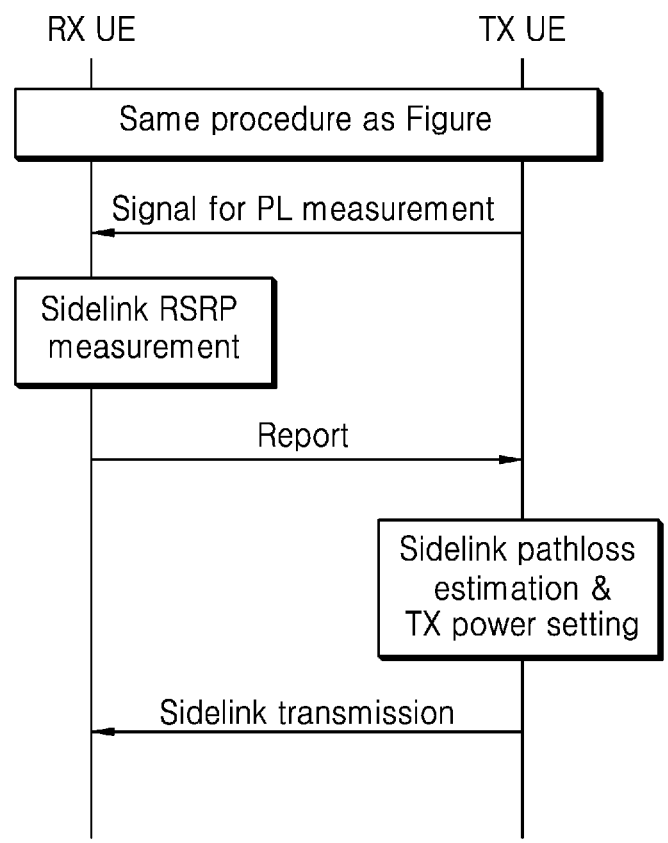
FIG. 8C is another diagram describing in more detail a method of estimating inter-UE sidelink path loss according to an embodiment of FIG. 8A.

FIG. 8C is another diagram for describing in more detail a method of estimating an inter-UE sidelink path loss according to an embodiment of FIG. 8A.

In FIG. 8C, the same procedure as that in FIG. 8A will not be described. For example, although not shown in FIG. 8C, downlink synchronization with a base station and system parameter acquisition, uplink synchronization and RRC connection configuration, and unicast link configuration (PC-5 RRC connection configuration) between a transmission UE and a reception UE may be performed in the same manner as that in FIG. 8A. Also, the transmission UE may receive a command for transmission of a sidelink path loss estimation signal from the base station.

Unlike in FIG. 8B in which the reception UE reports L1-RSRP to the transmission UE, in FIG. 8C, when the reception UE reports L3-RSRP to the transmission UE, the reception UE may report RSRP to the transmission UE only once. Accordingly, problems occurring when the reception UE reports L1-RSRP to the transmission UE may be solved. However, in the case of L3-RSRP reporting, because a final value of reported RSRP is generated in layer 3, L3-RSRP has to be reported from RRC of the reception UE and transmitted to RRC of the transmission UE, and may be transmitted via a PSSCH.

Agreement may be required between the transmission UE and the reception UE so that the transmission UE receives the L3-RSRP transmitted by the reception UE and estimates a sidelink path loss value. In more detail, as shown in FIG. 8C, after the reception UE receives a sidelink path loss estimation signal transmitted from the transmission UE and measures the L3-RSRP, agreement as to when to report the L3-RSRP to the transmission UE may be required. In other words, the transmission UE needs to know a point of time when an L3-RSRP report is transmitted from the reception UE after the sidelink path loss estimation signal is transmitted.

For example, the transmission UE may expect that the L3-RSRP is to be reported from the reception UE after [x1] ms or [x2] slots, from a slot on which the sidelink path loss estimation signal is transmitted. However, when there is no PSSCH resource for reporting the L3-RSRP at a point of time when the reception UE reports the L3-RSRP or when serious congestion occurs in spite of the existence of the PSSCH resource for reporting the L3-RSRP, the reception UE may not be able to report the L3-RSRP to the transmission UE. Accordingly, in order for the transmission UE to estimate a sidelink path loss value by using the L3-RSRP reported from the reception UE, a sufficiently long reception window time needs to be secured. That is, when the transmission UE expects that the L3-RSRP is to be reported from the reception UE every [x1] ms or every [x2] slots after transmission of the sidelink path loss estimation signal transmitted by the transmission UE itself, the transmission UE may attempt to receive the L3-RSRP during +Δ1 ms or −Δ1 ms from [x1] ms, or may attempt to receive the L3-RSRP during +Δ2 ms or −Δ2 ms from [x2] slots.

In another example, an operation may be performed based on a timer. In more detail, the transmission UE may transmit a sidelink path loss estimation signal and may start a T1 timer. The transmission UE may main a reception window for receiving an L3-RSRP value reported from the reception UE until the T1 timer expires. The reception UE may receive the sidelink path loss estimation signal and may start a T2 timer. The reception UE may perform an operation for finding an available resource for reporting the L3-RSRP value to the transmission UE (e.g., a sensing and resource selection operation) until the T2 timer expires. The reception UE not finding the available resource for reporting the L3-RSRP until the T2 timer expires may stop reporting the L3-RSRP. In the above example, T1 and T2 may be the same or different from each other.

In another example, when the transmission UE does not receive any L3-RSRP report from the reception UE until the T1 timer expires, the transmission UE may give up receiving the L3-RSRP. Alternatively, when the transmission UE does not receive the L3-RSRP report from the reception UE until the T1 timer expires, the transmission UE may transmit information indicating this (e.g., HARQ-NACK) to the reception UE. The reception UE receiving the information may re-configure the T2 timer that is previously running (i.e., reset the T2 timer that is previously running), and may re-report the L3-RSRP to the transmission UE.

[x1], [x2] through Δ1, Δ2, T1, T2 and filtering coefficients for performing L3 filtering may be configured by the base station through system information or RRC signaling. In another example, the transmission UE and the reception UE may perform PC-5 RRC connection configuration during unicast link connection configuration, and in this case, through PC-5 RRC signaling. In another example, the parameters may be fixed values, which may refer to values embedded in the transmission UE and the reception UE.

Figure 8D:
FIG. 8D is a diagram for describing a medium access control control element (MAC CE) format for reporting an inter-UE sidelink reference signal received power (RSRP) value, according to a disclosed embodiment.
Figure 8D:
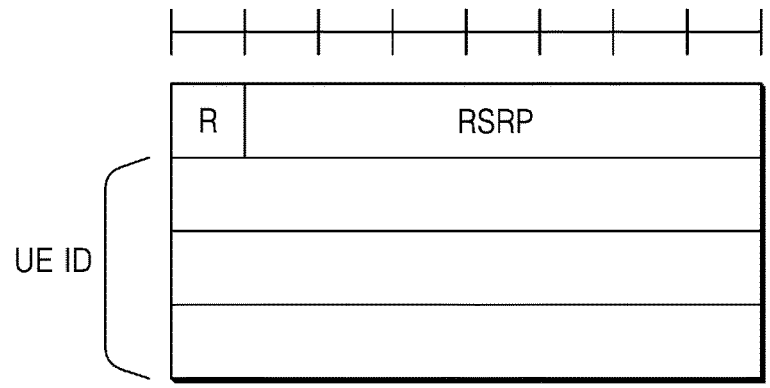
Figure 8D:
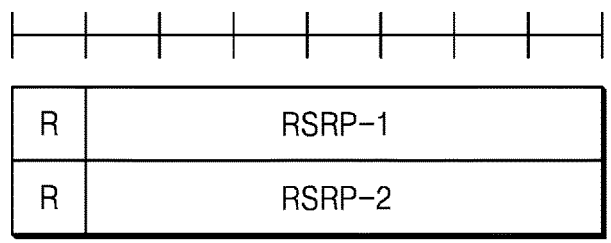
Figure 8D:
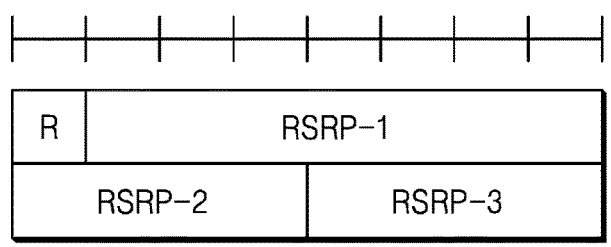

FIG. 8D is a diagram for describing a MAC CE format for reporting an inter-UE sidelink RSRP value.

In (a) of FIG. 8D, a MAC CE includes 8 bits, and RSRP transmitted through the MAC CE is represented as 7 bits (first 1-bit is a reserved bit). In this case, the RSRP may be L1-RSRP. The RSRP may have a range from −140 dBm to −44 dBm with 1 dB size.

(b) of FIG. 8D is another example of a MAC CE for transmitting RSRP. Unlike in (a) of FIG. 8D, in (b) of FIG. 8D, a UE ID including N bits may be transmitted along with 7-bit RSRP. In this case, the UE ID may include a source ID of a transmission UE, a destination ID of a reception UE, or both a source ID and a destination ID. When one of the source ID and the destination ID is transmitted along with the RSRP through the MAC CE, the source ID or the destination ID may include 16 bits or 24 bits. When both the source ID and the destination ID are transmitted along with the RSRP through the MAC CE, bit sizes of the source ID and the destination ID may be each 16 bits or 24 bits, and may be the same or different from each other. That is, when it is assumed that a bit size of the source ID is N1 and a bit size of the destination ID is N2, N1=N2 or N1≠N2, and each of N1 and N2 may be 16 bits or 24 bits.

(c) of FIG. 8D is another example of a MAC CE for transmitting RSRP. Unlike in (a) of FIG. 8D, N RSRP values are transmitted through one MAC CE. That is, assuming that the reception UE has to report N L1-RSRP values to the transmission UE as in FIG. 8B, when the MAC CE of (a) of FIG. 8D) is used, N MAC CE transmissions may be required. In this case, signaling overhead may increase and half-duplexing may increase. Accordingly, it may be preferable that the reception UE transmits N L1-RSRP values through one MAC CE as shown in (c) or (d) of FIG. 8D.

(d) of FIG. 8D is another example of a MAC CE for transmitting RSRP. Like in (c) of FIG. 8D, N RSRP values are transmitted through one MAC CE. However, unlike in (c) of FIG. 8D, a first RSRP value from among the N RSRP values may include 7 bits, and the remaining N−1 RSRP values may each include 4 bits. In more detail, each of the N RSRP values in (c) of FIG. 8D may include 7 bits, and may be represented in a range from −140 dBm to −44 dBm with 1 dB size. Although a first RSRP value includes 7 bits in (d) of FIG. 8D like in (c) of FIG. 8D, second to last $N^{th}$ RSRP values may be RSRP values each representing a difference from a previously reported RSRP value. For example, a second RSRP value RSRP-2 included in the MAC CE and transmitted may refer to a difference between a first RSRP value RSRP-1 that is firstly reported and an RSRP value that is secondly measured. A third RSRP value RSRP-3 included in the MAC CE and transmitted may refer to a difference between the second RSRP value RSRP-2 that is secondly reported and an RSRP value that is thirdly measured. Such an RSRP value difference may include 4 bits as shown in (d) of FIG. 8D, and may be represented in a range from −140 dBm to −44 dBm with 2 dB size. A method of (d) of FIG. 8D may reduce the size of bits transmitted through a MAC CE when compared to (c) of FIG. 8D. In more detail, because 3N bits may be reduced, MAC CE overhead may be significantly reduced as N increases (as the number of reported L-RSRP values increases).

The reception UE may be configured with information on whether to report L1-RSRP by using the MAC CE of (a) of FIG. 8D or to report L1-RSRP by using the MAC CE of (c) and/or (d) of FIG. 8D. It means that the transmission UE may be configured with information on whether to receive L1-RSRP by using the MAC CE of (a) of FIG. 8D or to receive L1-RSRP by using the MAC CE of (c) and/or (d) of FIG. 8D. This configuration may be received through system information or RRC signaling of a base station or may be received through PC-5 RRC signaling. In another example, this configuration may be pre-configured.

FIG. 9 is a diagram for describing a method of transmitting and receiving a path loss measurement signal to estimate an inter-UE sidelink path loss, according to another disclosed embodiment.

FIG. 9 may correspond to a detailed embodiment of (b) of FIG. 5. V2X UEs in coverage of a base station may perform downlink synchronization and may obtain system information. In this case, the downlink synchronization may be performed through a primary synchronization signal/secondary synchronization signal (PSS/SSS) received from the base station, or may be performed through a synchronization signal received from a global navigation satellite system (GNSS). The V2X UEs performing the downlink synchronization may obtain system information related to V2X through a V2X dedicated system information block (SIB) transmitted by the base station gNB/RSU. Also, the V2X UEs in the coverage may perform uplink synchronization through a random access procedure with the base station and may perform an RRC connection procedure. In this case, the uplink synchronization and the RRC connection procedure may be performed by only one of a transmission UE or a reception UE, or may be performed by both the transmission UE and the reception UE.

Information on which UE from among the transmission UE and the reception UE is to perform the uplink synchronization and the RRC connection procedure may vary according to a transmission mode of sidelink control information/data information, a sidelink path loss estimation procedure, a signaling method, etc. For example, as shown in FIG. 8A, in a mode in which the base station transmits a command for transmission of a path loss signal to a V2X transmission UE, the transmission UE may have to perform the uplink synchronization and the RRC connection procedure with the base station. Also, as shown in FIG. 9, in a mode in which the base station transmits a command for transmission of a path loss signal to a V2X reception UE, the reception UE may have to perform the uplink synchronization and the RRC connection procedure with the base station.

Although not shown in FIGS. 8A and 9, when the base station transmits a command for transmission of a path loss signal to the V2X reception UE and transmits a command for reception of a path loss signal to the V2X transmission UE, both the reception UE and the transmission UE may perform the uplink synchronization and the RRC connection procedure with the base station according to a signaling method. In FIG. 9, a reception UE may refer to a UE that receives sidelink control information and data information, and a transmission UE may refer to a UE that transmits sidelink control information and data information. Accordingly, the reception UE and the transmission UE in FIG. 9 may not be related to transmission and reception of a path loss signal.

A V2X transmission UE or a V2X reception UE performing uplink synchronization and RRC connection configuration with the base station may perform unicast link configuration. This unicast link configuration may be performed in a higher layer (e.g., an application layer), and as shown in FIG. 9, the unicast link configuration may be performed between the V2X transmission UE that is to transmit V2X control information/data information in a unicast method and the V2X reception UE that is to receive the V2X control information/data information in the unicast method. Also, although not shown in FIG. 8A, the base station may engage in the unicast link configuration. For example, the V2X transmission UE may transmit a request for the unicast link configuration to the base station, and the base station may transmit a response to the unicast link configuration to the V2X reception UE. Also, the base station may transmit a confirmation for the unicast link configuration to the V2X transmission UE and the V2X reception UE. However, as described above, because this procedure may be performed in the higher layer, the procedure may not be identified in a physical layer and a MAC layer.

As shown in FIG. 9, the base station may transmit a command for a transmission request of a signal for path loss estimation to the V2X reception UE. In this case, the command of the base station may be transmitted to the V2X reception UE through UE-specific DCI (group common DCI) for a sidelink or through a MAC CE or a UE-specific RRC message. When the command is transmitted to the V2X reception UE through the UE-specific DCI or the group common DCI, the DCI may use a radio network temporary identifier (RNTI) different from UE-specific DCI or group common DCI used in existing cellular communication for distinguishment from existing cellular communication.

Also, unlike in FIG. 9, the V2X reception UE may transmit a request for transmission of the signal for path loss estimation to the V2X transmission UE after unicast link configuration without the command of the base station. For example, the V2X reception UE may start a timer from a point of time when a request for unicast link configuration is received or from a point of time when the unicast link configuration succeeds, and may transmit the request for transmission of the signal for path loss estimation at a point of time when the timer expires. Likewise, the V2X transmission UE may start a timer from a point of time when a request for unicast link configuration is transmitted or from a point of time when the unicast link configuration succeeds, and may expect to receive the request for transmission of the signal for path loss estimation from the V2X reception UE at a point of time when the timer expires. In another example, the V2X reception UE may transmit the request for transmission of the signal for path loss estimation to the V2X transmission UE after a certain period of time (e.g., after [x] subframes, [x] slots, or [x] ms) from a point of time when unicast link configuration succeeds. Likewise, the V2X transmission UE may expect to receive the request for transmission of the signal for path loss estimation from the V2X reception UE after a certain period of time (e.g., [x] subframes, [x] slots, or [x] ms) from a point of time when unicast link configuration succeeds.

In another example where the V2X reception UE transmits the request of the signal for path loss estimation to the V2X transmission UE without the command of the base station, when an RSRP value measured by the V2X reception UE with the base station is equal to or greater than (or greater than) a specific threshold value configured by the base station or is equal to or less than (or less than) a specific threshold value, the V2X reception UE may transmit the request of the signal for path loss estimation to the V2X transmission UE. In this case, the base station may configure the RSRP threshold value in the V2X reception UE through a system transmission block for V2X (V2X SIB) or a UE-specific RRC/common RRC message for V2X. In another example, when a variation of the RSRP value with the base station is equal to or greater than (or greater than) a specific threshold value configured by the base station, the V2X reception UE may transmit the request for transmission of the signal for path loss estimation to the V2X transmission UE. Although the V2X reception UE satisfies a condition for the RSRP value configured by the base station, when the base station sends a command for stopping transmitting the request for transmission of the signal for path loss estimation, the V2X reception UE may stop transmitting the request for transmission of the signal for path loss estimation.

In another example where the V2X reception UE transmits the request of the signal for path loss estimation to the V2X transmission UE without the command of the base station, when an RSRP value of a sidelink channel measured by the V2X reception UE is equal to or greater than (or greater than) a specific threshold value configured by the base station or is equal to or less than (or less than) a specific threshold value, the V2X reception UE may transmit the request for transmission of the signal for path loss estimation to the V2X transmission UE. In this case, the base station may configure the RSRP value of the sidelink channel in the V2X reception UE through a system transmission block for V2X (V2X SIB) or a UE-specific RRC/common RRC message for V2X. In this case, when the RSRP value of the sidelink channel satisfies a specific threshold value condition configured by the base station at least once, the V2X reception UE may transmit the request for transmission of the signal for path loss estimation to the V2X transmission UE. Alternatively, when the RSRP value of the sidelink channel satisfies the specific threshold value condition configured by the base station X times (or more), the V2X reception UE may transmit the request of the signal for path loss estimation to the V2X transmission UE. In this case, X may be pre-defined, or may be configured by the base station. In another example, when a variation of the RSRP value of the sidelink channel is equal to or greater than (or greater than) a specific threshold value configured by the base station, the V2X reception UE may transmit the request for transmission of the signal for path loss estimation to the V2X transmission UE. Even when the V2X reception UE satisfies a condition for the RSRP value of the sidelink channel, which is configured by the base station, when the base station transmits a command for stopping transmitting the request for transmission of the signal for path loss estimation, the V2X reception UE may stop transmitting the request for transmission of the signal for path loss estimation. In another example, a threshold value for the RSRP value of the sidelink channel or the variation of the RSRP value of the sidelink channel may be pre-configured without signaling from the base station.

In the above examples in which the V2X reception UE transmits the request for transmission of the signal for path loss estimation, V2X transmission UEs may refer to UEs having a capability to transmit a signal for V2X path loss estimation. Accordingly, it may be assumed that the V2X reception UE may previously know information on the V2X transmission UEs having the capability to transmit the signal for path loss estimation.

As shown in FIG. 9, the base station may transmit a command for transmission of the request of the signal for path loss estimation to the V2X reception UE, and whether the V2X transmission UE is capable of transmitting the signal for path loss estimation may be a V2X UE capability (i.e., only UEs having a capability to transmit a signal for V2X path loss estimation may transmit the signal for V2X path loss estimation). Accordingly, the base station may transmit the command to the V2X reception UE by considering the capability of the V2X transmission UE. In this case, the command of the base station may be transmitted to the V2X reception UE through UE-specific DCI (or group common DCI) for a sidelink or through UE-specific RRC. The V2X reception UE receiving the command for transmission of the request of the signal for path loss estimation may transmit the request for transmission of the signal for path loss estimation to the V2X transmission UE. Alternatively, when the above condition is satisfied (i.e., expiration of a timer, RSRP with the base station, or a modulation order), the V2X reception UE that is to transmit the request for transmission of the signal for path loss estimation may transmit the request for transmission of the signal for path loss estimation to the V2X transmission UE. The V2X transmission UE receiving the request may transmit the signal for path loss estimation to the V2X reception UE. In this case, the V2X reception UE may obtain information on transmission power of the signal for path loss estimation from the V2X transmission UE by using various methods.

A method of transmitting the information on the transmission power of the signal for path loss estimation may be performed in various ways as described with reference to FIG. 8A. Also, a method of configuring transmission power information of the signal for path loss estimation may be performed by using one of various examples described with reference to FIG. 8A. The V2X reception UE receiving the signal for path loss estimation and the transmission power information of the signal for path loss estimation from the base station or the V2X transmission UE may estimate a path loss value of a sidelink by using [Equation 1], and may report the estimated path loss value to the V2X transmission UE. In another example, as described with reference to FIG. 8A, the V2X reception UE may report an RSRP value measured by the V2X reception UE itself, instead of reporting a path loss value. For a reporting method, a channel in which reported information is transmitted, a resource in which reported information is transmitted, a point of time when reported information is transmitted, and a method of configuring an initial transmission power value of a channel in which reported information is transmitted, there may be various methods as described with reference to FIG. 8A.

Until an estimated sidelink path loss value in FIGS. 8A and 9 is reflected in transmission of actual sidelink control information and data information, there are pieces of information to be transmitted and received between the V2X transmission UE and the V2X reception UE. To transmit the pieces of information, it may be necessary to consider how to configure a transmission power value. For example, in FIG. 8A, the V2X reception UE may estimate a sidelink path loss value by using a signal for path loss estimation received from the V2X transmission UE, and may configure a transmission power value of sidelink control information and data information based on the estimated sidelink path loss value. In this case, it may be necessary to determine how to configure a transmission power value of the signal for path loss estimation transmitted to the V2X reception UE. Also, in FIG. 9, the V2X reception UE may transmit a request for transmission of the signal for path loss estimation to the V2X transmission UE, and the V2X transmission UE may transmit a signal for sidelink path loss estimation to the V2X reception UE based on the request. In this case, it may be necessary to determine how to configure transmission power values of the request for transmission of the signal for path loss estimation transmitted by the V2X reception UE to the V2X transmission UE and the signal for sidelink path loss estimation transmitted by the V2X transmission UE to the V2X reception UE. In this case, at least one of the following methods may be used.

Pre-Defined Transmission Power Value is Used
- A base station may configure a transmission power value through a V2X dedicated SIB or RRC signaling. In this case, the configured transmission power value may be a maximum transmission power value of a UE (e.g., Pcmax), or an arbitrary value less than the maximum transmission power value of the UE. In this case, the base station may perform configuration by considering coverage of a sidelink and interference of sidelink communication with an uplink of the base station. The transmission power value may be used for all transmissions until a sidelink path loss value is reflected in transmission power value configuration of actual sidelink control information and data information.
- In another example, a transmission power value may be pre-configured without signaling from the base station. The transmission power value may be used for all transmissions until a sidelink path loss value is reflected in transmission power value configuration of actual sidelink control information and data information.

Transmission Power Value Reflecting a Sidelink Path Loss Value Estimated by Itself is Used
- In FIG. 9, the V2X transmission UE may receive a request for transmission of a signal for path loss estimation from the V2X reception UE. When this procedure is used, the V2X transmission UE may measure sidelink RSRP and may measure a path loss value by using the request signal transmitted from the V2X reception UE. In this case, a transmission power value of the request of the signal for path loss estimation, transmitted from the V2X reception UE, may be obtained by the V2X reception UE by using embodiments using the pre-defined transmission power value. The V2X transmission UE may configure a transmission power value of the signal for path loss estimation transmitted to the V2X reception UE based on the path loss value estimated by the V2X transmission UE itself.

Transmission Power Value Reflecting a Downlink Path Loss Value with a Base Station Estimated by Itself is Used
- When a V2X transmission UE exists in coverage of a base station, the V2X transmission UE may measure downlink RSRP and estimate a downlink path loss value by using an SSB or a CSI-RS of the base station. The V2X transmission UE may configure a transmission power value of a signal for sidelink path loss estimation transmitted to the V2X reception UE based on the downlink path loss value.
- When the V2X reception UE exists in coverage of the base station, the V2X reception UE may estimate a downlink path loss value with the base station (or RSU) by using an SSB or a CSI-RS of the base station. The V2X reception UE may configure a transmission power value of transmission request information of a signal for sidelink path loss estimation transmitted to the V2X transmission UE, based on the downlink path loss value with the base station.
- When both the V2X reception UE and the V2X transmission UE exist in coverage of the base station, the V2X transmission UE may measure downlink RSRP and may estimate a path loss value by using an SSB or a CSI-RS of the base station. Also, the V2X reception UE may estimate a downlink path loss value with the base station (or RSU) by using the SSB or the CSI-RS of the base station. In this case, in FIG. 9, the V2X reception UE may configure a transmission power value of transmission request information transmission of a signal for sidelink path loss estimation transmitted to the V2X transmission UE based on the downlink path loss value estimated by the V2X reception UE itself. The V2X transmission UE may configure a transmission power value of the signal for sidelink path loss estimation transmitted to the V2X reception UE based on the downlink path loss value with the base station.

Figure 10:
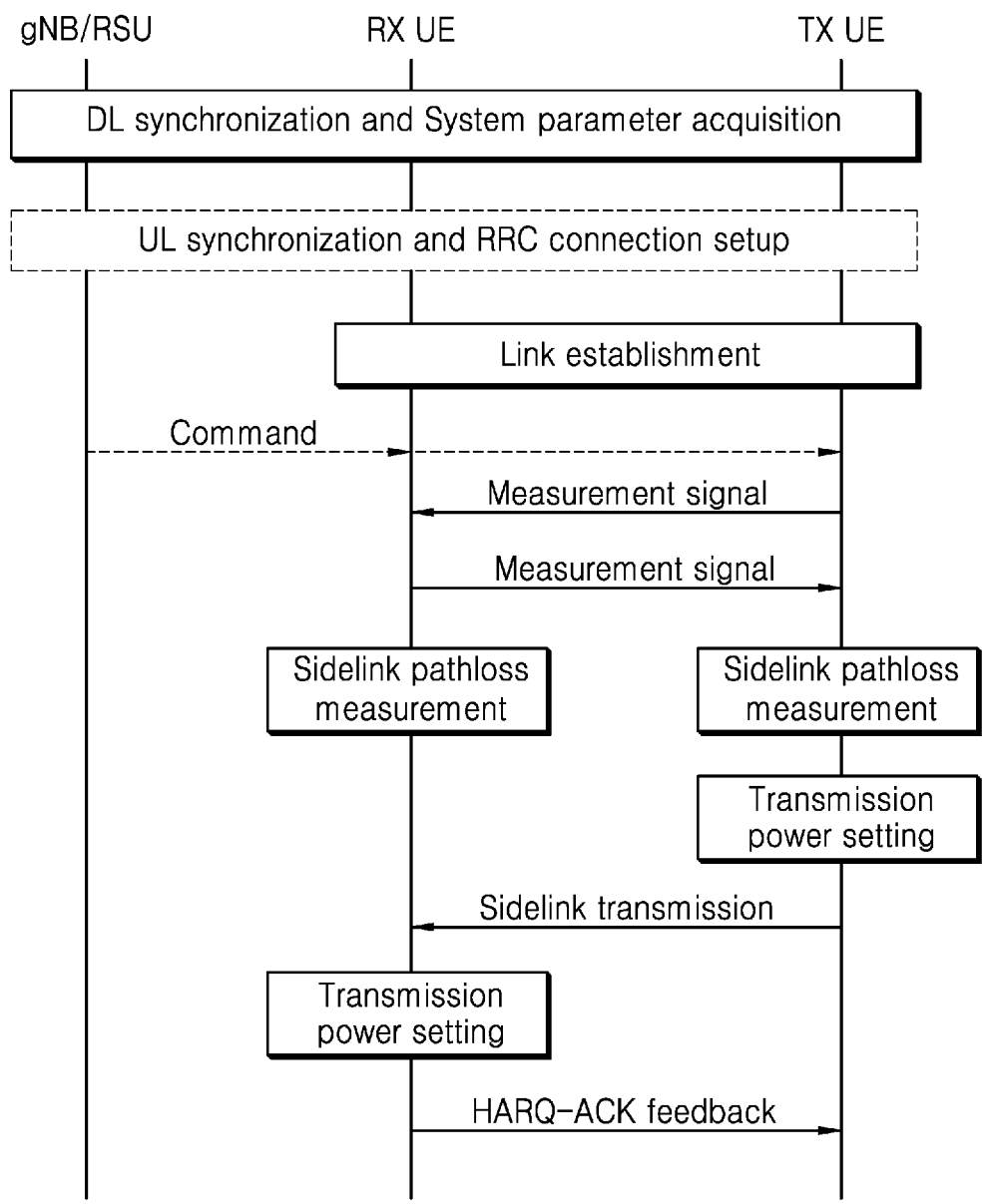
FIG. 10 is a diagram for describing a method of transmitting and receiving a path loss measurement signal to estimate inter-UE sidelink path loss, according to another disclosed embodiment.

FIG. 10 is a diagram illustrating a method of transmitting and receiving a path loss measurement signal to estimate an inter-UE sidelink path loss, according to another embodiment of the present disclosure.

In detail, FIG. 10 is a diagram illustrating a method of estimating a path loss in both directions. In this case, estimation in both directions may refer to a case where a V2X reception UE estimates a path loss value by receiving a signal for path loss estimation transmitted by a V2X transmission UE and the V2X transmission UE estimates a path loss value by receiving a signal for path loss estimation transmitted by the V2X reception UE.

V2X UEs in coverage of a base station may perform downlink synchronization and may obtain system information. In this case, the downlink synchronization may be performed through a primary synchronization signal/secondary synchronization signal (PSS/SSS) received from the base station, or may be performed through a synchronization signal received from a global navigation satellite system (GNSS). The V2X UEs performing the downlink synchronization may obtain system information related to V2X through a V2X dedicated system information block (SIB) transmitted by the base station gNB/RSU. Also, the V2X UEs in the coverage may perform uplink synchronization through a random access procedure with a base station and may perform an RRC connection procedure. In this case, the uplink synchronization and the RRC connection procedure may be performed by only one of a transmission UE or a reception UE, or may be performed by both the transmission UE and the reception UE.

Information on which UE from among the transmission UE and the reception UE is to perform the uplink synchronization and the RRC connection procedure may vary according to a transmission mode of sidelink control information/data information, a sidelink path loss estimation procedure, a signaling method, etc. For example, as shown in FIG. 8A, a mode in which the base station transmits a command for transmission of a path loss signal to a V2X transmission UE, the transmission UE may have to perform the uplink synchronization and the RRC connection procedure with the base station. Also, as shown in FIG. 9, in a mode in which the base station transmits a command for transmission of a path loss signal to a V2X reception UE, the reception UE may have to perform the uplink synchronization and the RRC connection procedure with the base station.

As shown in FIG. 10, when the base station transmits a command for transmission of a signal for path loss estimation to both the V2X reception UE and the V2X transmission UE, both the reception UE and the transmission UE may perform the uplink synchronization and the RRC connection procedure with the base station according to a signaling method by which the base station transmits a command for transmission of a path loss signal For example, when the command for transmission of the path loss signal is transmitted through UE-specific DCI (or group-common DCI) or UE-specific RRC signaling, the reception UE and the transmission UE may perform the uplink synchronization and the RRC connection procedure with the base station. When the command for transmission of the path loss signal is transmitted through a V2X dedicated SIB, the reception UE and the transmission UE may not perform the uplink synchronization and the RRC connection procedure with the base station.

In FIG. 10, a reception UE may refer to a UE that receives sidelink control information and data information, and a transmission UE may refer to a UE that transmits sidelink control information and data information. Accordingly, the reception UE and the transmission UE in FIG. 10 may not be related to transmission and reception of a path loss signal.

A V2X transmission UE or a V2X reception UE may perform unicast link configuration. The unicast link configuration may be performed in a higher layer (e.g., an application layer), and as shown in FIG. 10, the unicast link configuration may be performed between the V2X transmission UE that is to transmit V2X control information/data information in a unicast method and the V2X reception UE that is to receive the V2X control information/data information in the unicast method. Also, although not shown in FIG. 10, the base station may engage in the unicast link configuration. For example, the V2X transmission UE may transmit a request for the unicast link configuration to the base station, and the base station may transmit a response to the unicast link configuration to the V2X reception UE. Also, the base station may transmit a confirmation for the unicast link configuration to the V2X transmission UE and the V2X reception UE. However, as described above, because this procedure may be performed in the higher layer, the procedure may not be identified in a physical layer and a MAC layer.

As shown in FIG. 10, the base station may transmit a command for transmission of a signal for path loss estimation to the V2X transmission UE and the V2X reception UE. In this case, the command of the base station may be transmitted to the V2X transmission UE through UE-specific DCI (group common DCI) for a sidelink or through a MAC CE or UE-specific RRC. When the command for transmission of the signal for path loss estimation is transmitted through the UE-specific DCI or the group common DCI, the DCI may use a radio network temporary identifier (RNTI) different from UE-specific DCI or group common DCI used in existing cellular communication for distinguishment from existing cellular communication. When the base station transmits the command for transmission of the signal for path loss estimation to the V2X transmission UE and the V2X reception UE through an SIB, UE-specific RRC, or common RRC signaling, RRC parameters may include at least one of a time resource, a frequency resource, and a code resource in which the signal for path loss estimation is transmitted. In this case, the time resource may include at least one information from among a start point at which the signal for path loss estimation is transmitted (at least one of a symbol index, a slot index, or a subframe index) and a transmission period. The frequency resource may include at least one information from among a start point of a resource block (RB) at which the signal for path loss estimation is transmitted, a size of the RB, a resource pool, and a bandwidth index (when a partial bandwidth is used). Also, the code resource may include at least one information from among a sequence index used for the signal for path loss estimation, a scrambling ID, and a cyclic shift.

In another example where the signal for path loss estimation is transmitted in both directions based on the command of the base station, information on a transmission resource of the signal for path loss estimation may be configured in the V2X transmission UE and the V2X reception UE through UE-specific RRC or common RRC signaling, and a transmission time of the signal for path loss estimation is activated through a MAC CE, UE-specific DCI, or group common DCI.

In another example where the signal for path loss estimation is transmitted in both directions based on the command of the base station, as shown in FIG. 6, when the base station transmits a command for transmission of the signal for path loss estimation to the V2X reception UE and the V2X reception UE transmits the signal for path loss estimation to the V2X transmission UE, the V2X transmission UE receiving the signal may transmit the signal for path loss estimation to the V2X reception UE in response. Information on when the V2X reception UE is to transmit the signal for path loss estimation may be determined by using one of various embodiments described with reference to FIG. 6.

As shown in FIG. 7, when the base station transmits a command for transmission of a request of the signal for path loss estimation to the V2X transmission UE and the V2X transmission UE transmits the request for transmission of the signal for path loss estimation to the V2X reception UE, the V2X reception UE receiving the request may transmit the signal for path loss estimation to the V2X transmission UE and the V2X transmission UE may transmit the signal for path loss estimation to the V2X reception UE in response. Information on when the V2X transmission UE is to transmit the request of the signal for path loss estimation to the V2X reception UE may be determined by using one of various embodiments described with reference to FIG. 7.

Also, as shown in FIG. 8A, when the base station transmits a command for transmission of the signal for path loss estimation to the V2X transmission UE and the V2X transmission UE transmits the signal for path loss estimation to the V2X reception UE, the V2X reception UE receiving the signal may transmit the signal for path loss estimation to the V2X transmission UE in response. Information on when the V2X transmission UE is to transmit the signal for path loss estimation may be determined by using one of various methods described with reference to FIG. 8A.

Lastly, as shown in FIG. 9, when the base station transmits a command for transmission of a request for transmission of the signal for path loss estimation to the V2X reception UE and the V2X reception UE transmits the request for transmission of the signal for path loss estimation to the V2X transmission UE, the V2X transmission UE receiving the request may transmit the signal for path loss estimation to the V2X reception UE and the V2X reception UE may transmit the signal for path loss estimation to the V2X transmission UE in response. Information on when the V2X reception UE is to transmit the request of the signal for path loss estimation may be determined by using one of various embodiments described with reference to FIG. 9.

Also, unlike in FIG. 10, the V2X transmission UE and the V2X reception UE may transmit and receive the signal for path loss estimation after unicast link configuration, without the command of the base station. For example, the V2X transmission UE may start a timer from a point of time when a request for unicast link configuration is received or from a point of time when the unicast link configuration succeeds, and may transmit the signal for path loss estimation at a point of time when the timer expires. Likewise, the V2X reception UE may start a timer from a point of time when a request for unicast link configuration is transmitted or from a point of time when the unicast link configuration succeeds, and may transmit the signal for path loss estimation to the V2X transmission UE at a point of time when the timer expires. In another example, the V2X transmission UE may transmit the signal for path loss estimation after a certain period of time (e.g., after [x] subframes, [x] slots, or [x] ms) from a point of time when unicast link configuration succeeds. Likewise, the V2X reception UE may transmit the signal for path loss estimation to the V2X transmission UE after a certain period of time (e.g., [x] subframes, [x] slots, or [x] ms) from a point of time when unicast link configuration succeeds.

In another example where the V2X transmission UE and the V2X reception UE transmit the signal for path loss estimation without the command of the base station, pre-defined (pre-configured) parameters may be used and may include at least one of a time resource, a frequency resource, and a code resource in which the signal for path loss estimation is transmitted. In this case, the time resource may include at least one information from among a start point at which the signal for path loss estimation is transmitted (at least one of a symbol index, a slot index, or a subframe index) and a transmission period. The frequency resource may include at least one information from among a start point of a resource block (RB) at which the signal for path loss estimation is transmitted, a size of the RB, a resource pool, and a bandwidth index (when a partial bandwidth is used). Also, the code resource may include at least one information from among a sequence index used for the signal for path loss estimation, a scrambling ID, and a cyclic shift.

In another example where the V2X transmission UE and the V2X reception UE transmit the signal for path loss estimation without the command of the base station, as shown in FIG. 6, when the V2X reception UE transmits the signal for path loss estimation to the V2X transmission UE, the V2X transmission UE receiving the signal may transmit the signal for path loss estimation to the V2X reception UE in response. Information on when the V2X reception UE is to transmit the signal for path loss estimation may be determined by using one of various embodiments described with reference to FIG. 6.

Also, as shown in FIG. 7, when the V2X transmission UE transmits a request for transmission of the signal for path loss estimation to the V2X reception UE, the V2X reception UE receiving the request may transmit the signal for path loss estimation to the V2X transmission UE and the V2X transmission UE may transmit the signal for path loss estimation to the V2X reception UE in response. Information on when the V2X transmission UE is to transmit the request of the signal for path loss estimation to the V2X reception UE may be determined by using one of various embodiments described with reference to FIG. 7.

Also, as shown in FIG. 8A, when the V2X transmission UE transmits the signal for path loss estimation to the V2X reception UE, the V2X reception UE receiving the signal may transmit the signal for path loss estimation to the V2X transmission UE in response. Information on when the V2X transmission UE is to transmit the signal for path loss estimation may be determined by using one of various embodiments described with reference to FIG. 8A.

Lastly, as shown in FIG. 9, when the V2X reception UE transmits the request for transmission of the signal for path loss estimation to the V2X transmission UE, the V2X transmission UE receiving the request may transmit the signal for path loss estimation to the V2X reception UE and the V2X reception UE may transmit the signal for path loss estimation to the V2X transmission UE in response. Information on when the V2X reception UE is to transmit the request of the signal for path loss estimation to the V2X transmission UE may be determined by using of various embodiments described with reference to FIG. 9.

Although transmission of the signal for path loss estimation starts from the V2X transmission UE and the V2X reception UE transmits the signal for path loss estimation to the V2X transmission UE in response in FIG. 10, the reverse case may be possible. That is, transmission of the signal for path loss estimation may start from the V2X reception UE and the V2X transmission UE may transmit the signal for path loss estimation to the V2X reception UE in response. Information on which UE will first transmit the signal for path loss estimation may be pre-agreed (e.g., a transmission UE always first transmits), or may be determined by the command of the base station.

When transmission of the signal for path loss estimation starts from the V2X transmission UE, the V2X reception UE may include timing information on timing at which the V2X reception UE has to transmit the signal for path loss estimation in a sidelink broadcast channel or a sidelink control channel. That is, the V2X transmission UE may transmit timing-related information in a bit field of the sidelink broadcast channel or control channel by using [z] bits. In this case, a unit representing the [z] bits may be the number of symbols (z1 symbols), the number of slots (z2 slots), or the number of subframes (z3 subframes). Accordingly, the V2X reception UE receiving the information may transmit the signal for path loss estimation after z1 symbols (or z2 slots or z3 subframes) from a point of time when the bit field is received. In another example, the timing information may be fixed, and the V2X transmission UE and the V2X reception UE may use a pre-agreed value. In another example, when the V2X transmission UE and the V2X reception UE are located in the same base station, the base station may configure the timing information. In another example, the V2X transmission UE may transmit the timing information configured by the base station via the sidelink broadcast channel or the sidelink control channel, to a V2X reception UE existing out of coverage of the base station or a V2X reception UE existing in a different base station.

Even when transmission of the signal for path loss estimation starts from the V2X reception UE, a similar operation may be performed. That is, the V2X reception UE may operate like the V2X transmission UE in the above example, and the V2X transmission UE may operate like the V2X reception UE in the above example.

A V2X UE (the V2X transmission UE or the V2X reception UE) that transmits the signal for path loss estimation may transmit information on transmission power of the signal for path loss estimation. Transmission power information may be transmitted through various embodiments described with reference to FIGS. 6 through 9.

A V2X UE (the V2X transmission UE or the V2X reception UE) that receives the signal for path loss estimation may measure RSRP through the received signal for path loss estimation, and may estimate a path loss value through information on transmission power of the obtained signal for path loss estimation. The V2X transmission UE may configure a transmission power value for sidelink control information and data information transmission based on the path loss value estimated by the V2X transmission UE itself and may perform sidelink transmission. The V2X reception UE receiving the information may configure a transmission power value for sidelink feedback channel transmission based on the path loss value estimated by the V2X reception UE itself and may transmit a sidelink feedback to the V2X transmission UE. Although a type of information transmitted via a sidelink feedback channel is HARQ-ACK in FIG. 10, the present disclosure is not limited thereto. For example, the sidelink feedback information may include hybrid ARQ-acknowledgement (HARQ-ACK), channel state information (CSI), a rank indicator (RI), a precoder matrix indicator (PMI), a layer indicator (LI), or a scheduling request (SR) of a sidelink channel. Also, the various feedback information may be multiplexed and may be transmitted via the sidelink feedback channel.

Figure 11:
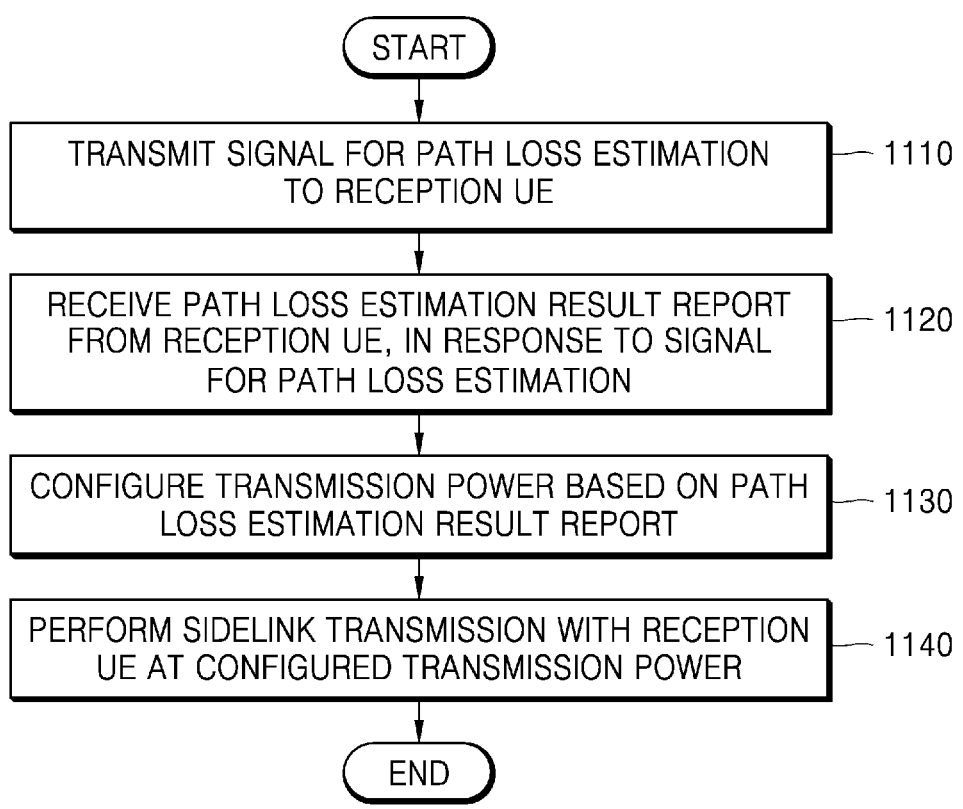
FIG. 11 is a flowchart illustrating a path loss estimation operation of a transmission UE, according to a disclosed embodiment.

FIG. 11 is a flowchart illustrating a path loss estimation operation of a transmission UE, according to a disclosed embodiment.

FIG. 11 illustrates an operation of a transmission UE of FIGS. 5, 8A, and 9.

First, in operation 1110, a transmission UE transmits a signal for path loss estimation to a reception UE. In an embodiment, examples of the signal for path loss estimation may include a sidelink synchronization signal such as a primary sidelink synchronization signal (PSSS) or a secondary sidelink synchronization signal (SSSS), a demodulation reference signal (DMRS) transmitted via a sidelink broadcast channel (physical sidelink broadcast channel (PSBCH)), a sidelink control channel (physical sidelink control channel (PSCCH)), or a sidelink data channel (physical sidelink shared channel (PSSCH)), and a reference signal for supporting a sidelink operation such as a sidelink sounding reference signal (SRS), a sidelink channel state information reference signal (CSI-RS), or a sidelink phase tracking reference signal (PTRS).

Also, the transmission UE may transmit the signal for path loss estimation to the reception UE, at a point of when the transmission UE receives a command for transmission of the signal for path loss estimation from a base station, when reference signal received power (RSRP) measured by the transmission UE for a signal for downlink path loss estimation transmitted by the base station is equal to or greater than a configured threshold value or equal to or less than a configured threshold value, when the transmission UE determines that the signal for path loss estimation needs to be transmitted, or when the transmission UE receives a transmission request signal of the signal for path loss estimation from the reception UE.

Also, in an embodiment, the transmission UE may configure, as transmission power of the signal for path loss estimation, pre-configured transmission power, maximum transmission power of the transmission UE, transmission power according to configuration of the base station, transmission power determined based on RSRP measured by the transmission UE for a signal for downlink path loss estimation transmitted by the base station, or transmission power determined based on RSRP measured by the transmission UE for a transmission request signal of the signal for path loss estimation received from the reception UE.

Next, in operation 1120, the transmission UE receives a path loss estimation result report from the reception UE in response to the signal for path loss estimation. In an embodiment, the path loss estimation result report may include layer 1 RSRP (L1-RSRP) measured by the reception UE, layer 3 RSRP (L3-RSRP), and a path loss value estimated by the reception UE. Also, the transmission UE may receive the path loss estimation result report via a sidelink feedback channel, a sidelink control channel, a sidelink data channel, or a MAC control element (CE). Furthermore, when the transmission UE receives the path loss estimation result report via the above channels, the transmission UE may allocate and control a resource in which reported information is transmitted in order to prevent collision and interference between resources of different V2X UEs.

Also, in an embodiment, the transmission UE may periodically or aperiodically receive the path loss estimation result report according to configuration of the base station and sidelink control information.

In operation 1130, the transmission UE configures transmission power based on the path loss estimation result report.

Next, in operation 1140, the transmission UE may perform sidelink transmission with the reception UE with the configured transmission power. In an embodiment, the transmission UE may transmit sidelink control information and sidelink data with the configured transmission power.

Furthermore, in an embodiment, the transmission UE may transmit information on the transmission power of the signal for path loss estimation to the reception UE. In an embodiment, the transmission UE may transmit a transmission power value of the signal for path loss estimation, and offset information between a configured reference signal and the transmission power value of the signal for path loss estimation to the reception UE. In this case, the signal for path loss estimation and the information on the transmission power of the signal for path loss estimation may be transmitted via the same channel or different channels.

Figure 12:
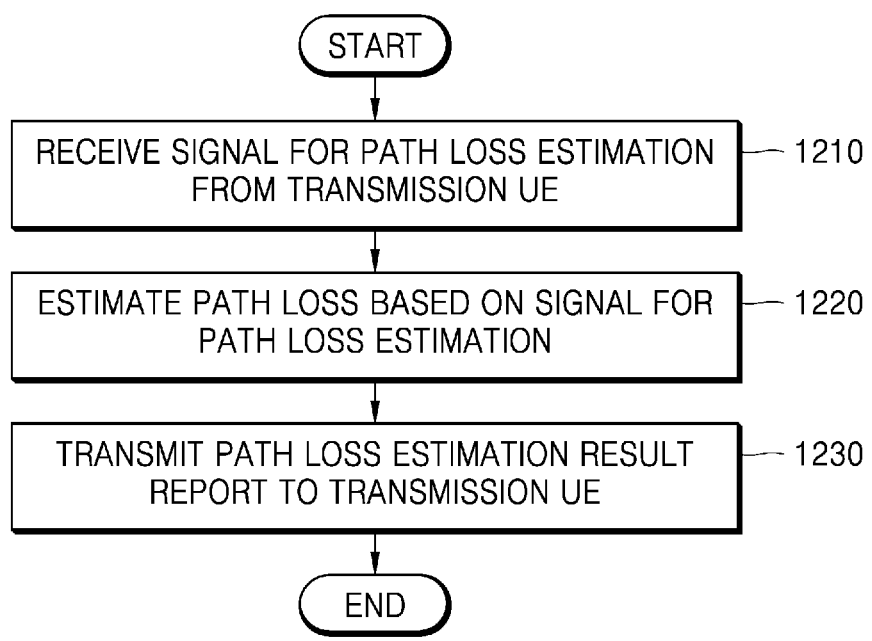
FIG. 12 is a flowchart illustrating a path loss estimation operation of a reception UE, according to a disclosed embodiment.

FIG. 12 is a flowchart illustrating a path loss estimation operation of a reception UE, according to a disclosed embodiment.

FIG. 12 illustrates an operation of a reception UE of FIGS. 5, 8A, and 9.

First, in operation 1210, a reception UE receives a signal for path loss estimation from a transmission UE. In an embodiment, examples of the signal for path loss estimation may include a sidelink synchronization signal such as a primary sidelink synchronization signal (PSSS) or a secondary sidelink synchronization signal (SSSS), a demodulation reference signal (DMRS) transmitted via a sidelink broadcast channel (physical sidelink broadcast channel (PSBCH)), a sidelink control channel (physical sidelink control channel (PSCCH)), or a sidelink data channel (physical sidelink shared channel (PSSCH)), and a reference signal for supporting a sidelink operation such as a sidelink sounding reference signal (SRS), a sidelink channel state information reference signal (CSI-RS), or a sidelink phase tracking reference signal (PTRS).

Next, in operation 1220, the reception UE estimates a path loss based on the signal for path loss estimation.

In operation 1230, the reception UE transmits a path loss estimation result report to the transmission UE. In an embodiment, the path loss estimation result report may include layer 1 RSRP (L1-RSRP) measured by the reception UE, layer 3 RSRP (L3-RSRP), and a path loss value estimated by the reception UE. Also, the reception UE may transmit the path loss estimation result report via a sidelink feedback channel, a sidelink control channel, a sidelink data channel, or a MAC control element (CE). Furthermore, when the reception UE receives the path loss estimation result report via the above channels, the reception UE may allocate and control a resource in which reported information is transmitted in order to prevent collision and interference between resources of different V2X UEs.

Also, in an embodiment the reception UE may periodically or aperiodically transmit the path loss estimation result report according to configuration of a base station and sidelink control information.

In an embodiment, the reception UE may configure, as transmission power of a path loss estimation report signal, pre-configured transmission power, maximum transmission power of the reception UE, transmission power according to configuration of the base station, or transmission power determined based on RSRP measured by the reception UE for a signal for downlink path loss estimation transmitted by the base station.

In an embodiment, the reception UE may transmit a transmission request signal of the signal for path loss estimation to the transmission UE, at a point of time when the reception UE receives a command for a transmission request of the signal for path loss estimation from the base station, when RSRP measured by the reception UE for a signal for downlink path loss estimation transmitted by the base station is equal to or greater than a configured threshold value or equal to or less than a configured threshold value, or when the reception UE determines that the signal for path loss estimation needs to be transmitted. In this case, the reception UE may configure, as transmission power of the transmission request signal of the signal for path loss estimation, pre-configured transmission power, maximum transmission power of the reception UE, transmission power according to configuration of the base station, or transmission power determined based on RSRP measured by the reception UE for a signal for downlink path loss estimation transmitted by the base station.

Also, in an embodiment, the reception UE may receive information on the transmission power of the signal for path loss estimation. In an embodiment, the reception UE may receive a transmission power value of the signal for path loss estimation, and offset information between a configured reference signal and the transmission power value of the signal for path loss estimation. In this case, the signal for path loss estimation and the information on the transmission power of the signal for path loss estimation may be received via the same channel or different channels.

Figure 13:
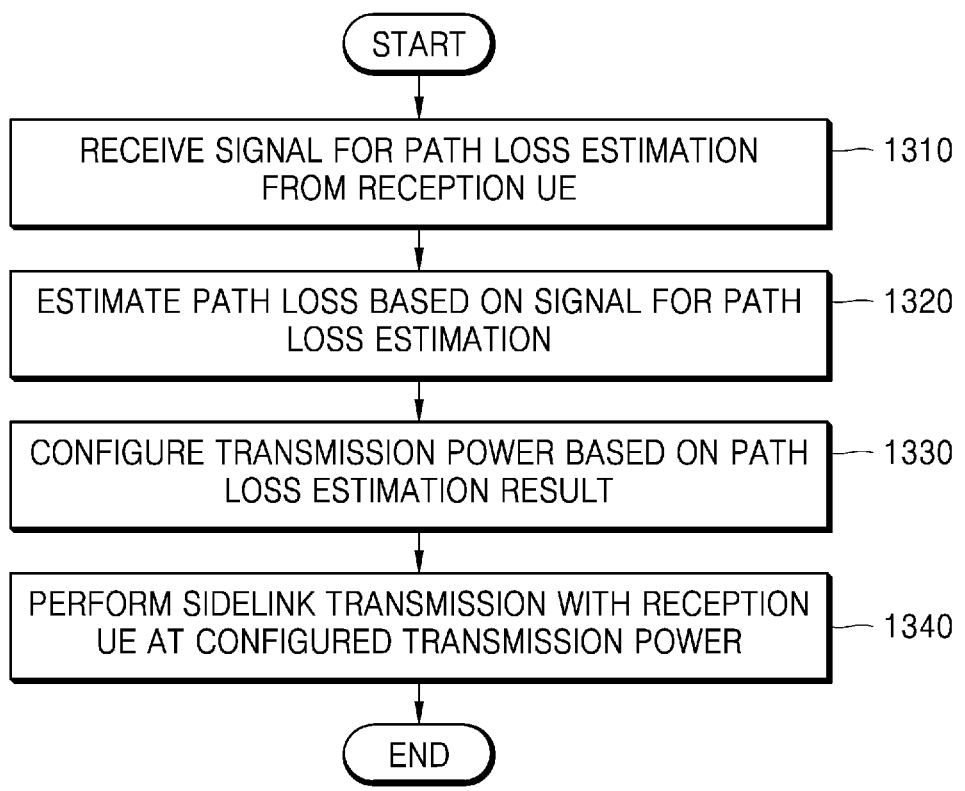
FIG. 13 is a flowchart illustrating a path loss estimation operation of a transmission UE, according to another disclosed embodiment.

FIG. 13 is a flowchart illustrating a path loss estimation operation of a transmission UE, according to another disclosed embodiment.

FIG. 13 illustrates an operation of a transmission UE of FIGS. 4, 6, and 7.

First, in operation 1310, a transmission UE receives a signal for path loss estimation from a reception UE. In an embodiment, examples of the signal for path loss estimation may include a sidelink synchronization signal such as a primary sidelink synchronization signal (PSSS) or a secondary sidelink synchronization signal (SSSS), a demodulation reference signal (DMRS) transmitted via a sidelink broadcast channel (physical sidelink broadcast channel (PSBCH)), a sidelink control channel (physical sidelink control channel (PSCCH)), or a sidelink data channel (physical sidelink shared channel (PSSCH)), and a reference signal for supporting a sidelink operation such as a sidelink sounding reference signal (SRS), a sidelink channel state information reference signal (CSI-RS), or a sidelink phase tracking reference signal (PTRS).

Next, in operation 1320, the transmission UE estimates a path loss based on the signal for path loss estimation.

In operation 1330, the transmission UE configures transmission power based on a path loss estimation result.

Next, in operation 1340, the transmission UE performs sidelink transmission with the reception UE with the configured transmission power. In an embodiment, the transmission UE may transmit sidelink control information and sidelink data with the configured transmission power.

In an embodiment, the transmission UE may transmits a transmission request signal of the signal for path loss estimation to the transmission UE, at a point of time when the transmission UE receives a command for a transmission request of the signal for path loss estimation from a base station, when RSRP measured by the transmission UE for a signal for downlink path loss estimation transmitted by the base station is equal to or greater than a configured threshold value or equal to or less than a configured threshold value, or when the transmission UE determines that the signal for path loss estimation needs to be transmitted. In this case, the transmission UE may configure, as transmission power of the transmission request signal of the signal for path loss estimation, pre-configured transmission power, maximum transmission power of the transmission UE, transmission power according to configuration of the base station, or transmission power determined based on RSRP measured by the transmission UE for a signal for downlink path loss estimation transmitted by the base station.

Also, in an embodiment, the transmission UE may receive information on the transmission power of the signal for path loss estimation. In an embodiment, the transmission UE may receive a transmission power value of the signal for path loss estimation, and offset information between a configured reference signal and the transmission power value of the signal for path loss estimation. In this case, the signal for path loss estimation and the information on the transmission power of the signal for path loss estimation may be received via the same channel or different channels.

Figure 14:
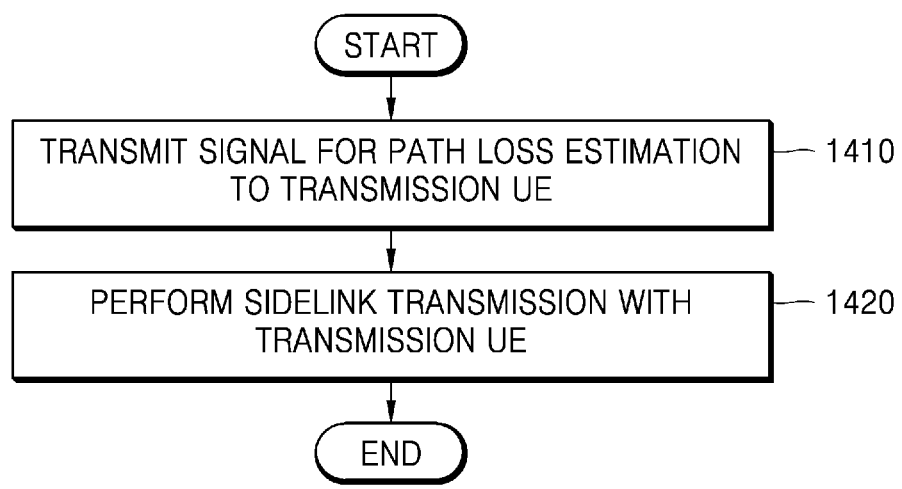
FIG. 14 is a flowchart illustrating a path loss estimation operation of a reception UE, according to another disclosed embodiment.

FIG. 14 is a flowchart illustrating a path loss estimation operation of a reception UE, according to another disclosed embodiment.

FIG. 14 illustrates an operation of a transmission UE of FIGS. 4, 6, and 7.

First, in operation 1410, a reception UE transmits a signal for path loss estimation to a transmission UE. In an embodiment, examples of the signal for path loss estimation may include a sidelink synchronization signal such as a primary sidelink synchronization signal (PSSS) or a secondary sidelink synchronization signal (SSSS), a demodulation reference signal (DMRS) transmitted via a sidelink broadcast channel (physical sidelink broadcast channel (PSBCH)), a sidelink control channel (physical sidelink control channel (PSCCH)), or a sidelink data channel (physical sidelink shared channel (PSSCH)), and a reference signal for supporting a sidelink operation such as a sidelink sounding reference signal (SRS), a sidelink channel state information reference signal (CSI-RS), or a sidelink phase tracking reference signal (PTRS).

Next, in operation 1420, the reception UE performs sidelink transmission with the transmission UE.

In an embodiment, the reception UE may transmit a transmission request signal of the signal for path loss estimation to the transmission UE, at a point of time when the reception UE receives a command for transmission of the signal for path loss estimation from a base station, when RSRP measured by the reception UE for a signal for downlink path loss estimation transmitted by the base station is equal to or greater than a configured threshold value or equal to or less than a configured threshold value, when the reception UE determines that the signal for path loss estimation needs to be transmitted, or when the reception UE receives the transmission request signal of the signal for path loss estimation from the transmission UE. In this case, the reception UE may configure, as transmission power of the signal for path loss estimation, pre-configured transmission power, maximum transmission power of the reception UE, transmission power according to configuration of the base station, transmission power determined based on RSRP measured by the reception UE for a signal for downlink path loss estimation transmitted by the base station, or transmission power determined based on RSRP measured by the reception UE for a transmission request signal of the signal for path loss estimation received from the transmission UE.

Also, in an embodiment, the reception UE may transmit information on the transmission power of the signal for path loss estimation. In an embodiment, the reception UE may transmit a transmission power value of the signal for path loss estimation, and offset information between a configured reference signal and the transmission power value of the signal for path loss estimation. In this case, the signal for path loss estimation and the information on the transmission power of the signal for path loss estimation may be transmitted via the same channel or different channels.

Next, in operation 1420, the reception UE performs sidelink transmission with the transmission UE. In an embodiment, the reception UE may receive sidelink control information and sidelink data from the transmission UE.

Although not shown, operations of the transmission UE and the reception UE of FIG. 10 may be similar to operations of the transmission UE and the reception UE described with reference to FIGS. 11 through 14. In an embodiment, some operations of the transmission UE and the reception UE described with reference to FIGS. 11 through 14 may be applied to operations in FIG. 10 such as transmission and reception of a signal for path loss estimation of the transmission UE and the reception UE, estimation of a path loss based on the signal for path loss estimation, transmission and reception of a path loss estimation result report corresponding to the signal for path loss estimation, configuration of transmission power based on the path loss estimation result report, and sidelink transmission with the configured transmission power.

Also, although the description has been made assuming that there are one transmission UE and one reception UE, the present disclosure is not limited thereto and may be applied even when there are one or more transmission UEs and reception UEs. For example, when there are a plurality of transmission UEs and/or a plurality of reception UEs, each of the transmission UEs and/or the reception UEs may transmit and receive a signal for path loss estimation.

Figure 15:
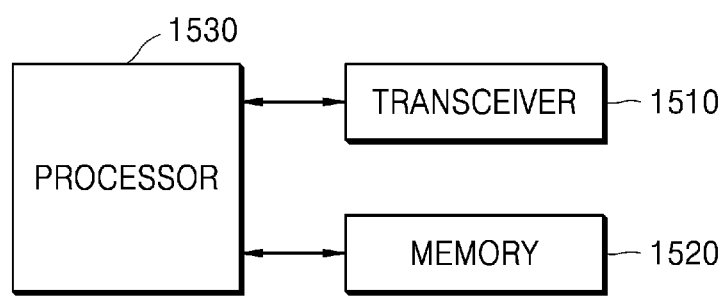
FIG. 15 is a block diagram illustrating a structure of a transmission UE, according to an embodiment.

FIG. 15 is a block diagram illustrating a structure of a transmission UE, according to an embodiment.

As shown in FIG. 15, a transmission UE of the present disclosure may include a transceiver 1510, a memory 1520, and a processor 1530. The processor 1530, the transceiver 1510, and the memory 1520 may operate according to the above-described communication method of the transmission UE. However, elements of the transmission UE are not limited thereto. For example, the transmission UE may include more or fewer elements than those illustrated in FIG. 15. In addition, the processor 1530, the transceiver 1510, and the memory 1520 may be implemented as one chip. Also, the processor 1530 may include at least one processor.

The transceiver 1510 may collectively refer to a receiver and a transmitter of the transmission UE, and may transmit and receive a signal to and from a base station. The signal transmitted and received to and from the base station may include control information and data. To this end, the transceiver 1510 may include a radio frequency (RF) transmitter that up-converts and amplifies a frequency of a transmitted signal, and an RF receiver that performs low-noise amplification on a received signal and down-converts a frequency. However, this is merely an example, and elements of the transceiver 1510 are not limited to the RF transmitter and the RF receiver.

Also, the transceiver 1510 may receive a signal via a wireless channel and may output a signal to the processor 1530, and may transmit a signal output from the processor 1530 via the wireless channel.

The memory 1520 may store a program and data required to operate the transmission UE. Also, the memory 1520 may store control information or data included in a signal obtained by the transmission UE. The memory 1520 may include a storage medium such as a read-only memory (ROM), a random-access memory (RAM), a hard disk, a compact disc (CD)-ROM, or a digital versatile disc (DVD), or a combination thereof.

The processor 1530 may control a series of processes so that the transmission UE operates according to the above-described embodiment of the disclosure. For example, the transceiver 1510 may receive a data signal including a control signal, and the processor 1530 may determine a reception result for the data signal.

In an embodiment, the processor 1530 may transmit a signal for path loss estimation to a reception UE, may receive a path loss estimation result report from the reception UE in response to the signal for path loss estimation, may configure transmission power based on the path loss estimation result report, and may perform sidelink transmission with the reception UE with the configured transmission power.

Also, in an embodiment, the processor 1530 may receive a signal for path loss estimation from a reception UE, may estimate a path loss based on the signal for path loss estimation, may configure transmission power based on a path loss estimation result, and may perform sidelink transmission with the reception UE with the configured transmission power.

Figure 16:
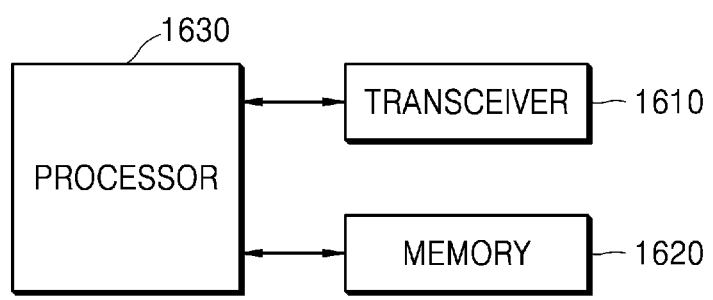
FIG. 16 is a block diagram illustrating a structure of a reception UE, according to an embodiment.

FIG. 16 is a block diagram illustrating a structure of a reception UE, according to an embodiment.

As shown in FIG. 16, a reception UE of the present disclosure may include a transceiver 1610, a memory 1620, and a processor 1630. The processor 1630, the transceiver 1610, and the memory 1620 may operate according to the above-described communication method of the reception UE. However, elements of the reception UE are not limited thereto. For example, the reception UE may include more or fewer elements than those illustrated in FIG. 16. In addition, the processor 1630, the transceiver 1610, and the memory 1620 may be implemented as one chip. Also, the processor 1630 may include at least one processor.

The transceiver 1610 may collectively refer to a receiver and a transmitter of the reception UE, and may transmit and receive a signal to and from a base station. The signal transmitted and received to and from the base station may include control information and data. To this end, the transceiver 1610 may include an RF transmitter that up-converts and amplifies a frequency of a transmitted signal, and an RF receiver that performs low-noise amplification on a received signal and down-converts a frequency. However, this is merely an example, and elements of the transceiver 1610 are not limited to the RF transmitter and the RF receiver.

Also, the transceiver 1610 may receive a signal via a wireless channel and may output a signal to the processor 1630, and may transmit a signal output from the processor 1630 via the wireless channel.

The memory 1620 may store a program and data required to operate the reception UE. Also, the memory 1620 may store control information or data included in a signal obtained by the reception UE. The memory 1620 may include a storage medium such as a ROM, a RAM, a hard disk, a CD-ROM, or a DVD, or a combination thereof.

The processor 1630 may control a series of processes so that the reception UE operates according to the above-described embodiment of the disclosure. For example, the transceiver 1610 may receive a data signal including a control signal, and the processor 1630 may determine a reception result for the data signal.

In an embodiment, the processor 1630 may control to receive a signal for path loss estimation from a transmission UE, estimate a path loss based on the signal for path loss estimation, and transmit a path loss estimation result report to the transmission UE.

Also, in an embodiment, the processor 1630 may transmit a signal for path loss estimation to a transmission UE, and may perform sidelink transmission with the transmission UE.

The methods according to the claims or embodiments of the present disclosure described herein may be implemented by hardware, software, or a combination of hardware and software.

When the methods are implemented by software, a computer-readable storage medium or a computer program product storing one or more programs (software modules) may be provided. The one or more programs stored in the computer-readable storage medium or the computer program product are configured to be executable by one or more processors in an electronic device. The one or more programs include instructions for allowing the electronic device to execute the methods according to the claims or embodiments of the present disclosure described herein.

These programs (software modules or software) may be stored in a random-access memory (RAM), a non-volatile memory including a flash memory, a read-only memory (ROM), an electrically erasable programmable read-only memory (EEPROM), a magnetic disc storage device, a compact disc (CD)-ROM, a digital versatile disc (DVD), another optical storage device, or a magnetic cassette. Alternatively, the programs may be stored in a memory configured by combining some or all of the storage devices. Also, each of the memories may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may access a device performing an embodiment of the present disclosure through an external port. Also, a separate storage device in a communication network may access a device performing an embodiment of the present disclosure.

In detailed embodiments of the present disclosure, components included in the present disclosure have been expressed as singular or plural according to the detailed embodiments of the present disclosure. However, singular or plural expressions have been selected properly for a condition provided for convenience of description, and the present disclosure is not limited to singular or plural components. Components expressed as plural may be configured as a single component, or a component expressed as singular may be configured as plural components.

The embodiments of the disclosure disclosed in the present specification and drawings have been provided to easily describe the present disclosure and to help with the understanding of the disclosure, and are not intended to limit the scope of the present disclosure. That is, it is obvious to one of ordinary skill in the art that various modifications may be made based on the technical spirit of the present disclosure. Also, the embodiments of the present disclosure may be used in combination when necessary. For example, parts of an embodiment and another embodiment of the present disclosure may be combined with each other. Also, other modifications based on the technical spirit of the embodiment may be made in other systems such as an LTE system, a 5G or NR system, etc.

The invention claimed is:

1. A power control method of a transmission terminal in a wireless communication system, the power control method comprising:
    transmitting a physical sidelink shared channel (PSSCH) demodulation reference signal (DMRS) to a reception terminal;
    receiving a report for a layer 3 reference signal received power (L3-RSRP) from the reception terminal via a PSSCH, the L3-RSRP being measured by the reception terminal based on the PSSCH DMRS;
    determining a transmission power based on the L3-RSRP; and
    performing a sidelink transmission based on the determined transmission power.

2. The power control method of claim 1, wherein the PSSCH DMRS is transmitted in case that the transmission terminal determines that the transmission of the PSSCH DMRS is necessary.

3. The power control method of claim 1, wherein the report from the reception terminal is received periodically.

4. The power control method of claim 1, wherein the report from the reception terminal is received in case that an RSRP value measured by the reception terminal is equal to or greater than a threshold value.

5. The power control method of claim 1, wherein the report from the reception terminal is received in case that an RSRP value measured by the reception terminal is equal to or less than a threshold value.

6. The power control method of claim 1, further comprising:
    transmitting a configuration for a measurement of the L3-RSRP via PC5 RRC signaling to the reception terminal.

7. A power control method of a reception terminal in a wireless communication system, the power control method comprising:
    receiving a physical sidelink shared channel (PSSCH) demodulation reference signal (DMRS) from a transmission terminal;
    measuring a layer 3 reference signal received power (L3-RSRP) based on the PSSCH DMRS; and
    transmitting a report for the L3-RSRP to the transmission terminal via a PSSCH.

8. The power control method of claim 7, wherein the report is transmitted to the transmission terminal periodically.

9. The power control method of claim 7, further comprising:

receiving a configuration for a measurement of the L3-RSRP via PC5 RRC signaling from the transmission terminal.

10. A transmission terminal comprising:
a transceiver;
a memory storing a power control method program; and
a processor configured to execute the program stored in the memory and control the transceiver to:
   transmit a physical sidelink shared channel (PSSCH) demodulation reference signal (DMRS) to a reception terminal,
   receive a report for a layer 3 reference signal received power (L3-RSRP) from the reception terminal via a PSSCH, the L3-RSRP being measured by the reception terminal based on the PSSCH DMRS,
   determine a transmission power based on the L3-RSRP, and
   perform a sidelink transmission based on the determined transmission power.

11. The transmission terminal of claim 10, wherein the PSSCH DMRS is transmitted in case that the transmission terminal determines that the transmission of the PSSCH DMRS is necessary.

12. The transmission terminal of claim 10, wherein the report from the reception terminal is received periodically.

13. The transmission terminal of claim 10, wherein the report from the reception terminal is received in case that an RSRP value measured by the reception terminal is equal to or greater than a threshold value.

14. The transmission terminal of claim 10, wherein the report from the reception terminal is received in case that an RSRP value measured by the reception terminal is equal to or less than a threshold value.

15. The transmission terminal of claim 10, wherein the processor is further configured to:
   transmit a configuration for a measurement of the L3-RSRP via PC5 RRC signaling to the reception terminal.

16. A reception terminal comprising:
a transceiver;
a memory storing a power control method program; and
a processor configured to execute the program stored in the memory and control the transceiver to:
   receive a physical sidelink shared channel (PSSCH) demodulation reference signal (DMRS) from a transmission terminal,
   measure a layer 3 reference signal received power (L3-RSRP) based on the PSSCH DMRS, and
   transmit a report for the L3-RSRP to the transmission terminal via a PSSCH.

17. The reception terminal of claim 16, wherein the report is transmitted to the transmission terminal periodically.

18. The reception terminal of claim 16, wherein the processor is further configured to:
   receive a configuration for a measurement of the L3-RSRP via PC5 RRC signaling from the transmission terminal.

* * * * *